US011933085B2

(12) United States Patent
Jeong

(10) Patent No.: US 11,933,085 B2
(45) Date of Patent: Mar. 19, 2024

(54) MOTORIZED VEHICLE DOOR LATCH WITH EMERGENCY RELEASE

(71) Applicant: WOOBO TECH CO., LTD., Pyeongtaek-si (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 267 days.

(21) Appl. No.: 16/970,417

(22) PCT Filed: Jan. 21, 2020

(86) PCT No.: PCT/KR2020/001034
§ 371 (c)(1),
(2) Date: Jun. 7, 2021

(87) PCT Pub. No.: WO2021/132794
PCT Pub. Date: Jul. 1, 2021

(65) Prior Publication Data

US 2021/0324664 A1 Oct. 21, 2021

(30) Foreign Application Priority Data

Dec. 26, 2019 (KR) ........................ 10-2019-0175295

(51) Int. Cl.
*E05B 81/90* (2014.01)
*E05B 81/16* (2014.01)
(Continued)

(52) U.S. Cl.
CPC .............. *E05B 81/90* (2013.01); *E05B 81/16* (2013.01); *E05B 81/76* (2013.01); *E05B 85/16* (2013.01)

(58) Field of Classification Search
CPC ........ E05B 81/90; E05B 79/22; E05B 85/103; E05B 85/107; E05B 81/76; E05B 81/16; E05B 85/16
See application file for complete search history.

(56) References Cited

U.S. PATENT DOCUMENTS 6,863,318 B2 * 3/2005 Mejean .................... E05B 81/14 292/216
9,551,172 B2 * 1/2017 Barmscheidt ........... E05B 81/90
(Continued)

FOREIGN PATENT DOCUMENTS

DE 10109827 A1 * 9/2002 ............. E05B 79/20
DE 102016109566 A1 * 11/2017 ............. E05B 81/82
(Continued)

OTHER PUBLICATIONS

Espacenet, English machine translation of WO 2016/113441A1, generated May 30, 2023 (Year: 2023).*
(Continued)

*Primary Examiner* — Kristina R Fulton
*Assistant Examiner* — Emily G. Brown
(74) *Attorney, Agent, or Firm* — Sunstein LLP

(57) ABSTRACT

The present invention relates to a motorized door latch for a vehicle, particularly, relates to a motorized vehicle door latch with emergency release that is installed on a vehicle door, and can open the vehicle door, when necessary, using a motorized door latch, either electrically or mechanically, depending on the degree of pulling a hidden handle that is withdrawn, so that the vehicle door can be easily opened even if the electricity supply is cut off in an emergency.

3 Claims, 28 Drawing Sheets

(51) Int. Cl.
*E05B 81/76* (2014.01)
*E05B 85/16* (2014.01)

(56) References Cited

U.S. PATENT DOCUMENTS

| | | | | |
|---|---|---|---|---|
| 9,970,219 | B2 * | 5/2018 | Kouzuma | E05B 85/12 |
| 2003/0019261 | A1 * | 1/2003 | Wittwer | E05B 85/107 292/336.3 |
| 2003/0116977 | A1 * | 6/2003 | Erices | E05B 81/16 292/201 |
| 2013/0076048 | A1 * | 3/2013 | Aerts | G07C 9/00944 292/336.3 |
| 2015/0233154 | A1 * | 8/2015 | Smart | E05B 85/107 70/237 |
| 2016/0290015 | A1 * | 10/2016 | Puscas | E05B 79/22 |
| 2018/0355640 | A1 * | 12/2018 | Jeong | E05B 79/20 |
| 2019/0024422 | A1 | 1/2019 | Inan et al. | |
| 2019/0119958 | A1 * | 4/2019 | Gerber | E05B 85/16 |
| 2019/0249467 | A1 * | 8/2019 | Patane | E05B 81/14 |
| 2020/0071969 | A1 * | 3/2020 | Han | E05B 85/107 |
| 2020/0199916 | A1 * | 6/2020 | Cumbo | E05B 85/107 |
| 2020/0347649 | A1 * | 11/2020 | Nam | E05B 79/08 |
| 2021/0404227 | A1 * | 12/2021 | Rhein | E05B 85/00 |

FOREIGN PATENT DOCUMENTS

| | | | | |
|---|---|---|---|---|
| JP | 2004-176470 A | 6/2004 | | |
| JP | 2018-532912 | 11/2018 | | |
| KR | 1020160088374 | 7/2016 | | |
| KR | 10-1972508 B | 4/2019 | | |
| WO | WO-2016113341 A1 * | 7/2016 | | E05B 81/82 |

OTHER PUBLICATIONS

Korean Intellectual Property Office, Office Action, Application No. 10-2019-0175295, dated Feb. 13, 2020, 3 pages.

Japan Patent Office, Notice of Reasons for Refusal, Application No. 2020-545260, dated Apr. 5, 2022, 8 pages (with English translation).

* cited by examiner

MOTORIZED VEHICLE DOOR LATCH WITH EMERGENCY RELEASE

This application is the national phase entry of international patent application no. PCT/KR2020/001034 filed Jan. 21, 2020 and claims the benefit of Korean patent application No. 10-2019-0175295, filed Dec. 26, 2019, the disclosures of which are incorporated herein by reference in their entirety.

TECHNICAL FIELD

The present invention relates to a door latch for vehicle, and relates to a motorized vehicle door latch with emergency release capable of manually opening a door in a situation where the vehicle door latch cannot open the door electrically due to cut loss of the power supply or motor failure in the event of an accident.

BACKGROUND

A door latch is provided inside the vehicle door to perform a lock and unlock operation, and an open and close operation of the door.

In the case of a mechanical vehicle door latch, when a vehicle key is inserted into a key cylinder provided on the outside of the vehicle door and mechanically connected to the vehicle door latch and the key is rotated, a lock and unlock operation of the door latch can be performed.

When the vehicle door latch is unlocked, a user can open the vehicle door by manipulating the outside handle or inside handle provided in the vehicle door.

Unlike this, the door latch for a motorized vehicle door latch can perform a button operation of a remote controller (fob key) or a lock and unlock operation of a vehicle door latch using a smart key without using a mechanical device such as a key cylinder.

A conventional motorized vehicle door latch is described in 'Korean Registered Patent Publication No. 10-1972508'. The vehicle door latch system of 'Korean Registered Patent Publication No. 10-1972508' has a disadvantage that there is no device capable of opening a vehicle door in a situation where the door latch system cannot electrically release unlock.

Patent Document 1: Korean Registered Patent Publication No. 10-1972508

DETAILED DESCRIPTION OF INVENTION

Technical Problems

An objective of the present invention that has been devised to solve the above-mentioned problems is to provide a device with an emergency release capable of manually operating a motorized latch, and to provide a vehicle door latch in which electrical door opening and passive door opening are sequentially operated.

Technical Solution

According to an aspect of the present invention, there may be provided a motorized vehicle door latch with emergency release comprising: a hidden handle installed on a vehicle door; a motorized latch including a door opening member for opening the vehicle door; a driving unit for operating the door opening member; a safety member for locking or unlocking the door opening member; an outer door connection portion coupled to the hidden handle, pulling the door opening member when the hidden handle is pulled over a certain distance; a door latch connection portion for moving the safety member according to the entry and withdrawal of the hidden handle; a first sensor for detecting a pulling of the hidden handle; and a second sensor for detecting the withdrawal of the hidden handle, wherein the driving unit is operated by detection signals of the first sensor and the second sensor, and wherein the hidden handle may move among the positions of an initial position, a first position detected by the first sensor, and a second position where the door opening member is operated by the outer door connection portion, according to of pulling of the hidden handle.

According to another aspect of the present invention, the door latch may further comprise a locking lever for delivering a movement of the outer door connection portion to the door opening member, wherein the locking lever may move to a position at which the locking lever is connected to the outer door connection portion by a movement of the safety member, or move to a position at which the locking lever is not connected to the outer door connection portion.

According to another aspect of the present invention, the door latch may further comprise an emergency lever that can move the locking lever, wherein the emergency lever can be manually operated from an outside of the motorized latch.

According to another aspect of the present invention, the door latch may further comprise an emergency block slidably coupled to the safety member, wherein a protrusion may be formed in the safety member, wherein the emergency block comprises a groove, a width of the groove at central portion thereof may be smaller than a width of the groove at both ends thereof, and the protrusion may be fitted in the groove, and wherein the emergency block may deliver a movement of the emergency lever to the locking lever.

According to another aspect of the present invention, the door latch may further comprise a door latch key that operates the door opening member, and the door latch key can be manually operated from the outside of the motorized latch.

According to another aspect of the present invention, it may be provided with a motorized vehicle door latch with emergency release comprising: a hidden handle installed on a vehicle door; a motorized latch including a door opening member for opening the vehicle door; a driving unit for operating the door opening member; an outer door connection portion coupled to the hidden handle, pulling the door opening member when the hidden handle is pulled over a certain distance; and a first sensor for detecting a pulling of the hidden handle, wherein the driving unit is operated by the detection signals of the first sensor, and wherein the hidden handle may be moved among the positions of an initial position, a first position detected by the first sensor, and a second position where the door opening member is operated by the outer door connection portion, according to the of pulling of the hidden handle.

According to another aspect of the present invention, it may be provided with a motorized vehicle door latch with emergency release comprising: a hidden handle installed on a vehicle door; a motorized latch including a door opening member for opening the vehicle door; a driving unit for operating the door opening member; a safety member for locking or unlocking the door opening member; an outer door connection portion coupled to the hidden handle, pulling the door opening member when the hidden handle is pulled over a certain distance; a safety driving unit for moving the safety member; a first sensor for detecting the pulling of the hidden handle; and a second sensor for detecting a sliding of the safety member, wherein the driving unit is operated by detection signals of the first sensor and the second sensor, and wherein the hidden handle may move among the positions of an initial position, a first position detected by the first sensor, and a second position where the door opening member is operated by the outer door connection portion, according to the of pulling of the hidden handle.

Advantageous Effects of Invention

According to the motorized vehicle door latch with emergency release of the present invention as described above has the following effects.

The motorized latch can be operated either electrically and mechanically (passively) depending on the degree of pulling the hidden handle, so the door can be opened even if the motorized latch is not electrically operated due to power cut loss or motor failure in the event of an accident.

Since the door opening member of the motorized latch for opening the vehicle door is mechanically connected to the hidden handle and the outer door connection portion, the motorized latch can be mechanically operated only by pulling the hidden handle.

Since the electrical operation and the mechanical operation are sequentially operated, the motorized latch is electrically operated with little force during normal times, and the motorized latch is mechanically operated by pulling the hidden handle to the maximum only in an emergency, thereby enhancing the operation efficiency.

Due to the door latch connection portion for sliding the safety member capable of locking or unlocking the door opening member by entry and withdrawal of the hidden handle, malfunction of the motorized latch can be electrically and mechanically prevented.

Due to the locking lever that is moved by the safety member and can be connected to the outer door connection portion, opening of the vehicle door by the outer door connection portion is prevented when the hidden handle is not withdrawn.

Due to the emergency lever that can move the locking lever and can be manually operated from the outside of the motorized latch, in the case of an emergency, it is possible to prevent the vehicle door from being opened by the outer door connection portion, or to change it to a state where it can be opened.

Due to the door latch key which can move the door opening member, and can be manually operated from the outside of the motorized latch, a vehicle door can be opened using the door latch key.

DESCRIPTION OF THE EMBODIMENTS

Figure 1:
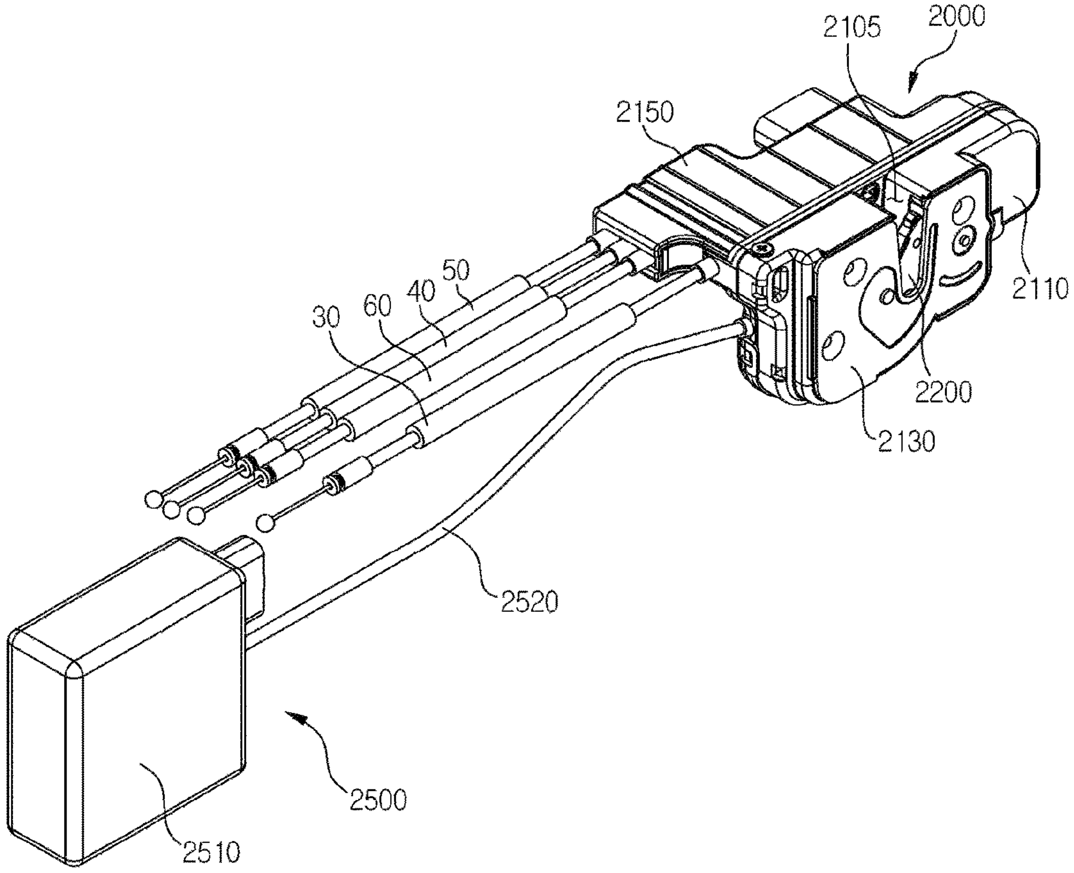
FIG. 1 is a front perspective view of a motorized vehicle door latch with emergency release according to a first preferred embodiment of the present invention.

Hereinafter, embodiments of the present invention will be described in detail with reference to the accompanying drawings.

For reference, for the same configuration as the prior art among the configurations of the present invention to be described hereinafter, reference will be made to the above mentioned prior art, and a separate detailed description will be omitted.

When a part is said to be "above" another part, it may be directly on top of another part, or another part may be involved in between. In contrast, if one part is said to be "directly above" another part, no other part is interposed therebetween.

The terms used herein are for reference only to specific embodiments and are not intended to limit the invention. The singular forms used herein include plural forms unless the phrases clearly indicate the opposite meaning.

As used herein, the meaning of "comprising" embodies specific features, areas, integers, steps, actions, elements and/or components, but it does not exclude the presence or addition of other specific features, areas, integers, steps, actions, elements, components and/or groups.

Terms referring to relative spaces such as "below", "above", etc. may be used to more easily describe the relationship of one part to another part shown in the drawings. These terms are intended to include other meanings or actions of the device in use in conjunction with the intended meaning in the drawings. For example, if the device in the figure is flipped over, some parts described as being "below" other parts are described as being "above" other parts. Thus, the exemplary term "below" includes both the up and down directions. The device can be rotated 90 degrees or rotated at different angles, and terms indicating relative space are to be interpreted accordingly.

Hereinafter, a preferred embodiment of a vehicle door latch with a safety device will be described.

In a preferred embodiment of the present invention, the front-rear side means the lengthwise direction of the vehicle, the up-and-down direction means the widthwise direction of the vehicle, and the left-to-right direction means the vertical direction of the vehicle.

Embodiment 1

Figure 2:
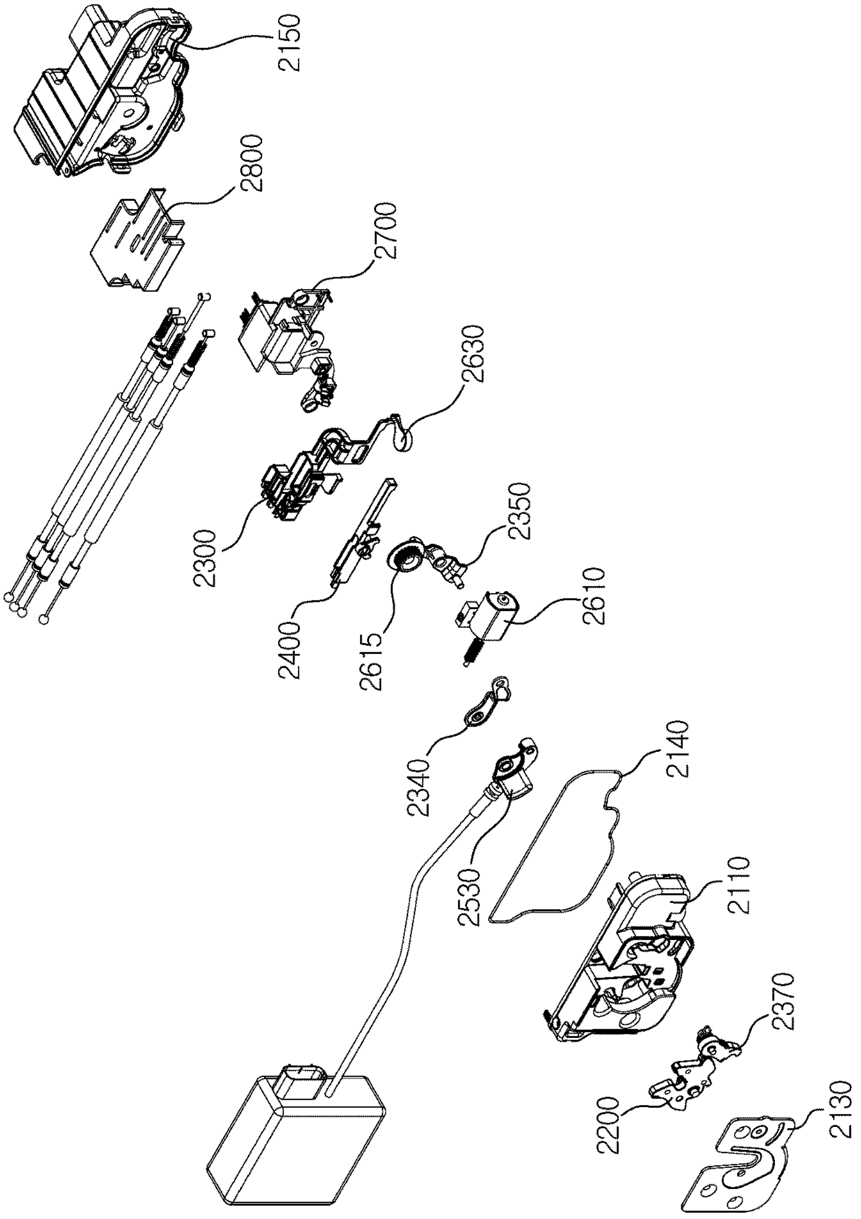
FIG. 2 is a front exploded perspective view of a motorized vehicle door latch with emergency release according to a first preferred embodiment of the present invention.

As illustrated in FIGS. 1 to 2, a motorized latch 2000 of a first preferred embodiment of the present invention comprises: a door opening member for opening a vehicle door; a driving unit for operating the door opening member; an outer door connection portion 60 with one side thereof connected to a handle unit 1000 provided in the vehicle door and provided with a hidden handle that is withdrawn when necessary and the other side connected to the motorized latch 2000 and slidable to the door opening member when being pulled by the handle unit 1000; and a first sensor 22 for detecting the pulling of the handle unit 1000.

The door opening member comprises a latch 2200 pivotally installed on the motorized latch 2000, a pivoting member 2370 for locking or unlocking the latch 2200, an open lever 2350 for rotating a pivoting member 2370; and an open plate 2300 for rotating the open lever 2350.

The outer door connection portion 60 is slid on the open plate 2300, and the driving unit can rotate the open lever 2350.

Hereinafter, each configuration will be described in detail with reference to FIG. 2.

<Housing>

Hereinafter, the housing will be described.

As illustrated in FIG. 2, the housing comprises a first housing 2110, a second housing 2130 disposed at the front side of the first housing 2110, and a third housing 2150 disposed at the rear side of the first housing 2110.

Figure 3:
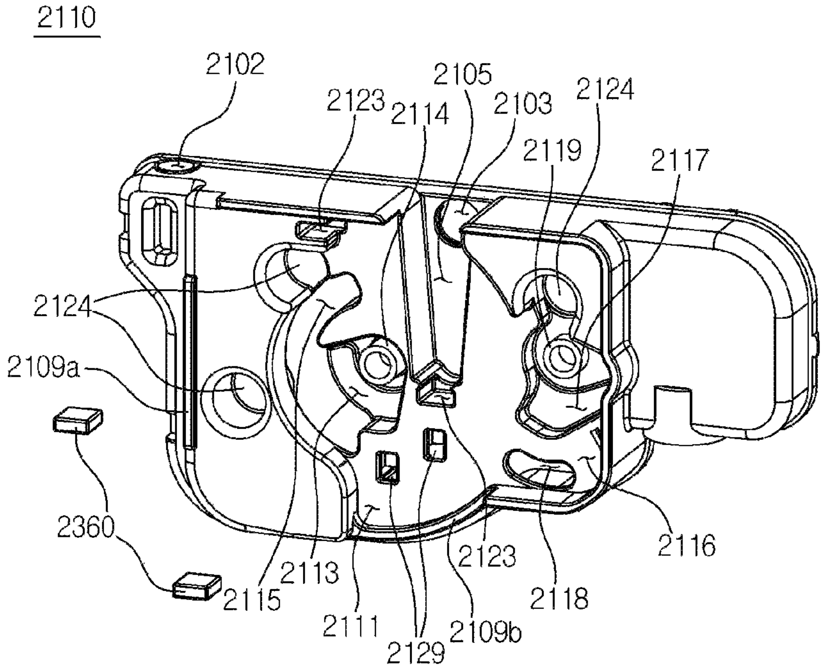
FIG. 3 is a front perspective view of a first housing of a motorized vehicle door latch with emergency release according to a first preferred embodiment of the present invention.
Figure 4:
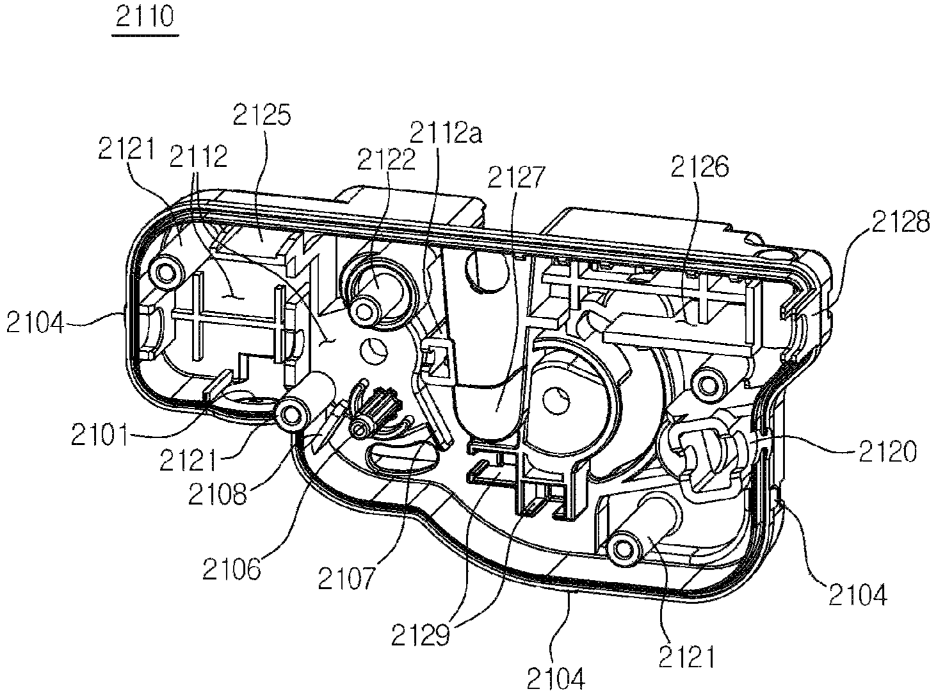
FIG. 4 is a rear perspective view of a first housing of a motorized vehicle door latch with emergency release according to a first preferred embodiment of the present invention.

The first housing 2110 is illustrated in detail in FIGS. 3 to 4.

A sealing member 2140 is disposed between the rear circumference of the first housing 2110 and the front circumference (edge) of the third housing 2150 to prevent the driving unit from being damaged by water.

As illustrated in FIG. 1, a striker insertion groove 2105 into which a striker (not shown) connected to the vehicle body is inserted is formed at the upper portion and front side of the housing. The striker insertion groove 2105 is formed in a way that the upper side and front side thereof are open and the rear side thereof is blocked.

Therefore, the striker insertion groove 2105 formed in the first housing 2110 is formed in a groove shape, and the striker insertion groove 2105 formed in the second housing 2130 is formed in the shape of a hole being penetrated through the front-rear direction.

As illustrated in FIG. 3, the first housing 2110 is formed in the shape of a plate.

The first housing 2110 is formed with a latch installation groove 2111 in which a latch 2200, which will be described later, is installed, and a pivoting member installation groove 2116 in which a pivoting member 2370 is installed.

The first housing 2110 may be formed of a plastic material and molded by injection. Due to this, manufacturing of the device can be facilitated.

The latch installation groove 2111 is formed in a way that the front side thereof is open and the rear side thereof is blocked, so that assembly of parts is easy. The front side of the latch installation groove 2111 is covered by the second housing 2130 during assembly.

The upper portion of the latch installation groove 2111 is in communication with the striker insertion groove 2105.

Furthermore, a spring insertion groove 2113 is formed in the front side of the first housing 2110.

The spring insertion groove 2113 is disposed at the rear side of the latch installation groove 2111 and in communication with the latch installation groove 2111. The spring insertion groove 2113 is formed in the shape of a fan, and a first return spring 2250, which will be described later, is inserted into the spring insertion groove 2113, so that another end 2253 of the first return spring 2250 may be rotated together with the latch 2200.

In the spring insertion groove 2113, a latch boss 2114 is formed protruded toward the front side, and a latch pivoting shaft 2230, which will be described later, is installed in the latch boss 2114.

The first housing 2110 is formed with a sensor transmission member insertion portion 2129 into which a third sensor transmission member 2911 and a fourth sensor transmission member 2912, which will be described later, are inserted to communicate with the latch installation groove 2111. The sensor transmission member insertion portion 2129 is disposed under the striker insertion groove 2105. The sensor transmission member inserting portion 2129 is formed in a way that the rear side thereof is open, and comprises a groove that penetrates in the front-rear direction.

In the first housing 2110, an engaging portion guide groove 2115 is formed through the front-rear side so as to communicate with the spring insertion groove 2113 and the latch installation groove 2111.

The engaging portion guide groove 2115 is formed in the shape of an arc around the spring insertion groove 2113 and the latch installation groove 2111.

The pivoting member installation groove 2116 is disposed on the right side of the latch installation groove 2111. The front side of the pivoting member installation groove 2116 is formed in a way that the front side thereof is open and the rear side thereof is blocked, so that assembly of parts is easy. The front side of the pivoting member installation groove 2116 is covered by the second housing 2130 during assembly.

The left side of the pivoting member installation groove 2116 is in communication with the right side of the latch installation groove 2111.

Furthermore, a spring insertion groove 2117 is formed in the front side of the first housing 2110.

The spring insertion groove 2117 is disposed at the rear side of the pivoting member installation groove 2116 and in communication with the pivoting member installation groove 2116.

The upper portion of the spring insertion groove 2117 is shaped like an egg, and the lower portion is formed to be protruded toward the left side and the lower portion.

A pivoting member spring 2390, which will be described later, is inserted into the spring insertion groove 2117 so that a second bent portion 2393 of the pivoting member spring 2390 can be rotated together with the pivoting member 2370.

In the spring insertion groove 2117, a latch pivot boss 2119 is formed protruded toward the front side, and a pivoting shaft 2380, which will be described later, is installed in the latch pivot boss 2119.

At the right side of the first housing 2110, a pivoting member engaging portion through hole 2118 is formed. The pivoting member engaging portion through hole 2118 is formed in the shape of a circular arc extending in the left-to-right direction, and is formed to penetrate in the front-to-rear direction.

The pivoting member engaging portion through hole 2118 is disposed at the lower portion of the spring insertion groove 2117 and in communication with the pivoting member installation groove 2116.

In the middle and upper portions of the first housing 2110, bumper member insertion grooves 2123 into which bumper members 2360 are respectively inserted are formed to be in communication with the striker insertion grooves 2105 or the latch installation grooves 2111.

The front side and upper portion of the bumper member insertion groove 2123 disposed in the middle are opened, and the upper portion of the bumper member insertion groove 2123 is in communication with the striker insertion groove 2105.

The bumper member insertion groove 2123 disposed at the upper portion has an open front side, and the right side portion thereof is in communication with the latch installation groove 2111.

The bumper member 2360 disposed at the middle may prevent an impact or noise caused by contact with the first housing 2110 when the striker is inserted into the striker insertion groove 2105.

The bumper member 2360 disposed at the upper portion may prevent an impact or noise caused by contact with the first housing 2110 when the latch 2200 is rotated to be in an open state.

On the left, right, and upper sides of the first housing 2110, a second housing engaging portion 2109*a* that is engaged with the left surface of the second housing 2130, which will be described later, is formed protruded toward the front side.

A second housing fitting groove 2109*b* into which the lower portion of the second housing 2130 is fitted is formed in the center lower portion of the first housing 2110 to be recessed toward the rear side.

By the second housing engaging portion 2109*a* and the second housing fitting groove 2109*b*, the second housing 2130 is installed in the first housing 2110 so as not to be flowed in an up-and-down and a left-to-right directions.

The edge of the first housing 2110 is formed protruded toward the rear side, and a space is also formed on the rear side of the first housing 2110.

In the upper left portion of the edge of the first housing 2110, a third housing coupling groove 2102 where a bolt for coupling with a third housing 2150, which will be described later, is installed is formed penetrating through the up-and-down direction.

On the right side of the edge of the first housing 2110, a door latch connection portion fitting portion 2128, to which a door latch connection portion 30, which will be described later, is installed, is formed protruded toward the rear side.

A door latch key installation groove 2101 in which a door latch key 2630, which will be described later, is installed, is formed penetrating through the up-and-down direction on the lower right portion of the edge of the first housing 2110.

The door latch key 2630 may be operated from the outside of the motorized latch 2000 through the door latch key installation groove 2101.

A motor installation portion 2112 on which a motor 2610, which will be described later, is installed, is formed on the upper right portion of the rear side of the first housing 2110. A groove is formed in the right side and middle portion of the motor installation portion 2112 so that the shaft of the motor 2610 can be fitted.

A motor shaft fitting portion 2112*a* is formed on the left side of the motor installation portion 2112 so that an end portion of the shaft of the motor 2610 can be fitted.

In the rear right side of the first housing 2110, a first guide portion 2125 is formed protruded toward the rear side. The first guide portion 2125 is disposed at the upper portion of the motor installation portion 2112. The lower surface of the first guide part 2125 is in contact with the upper surface of a safety member 2400, which will be described later, and guides sliding of the safety member 2400 in the left-to-right direction.

On the rear right side of the first housing 2110, a shaft 2106, a first open lever guide portion 2107, and a second open lever guide portion 2108 are formed protruded toward the rear side.

The shaft 2106 is disposed on the lower left portion of the motor installation portion 2112.

The shaft 2106 is fitted with an open lever 2350, which will be described later.

The first open lever guide portion 2107 is disposed at the lower left portion of the shaft 2106, and the second open lever guide portion 2108 is disposed at the lower right portion of the shaft 2106.

The first and second open lever guide portions 2107 and 2108 are disposed within a rotation radius of the open lever 2350 so that the open lever 2350 can be rotated within a predetermined range when it is rotated around the shaft 2106.

A connection unit cover installation portion 2126 in which a connection unit cover 2800, which will be described later, is installed, is formed on a rear left upper portion of the first housing 2110.

A plurality of protrusions are formed in the upper portion of the connection unit cover installation portion 2126, so that the connection unit cover 2800 can be easily inserted. The right side of the connection unit cover installation portion 2126 is blocked by the left side surface of a second guide portion 2127, which will be described later, and the left side is formed protruded toward the rear side, so that the connection unit cover 2800 is prevented from flowing out in the left-to-right direction.

In the lower left portion of the rear surface of the first housing 2110, a cinching connection portion 2120 in which a cinching connection portion 2520, which will be described later, is installed, is protrudedly formed. A groove through which a fixing portion 2522 of the cinching connection portion 2520 can be fitted is formed on the rear side of the cinching connection portion 2120.

The second guide portion 2127 is protrudedly formed in the center of the rear surface of the first housing 2110. The second guide portion 2127 is disposed just at the right side of the connection unit cover installation portion 2126. The second guide portion 2127 is formed to correspond to the shape of the striker insertion groove 2105. The second guide portion 2127 is disposed just at the left side of the motor shaft fitting portion 2112*a*.

In the upper portion of the second guide portion 2127, an emergency lever installation groove 2103 is formed penetrating through the front-to-rear direction. The emergency lever installation groove 2103 is in communication with the striker insertion groove 2105.

The front side of an emergency lever 2780, which will be described later, is inserted into the emergency lever installation groove 2103, and a user can operate the emergency lever 2780 through the striker insertion groove 2105.

A third housing fitting portion 2104 that can be coupled with the third housing 2150 is formed protruded in the left and right and bottom surfaces of the first housing 2110.

A first fastening portion 2121 formed on the first housing 2110 is formed in a boss shape and is formed protruded toward the rear side. A bolt is fastened to the hole formed in the first fastening portion 2121 and the front side is blocked. The rear end of the first fastening portion 2121 is formed protruded toward the rear side than the edge of the first housing 2110. A thread is formed on the inner circumferential surface of the first fastening portion 2121 when assembling the bolt. The first fastening portion 2121 is disposed at both sides of the upper portion and the lower portion of the first housing 2110, respectively.

A guide boss 2122 is formed protruded toward the rear side in the upper right portion of the first housing 2110. The guide boss 2122 is disposed between the first guide portion 2125 and the second guide portion 2127. The guide boss 2122 is inserted into the through hole of a worm gear 2614, which will be described later.

Figure 5:
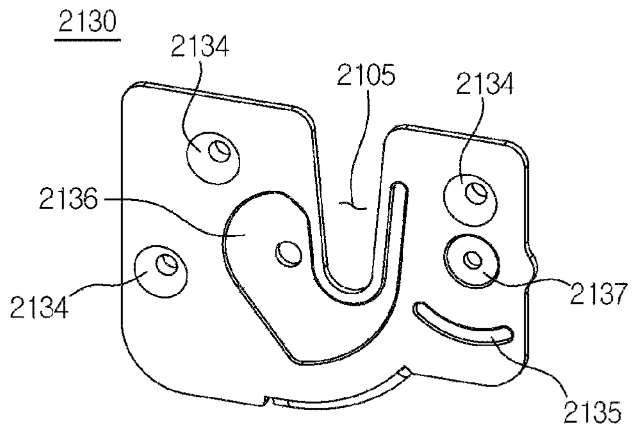
FIG. 5 is a front perspective view of a second housing of a motorized vehicle door latch with emergency release according to a first preferred embodiment of the present invention.
Figure 6:
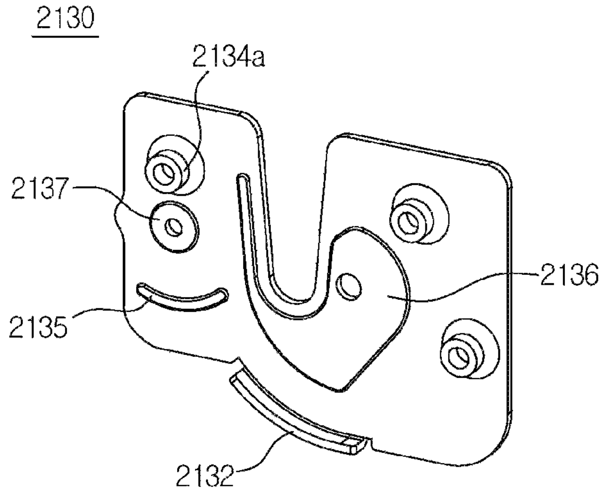
FIG. 6 is a rear perspective view of a second housing of a motorized vehicle door latch with emergency release according to a first preferred embodiment of the present invention.

The second housing 2130 is illustrated in detail in FIGS. 5 to 6.

The second housing 2130 is formed in the shape of a plate.

In the second housing 2130, a shaft insertion hole into which the latch pivoting shaft 2230 provided in the form of a rivet is inserted, is formed penetrating through the front-to-rear direction.

A first protruding portion 2135, a second protruding portion 2136, and a third protruding portion 2137 are formed in the second housing 2130 to be recessed from the front side to the rear side around the shaft insertion hole. The first protruding portion 2135, the second protruding portion 2136 and the third protruding portion 2137 are protruded toward the rear side than the bottom portion of the rear surface of the second housing 2130.

The first protruding portion 2135 is in contact with the front surface of a pivoting member 2370, which will be described later. Therefore, when assembling, the pivoting member 2370 is not flowed along the front-to-rear direction, and at the same time, the friction between the pivoting member 2370 and the second housing 2130 can be minimized. The first protruding portion 2135 is formed in the shape of an arc. The first protruding portion 2135 is formed to be curved along the front side direction of the pivoting member 2370.

The second protruding portion 2136 is formed along the circumference of the shaft insertion hole and the striker insertion groove 2105 to contact the front surface of the latch 2200. Therefore, when assembling, the latch 2200 is not flowed along the front-to-rear direction, and at the same time, friction between the latch 2200 and the second housing 2130 can be minimized.

The third protruding portion 2137 is formed in the shape of a circle, and is disposed at the right side of the second protruding portion 2136. In the third protruding portion 2137, a rivet insertion hole through which a pivoting shaft 2380 is inserted, is formed penetrating through the front-to-rear direction.

In the lower portion of the second housing 2130, a fourth protruding portion 2132 installed in the second housing fitting groove 2109*b* of the first housing 2110 is formed protrudedly in the shape of an arc toward the rear side.

A plurality of door installation portions 2124 and 2134 are formed on the front surface of the first housing 2110 and the second housing 2130 for bolt coupling of the motorized latch 2000 with the vehicle door. The door installation portions 2124 and 2134 are disposed at the lower left portion of the first housing 2110 and the second housing 2130 and the right side of the striker insertion groove 2105, respectively. The door installation portion 2124 formed in the first housing 2110 is formed in the shape of a groove recessed toward the rear side, and the door installation portion 2134 formed in the second housing 2130 is formed in the shape of a hole being penetrated through the front-to-rear direction.

Furthermore, in the rear surface of the second housing 2130, an installation boss 2134*a* is formed protruded toward the rear side. The installation boss 2134*a* is inserted into the door installation portion 2124 of the first housing 2110. The installation boss 2134*a* is formed to surround the door installation portion 2134 formed in the second housing 2130. A thread is formed in the inner wall of the installation boss 2134*a*.

Due to this, the motorized latch 2000 can be easily and securely installed in the vehicle door.

In the second housing 2130, a cut off portion corresponding to the striker insertion groove 2105 is formed in a way that the front side of the striker insertion groove 2105 is open.

Figure 7:
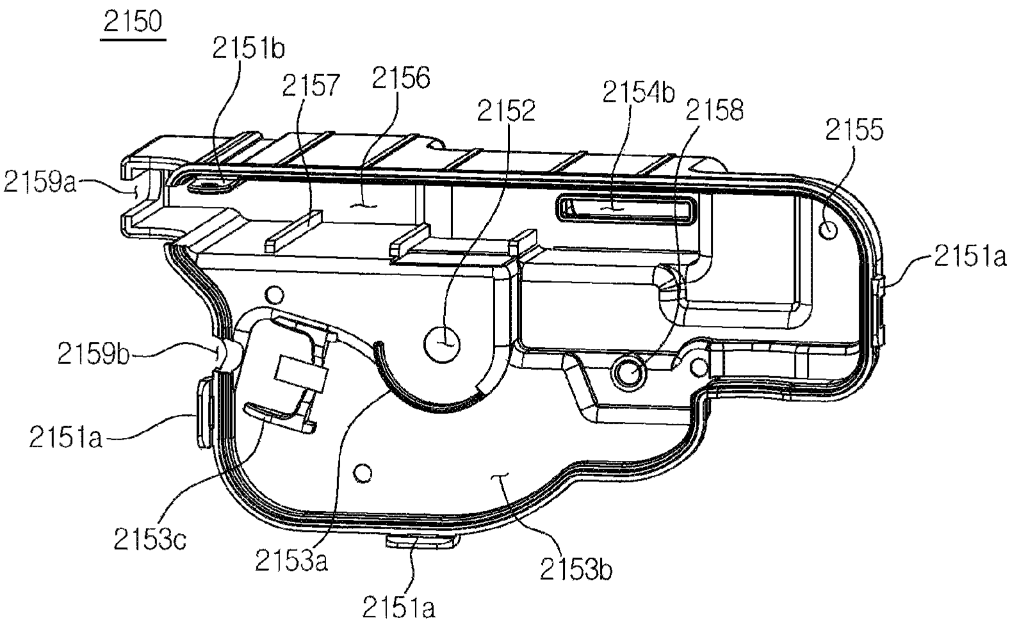
FIG. 7 is a front perspective view of a third housing of a motorized vehicle door latch with emergency release according to a first preferred embodiment of the present invention.
Figure 8:
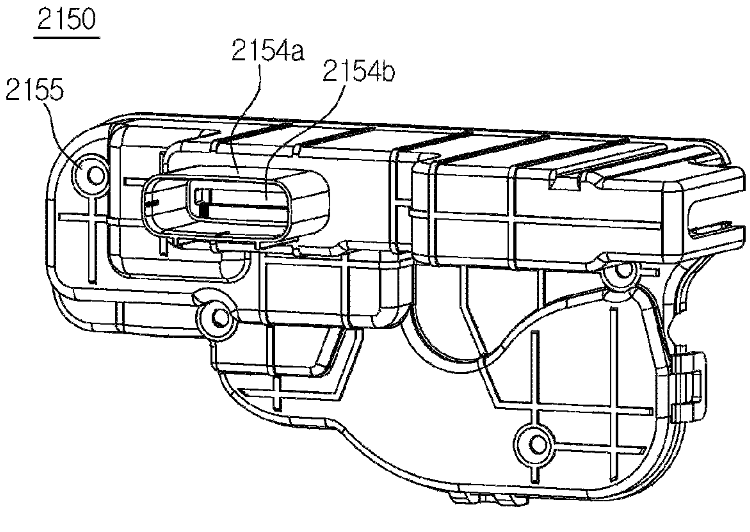
FIG. 8 is a rear perspective view of a third housing of a motorized vehicle door latch with emergency release according to a first preferred embodiment of the present invention.

The third housing 2150 is illustrated in detail in FIGS. 7 to 8.

The third housing 2150 is formed in the shape of a plate with an edge protruding toward the front side and a space formed on the front surface. The space of the third housing 2150 is formed in a way that the front side thereof is open.

The third housing 2150 covers the rear surface of the first housing 2110, which is the opposite surface of the surface on which the latch 2200 is installed. That is, the second housing 2130 is coupled to the front surface of the first housing 2110, and the third housing 2150 is coupled to the rear surface of the first housing 2110.

The third housing 2150 is bolt-coupled to the rear surface of the first housing 2110.

First and second fastening portions 2121 and 2155 for bolt-coupling are formed on the rear surface of the first housing 2110 and the third housing 2150, respectively.

The second fastening portion 2155 formed in the third housing 2150 is formed in the shape of a through hole penetrated through the front-to-rear direction. The second fastening portion 2155 is disposed to correspond to the first fastening portion 2121 and assembled with the first fastening portion 2121.

A fifth protruding portion 2153*a* is formed protruded toward the front side in a central portion of the third housing 2150.

The fifth protruding portion 2153*a* is curvedly formed along the rotating direction of a lever 2530. At the rotation center of the fifth protruding portion 2153*a*, a latch pivoting shaft insertion groove 2152 is formed to penetrate in the front-to-rear direction.

The rear side of the latch pivot shaft 2230 is inserted into the latch pivoting shaft insertion groove 2152.

Below the fifth protruding portion 2153*a*, a lever guide portion 2153*b* is disposed left and right. The lever guide portion 2153*b* is formed recessed from the front side toward the rear side.

In the left side of the lever guide portion 2153*b*, a connection portion installation portion 2153*c* is installed.

In the lever guide portion 2153*b*, a coupling member insertion portion 2531 of the lever 2530 and the lower portion of an open plate 2300, which will be described later, are inserted, and the fixing portion 2522 of the cinching connection portion 2520 is installed in the connection portion installation portion 2153*c*.

A connection unit cover installation groove 2156 is formed in an upper portion of the third housing 2150. The connection unit cover installation groove 2156 is formed in a way that the front side thereof is open.

A connection unit cover support portion 2157 is formed protrudedly in the upper and lower portion of the connection unit cover installation groove 2156. Due to the connection unit cover support portion 2157, friction is minimized when a connection unit cover 2800 is installed in the connection unit cover installation groove 2156 or when it is operated, thereby enhancing product performance.

The connection unit cover support portion 2157 formed in the lower portion fixes the connection unit cover 2800, prevents the separation of the open plate 2300 and the safety member 2400, and guides sliding in the left-to-right direction. The rear side of the connection unit cover installation groove 2156 is blocked, so that the connection unit cover 2800 is not flowed to the rear side.

In the center of the third housing 2150, a first housing insertion groove 2158 into which the shaft 2106 of the first housing 2110 is inserted, is formed recessed toward the rear side.

In the upper and lower portions of the upper left side of the third housing 2150, connection portion penetrating grooves 2159*a* and 2159*b* are formed in a way that the front side and the left-to-right direction thereof are open.

A door lever connection portion 40, a door key connection portion 50, and an outer door connection portion 60 are installed in the connection portion penetrating groove 2159*a* of the upper portion. The connection portion penetrating groove 2159*a* of the upper portion is in communication with the connection unit cover installation groove 2156.

A cinching connection portion 2520 is installed in the connection portion penetrating groove 2159*b* of the lower portion. The connection portion penetrating groove 2159*b* of the lower portion is in communication with the lever guide portion 2153*b*.

In the rear side upper portion of the third housing 2150, a wire connection portion 2154*a* is formed protruded toward the rear side. The wire connecting portion 2154*a* is formed, on the whole, in the shape of a hollow rectangle with rounded corners. In the central portion of the connection portion 2154*a*, a wire penetrating groove 2154*b* is formed penetrating through the front-to-rear direction. The wires are introduced into the third housing 2150 from the outside through the wire penetrating groove 2154*b*.

A first housing fitting portion 2151*a* that can be fitted to the third housing fitting portion 2104 of the first housing 2110 is formed on the left, right and lower surfaces of the third housing 2150. The first housing fitting portion 2151*a* is formed in the shape of a ring. Due to this, the first housing fitting portion 2151*a* and the third housing fitting portion 2104 are fit-coupled. The first housing 2110 and the third housing 2150 can be easily coupled without bolt-coupling.

A first housing fastening portion 2151*b*, which is coupled with the third housing fastening groove 2102 of the first housing 2110, is formed protruded toward the front side in the left side of the upper surface of the third housing 2150.

In the first housing fastening portion 2151*b*, a groove is formed penetrating through up-and-down direction, and the groove of the first housing fastening portion 2151*b* is in communication with the third housing fastening groove 2102 of the first housing 2110.

Due to this, the first housing 2110 and the third housing 2150 are more securely assembled.

In the rear surface of the third housing 2150, ribs are formed in the shape of a grid. Because of this, the rigidity and durability of the third housing 2150 may be enhanced.

<Latch>

Figure 9:
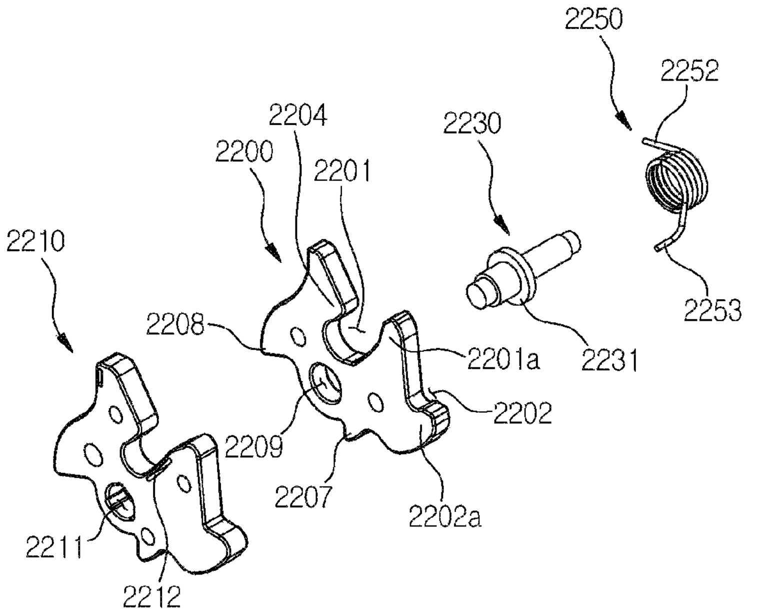
FIG. 9 is an exploded front perspective view of a latch of a motorized vehicle door latch with emergency release according to a first preferred embodiment of the present invention.

The latch 2200 is illustrated in detail in FIG. 9.

The latch 2200 is installed in the first housing 2110 to be disposed inside the latch installation groove 2111.

The latch 2200 is pivotally installed in the first housing 2110 through the latch pivoting shaft 2230 installed in the first housing 2110, the second housing 2130, and the third housing 2150.

The latch 2200 is formed in the shape of a plate.

In the center of the latch 2200, a latch groove 2209 into which the latch pivoting shaft 2230 is inserted, is formed penetrating through the front-to-rear direction.

A locking groove 2201 is formed in the outer circumferential surface of the latch 2000.

The locking groove 2201 is formed penetrating through the front-to-rear direction with the right upper portion thereof is open.

In the right side of the locking groove 2201, a second locking engaging portion 2201*a* is formed on which a locking portion 2371 of the pivoting member 2370 is engaged.

In the latch 2200, a striker engaging protrusion 2204 to which the striker is engaged, is formed.

The right side surface of the striker engaging protrusion 2204 is formed in a way that a central portion thereof is protruded toward the right and curvedly. The locking groove 2201 is located in the lower portion of the central portion.

Due to this, the striker can be smoothly inserted into the locking groove 2201 along the slope of the striker engaging protrusion 2204. In addition, when the striker is inserted into the locking groove 2201, it is difficult to slip out upward due to the protruding portion of the striker engaging protrusion 2204.

An auxiliary locking groove 2202 is formed on the right side of the locking groove 2201 in the latch 2200.

The auxiliary locking groove 2202 is formed between the first locking engaging portion 2202*a* and the second locking engaging portion 2201*a* on which the locking portion 2371 is engaged.

The auxiliary locking groove 2202 is formed in a shape similar to the locking groove 2201, but is formed to have a shallower depth than the locking groove 2201. That is, the distance between the rotating center of the auxiliary locking groove 2202 and the latch 2200 is formed longer than the distance between the rotating center of the locking groove 2201 and the latch 2200.

The locking groove 2201 and the auxiliary locking groove 2202 are disposed spaced apart along the circumferential direction.

When the vehicle door is closed, the locking portion 2371 of the pivoting member 2370 is first inserted into the auxiliary locking groove 2202 and secondly inserted into the locking groove 2201.

A spring fitting portion 2207 is formed in the lower portion of the outer circumferential surface of the latch 2200.

The spring fitting portion 2207 is formed in the shape of a protrusion, and the other end 2253 of the first return spring 2250 may be engaged with the spring fitting portion 2207 and rotated together with the latch 2200.

In the left outer circumferential surface of the latch 2200, a protrusion 2208 is formed protruding outward.

The protrusion 2208 is disposed at the front side of the engaging portion guide groove 2115.

A latch engaging portion 2532 of the lever 2530, which will be described later, is fitted to the lower portion of the protrusion 2208, so the latch 2200 can be rotated by the latch engaging portion 2532.

When the vehicle door of the latch 2200 is closed, the locking groove 2201, the auxiliary locking groove 2202, the spring fitting portion 2207, and the protrusion 2208 are sequentially disposed along the rotating direction (clockwise direction).

The latch 2200 is surrounded by an elastic cover 2210.

The elastic cover 2210 may be covered over the outer surface of the latch 2200 through insert injection. The elastic cover 2210 is formed of a material having elasticity, such as rubber, to absorb impact applied to the latch 2200 and to prevent noise.

The elastic cover 2210 wraps the rest of the latch 2200 except for a portion of the first locking engaging portion 2202*a* and the second locking engaging portion 2201*a* and the portion which is in contact with the first return spring 2250.

In the center of the elastic cover 2210, an elastic cover groove 2211 into which the latch pivoting shaft 2230 is inserted, is formed penetrating through the front-to-rear direction.

In the center of the elastic cover 2210, an elastic cover groove 2211 into which the latch pivoting shaft 2230 is inserted, is formed penetrating through the front-to-rear direction.

A plurality of auxiliary grooves being recessed toward a diameter direction is formed in the circumference of the elastic cover groove 2211.

Due to this, when the elastic cover 2210 is rotated, the frictional force generated between the elastic cover 2210 and the latch pivoting shaft 2230 is reduced. In addition, the lubricant (grease) can be accommodated in the auxiliary groove of the elastic cover groove 2211 for a long time, thereby enhancing the performance.

A slit 2212 is formed in the elastic cover 2210. The slit 2212 is formed in a portion in contact with the bumper member 2360 disposed in the upper portion of the first housing 2110 and a portion in contact with the striker. Due to the slit 2212, the impact may be alleviated when the latch 2200 comes into contact with another member.

The first return spring 2250 is provided so that the latch 2200 is automatically returned when unlocking.

One end 2252 and the other end 2253 of the first return spring 2250 are formed to correspond to the shape of the assembly. One end 2252 is extended toward the left side, and the other end 2253 is bent at a right angle toward the front side.

One end 2252 of the first return spring 2250 is engaged with the upper portion of the spring insertion groove 2113 of the first housing 2110, the coil part is inserted into the latch pivoting shaft 2230, and the other end 2253 is engaged with the left side of the spring fitting portion 2207 of the latch 2200.

The assembly property is further improved by one end 2252 and the other end 2253 of the first return spring 2250.

When the latch 2200 rotates, the other end 2253 of the first return spring 2250 is rotated together with the latch 2200.

An engaging plate 2231 is formed in the middle of the latch pivoting shaft 2230 to be fitted to the latch 2200 and the first return spring 2250.

The latch 2200 is inserted into the front side of the engaging plate 2231, and the first return spring 2250 is inserted into the rear side of the locking plate 2231, so that when the latch 2200 is rotated, the front surface of the first return spring 2250 is not in friction with the rear surface of the latch 2200.

The first housing 2110 and the lever 2530 are inserted into the rear side of the first return spring 2250.

The diameters of the front end and the rear end of the latch pivoting shaft 2230 are formed to be smaller than the diameters of other portions of the latch pivoting shaft 2230. The front end of the latch pivoting shaft 2230 is fitted to the second housing 2130, and the rear end of the latch pivoting shaft 2230 is fitted to a reinforced plate 2340, which will be described later.

That is, in the latch pivoting shaft 2230, a second housing 2130, the latch 2200, the first return spring 2250, the first housing 2110, the lever 2530, and the reinforced plate 2340 are installed in order from the front side.

<Pivoting Member>

Figure 10:
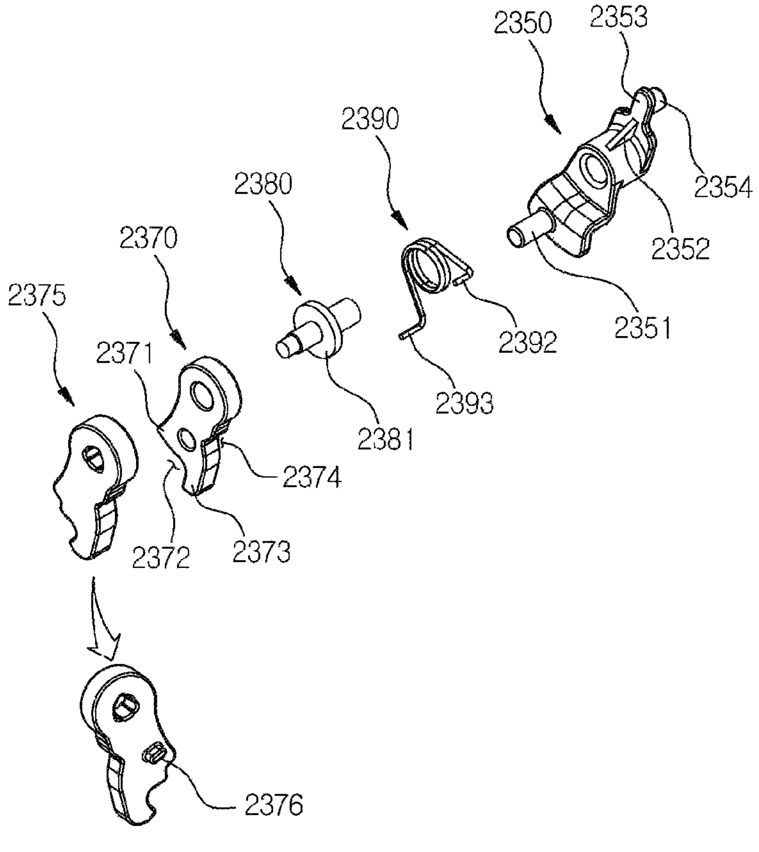
FIG. 10 is a front exploded perspective view of a pivoting member of a motorized vehicle door latch with emergency release according to a first preferred embodiment of the present invention.

The pivoting member 2370 is illustrated in detail in FIG. 10. The pivoting member 2370 is also called a Pawl.

The pivoting member 2370 is interlocked with the open lever 2350.

The pivoting member 2370 is disposed on the front side of the first housing 2110, and is pivotally installed in the second housing 2130 by the pivoting shaft 2380 disposed toward the front-to-rear direction.

The pivoting member 2370 is composed of a locking portion 2371 and an engaging protrusion 2373.

The locking portion 2371 is formed protruded toward the left side of the pivoting member 2370.

The locking portion 2371 serves to arrest (locking) the position of the latch 2200 so that the closed state of the vehicle door is maintained.

In the lower portion of the locking portion 2371, a latch insertion groove 2372 into which the end of the latch 2200 and the auxiliary locking groove 2202 are inserted when the vehicle door is closed, is formed. The latch insertion groove 2372 is formed in a way that the lower portion thereof is open, and is disposed between the locking portion 2371 and the engaging protrusion 2373. Due to the latch insertion groove 2372, the state in which the latch 2200 is locked to the pivoting member 2370 when the vehicle door is closed, is maintained stably.

In the lower right side of the lower surface of the locking portion 2371, the engaging protrusion 2373 protruded toward lower side is formed.

In the left side of the locking protrusion 2373, the pivoting member engaging portion 2351 of the open lever 2350 is inserted. That is, the locking protrusion 2373 plays the role of pivoting the pivoting member 2370 according to the rotation of the open lever 2350.

The pivoting member 2370 is rotated in conjunction with the open lever 2350 when it is rotated and moved.

In addition, the pivoting member 2370 is provided with an elastic cover 2375 like the latch 2200 as described previously. The elastic cover 2375 is formed of a material having elasticity, such as rubber, so as to absorb an impact applied to the pivoting member 2370 and prevent noise. The elastic cover 2375 is formed to surround the remaining portion except for the locking portion 2371 of the pivoting member 2370.

In the upper portion of the elastic cover 2375 of the pivoting member 2370, a groove into which the pivoting shaft 2380 is inserted, is formed penetrating through the front-to-rear direction, and an auxiliary groove is recessedly formed in the groove in the radius direction. Due to this, when the elastic cover 2375 is pivoted, the frictional force generated between the elastic cover 2375 and the pivoting shaft 2380 is reduced. In addition, due to the auxiliary groove, a lubricant (grease) can be accommodated in the auxiliary groove for a long time, thereby enhancing the performance.

On the rear side of the elastic cover 2375, a cover protrusion 2376 being inserted into the spring insertion groove 2117 of the first housing 2110 is formed.

Due to the cover protrusion 2376, the elastic cover 2375 and the pivoting member 2370 are not flowed more to the left side than the spring insertion groove 2117.

The pivoting shaft 2380 is installed in a way to penetrate the pivoting member 2370 and the upper portion of the elastic cover 2375.

An engaging plate 2381 is formed in the middle of the pivoting shaft.

The pivoting member 2370 is inserted into the front side of the engaging plate 2321, and the pivoting member spring 2390 is inserted into the rear side of the engaging plate 2321, so that the front surface of the pivoting member spring 2390 is not in friction with the rear surface of the pivoting member 2370 when the pivoting member 2370 is rotated.

The first housing 2110 is inserted into the rear side of the pivoting member spring 2390.

The diameter of the front end of the pivoting shaft 2380 is formed smaller than the diameter of other portions of the pivoting shaft 2380. The front end of the pivoting shaft 2380 is fitted to the second housing 2130, and the rear end of the pivoting shaft 2380 is fitted to the reinforced plate 2340.

That is, in the pivoting shaft 2380, the second housing 2130, the pivoting member 2370, the pivoting member spring 2390, the first housing 2110, and the reinforced plate 2340 are installed in order from the front side.

The pivoting member 2370 is pivotable in a clockwise or counterclockwise direction around the pivoting shaft 2380.

In addition, the pivoting member spring 2390 for returning the pivoting member 2370 may be provided.

The pivoting member spring 2390 is also provided as a coil spring, like the first return spring 2250, and first and second bent portions 2392 and 2393 bent to correspond to the shape of the assembly portion at both ends. The first bent portion 2392 and the second bent portion 2393 are bent at a right angle toward the front side.

The first bent portion 2392 of the pivoting member spring 2390 is engaged with the upper portion of the spring insertion groove 2117 of the first housing 2110, and the second bent portion 2393 is engaged with the spring fitting portion 2374 being formed in the right side of the pivoting member 2370, thereby being connected. The coil portion of the pivoting member spring 2390 is fitted to the pivoting shaft 2380.

The spring fitting portion 2374 may be formed in the shape of a groove or a hole. In this embodiment, the spring fitting portion 2374 is formed in the shape of a groove.

The pivoting member spring 2390 plays the role of applying a force to the pivoting member 2370 to push it in the counterclockwise direction and releasing it, thereby giving an elastic force enabling the pivoting member 2370 to be pivoted in the clockwise direction and returned to its original position.

<Open Lever>

The open lever 2350 is illustrated in detail in FIG. 10.

The open lever 2350 is rotatably installed in the shaft 2106 formed in the rear surface of the first housing 2110. That is, the open lever 2350 is installed in the opposite side of the surface where the latch 2200 is installed in the first housing 2110.

The open lever 2350 is formed in the shape of a plate.

The open lever 2350 is formed in a way that the lower side thereof is formed in the shape of a staircase that is bent toward the front side, and upper side thereof is formed in the shape of a staircase that is bent toward the rear side, centered around the portion where the hole to be fitted to the shaft 2106 is formed.

In the front surface of the open lever 2350, a pivoting member engaging portion 2351 that is in contact with the left side of the engaging protrusion 2373 of the pivoting member 2370 is formed protruded toward the front side. The pivoting member engaging portion 2351 is exposed toward the front side of the first housing 2110 through the pivoting member engaging portion through hole 2118 of the first housing 2110.

The upper portion of the open lever 2350 is formed with a reinforcement part 2352 connecting between the horizontal and vertical portions in the shape of a staircase. Due to this, the rigidity of the upper portion of the open lever 2350 is enhanced.

The upper engaging portion of the open lever 2350 is formed with an open engaging portion 2353 that engages with the first rotating engaging portion 2617 and the second rotating engaging portion 2618 of a locking member 2615, which will be described later. Due to this, when the locking member 2615 is rotated, the open lever 2350 is also rotated accordingly.

In the rear surface of the open engaging portion 2353, an open engaging protrusion 2354 being inserted into the open plate 2300 is formed protruded toward the rear side. Due to this, when the open plate 2300 is slid, the open lever 2350 is rotated accordingly.

<Cinching Module>

The cinching module 2500, as illustrated in FIGS. 1 to 2, comprises an actuator 2510, a cinching connection portion 2520 slidably installed in the actuator 2510, and a lever 2530 interlocked with the cinching connection portion 2520.

The actuator 2510 comprises a driving unit that rotates the latch 2200 so that the pivoting member 2370 locks the latch 2200. The driving unit comprises a motor (not shown) and a gear unit (not shown) rotated by the motor.

The actuator 2510 may change specifications according to a vehicle, and is installed outside the motorized latch 2000. Due to this, regardless of the specification of the actuator 2510, the motorized latch 2000 can maintain the same size, and the actuator 2510 can be easily removed according to customer demand.

Figure 11:
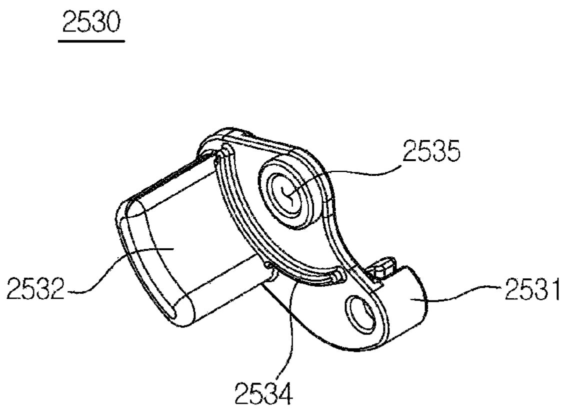
FIG. 11 is a front perspective view of a lever of a motorized vehicle door latch with emergency release according to a first preferred embodiment of the present invention.
Figure 12:
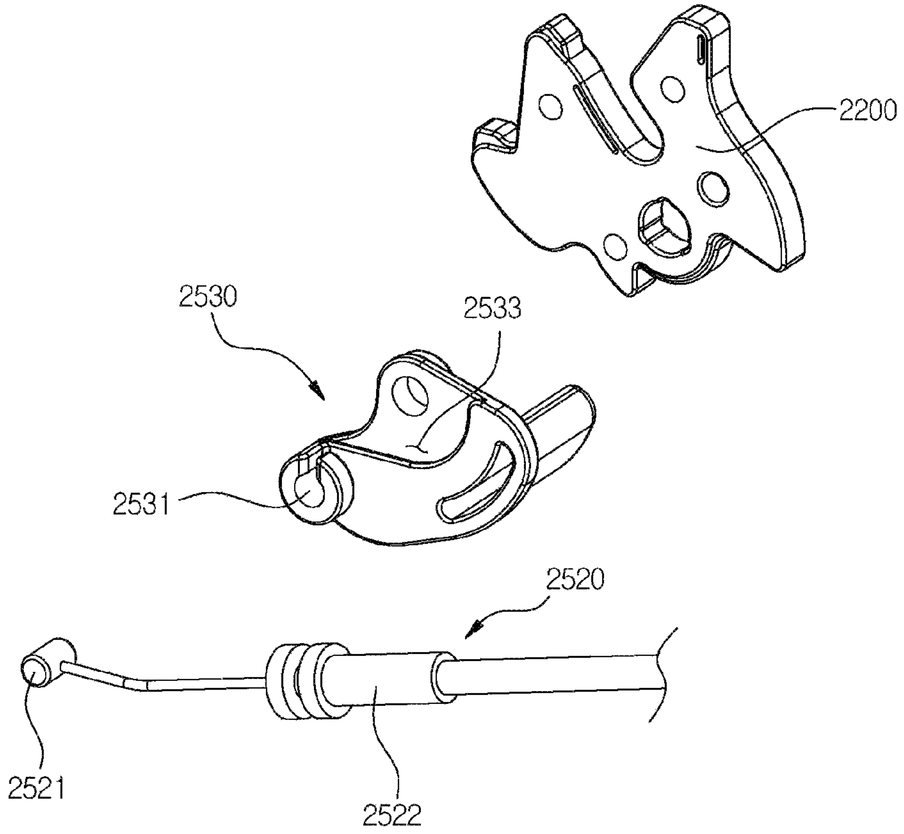
FIG. 12 is an exploded rear perspective view of a lever of a motorized vehicle door latch with emergency release according to a first preferred embodiment of the present invention.

The cinching connection portion 2520 and the lever 2530 are illustrated in detail in FIGS. 11 to 12.

The cinching connection portion 2520 is provided with a cable of a wire member such as a wire. The outer circumferential surface of the cinching connection portion 2520 is surrounded by a protective tube. One end of the cinching connection portion 2520 is connected to the actuator 2510.

On the other side of the protective tube, a fixing portion 2522 having a groove formed in the circumference thereof is formed to fit into the cinching connection portion installation portion 2120 of the first housing 2110, and supported by the a connection portion installation portion 2153*c* of the third housing 2150, thereby being fixed. At the other end of the cinching connection portion 2520, an engaging member 2521 is formed and fitted to the lever 2530, which will be described later.

Due to this, when the cinching connection portion 2520 moves, the protection tube does not move, only the cable moves.

The cinching connection portion 2520 delivers the driving force of the actuator 2510 to the lever 2530.

The relative position of the actuator 2510 with respect to the motorized latch 2000 can be freely positioned by the cinching connection portion 2520.

The lever 2530 is formed, on the whole, in the shape of a fan and is fitted into a latch pivoting shaft 2230, and the rear side of the lever 2530 is blocked by a reinforced plate 2340. The lever 2530 is disposed between the first housing 2110 and the third housing 2150.

In the lever 2530, an engaging member fitting portion 2531 into which the engaging member 2521 of the cinching connection portion 2520 is fitted, a latch engaging portion 2532 on which the protrusion 2208 of the latch 2200 is engaged, and a lever protrusion 2534 that is in contact with the rear surface of the first housing 2110 are formed.

The engaging member fitting portion 2531 is formed protruded toward the rear side in the right side of the lever 2530. The engaging member fitting portion 2531 is formed in a way that the rear side, upper portion, and left side thereof are open.

The engaging member 2521 is inserted through the upper portion of the engaging member fitting portion 2531 and is installed in a way that the cable of the cinching connection portion 2520 is placed in the left side.

The latch engaging portion 2532 is formed protruded toward the front side in the left side of the lever 2530. The latch engaging portion 2532 is formed in a way that it is formed curvedly according to the shape of the circumference of the lever 2530.

The latch engaging portion 2532 is interlocked with the actuator 2510, and the cinching stroke is controlled by the actuator 2510.

The lever protrusion 2534 is formed as a plate in the shape of an arc, so that the friction between the lever 2530 and the first housing 2110 can be minimized.

In the upper portion of the lever 2530, an insertion hole 2535 which is inserted into the latch pivoting shaft 2230 is formed so that the lever 2530 is rotated around the insertion hole 2535. The center of the insertion hole 2535 is disposed on the same line as the latch groove 2209 of the latch 2200.

Figure 14:
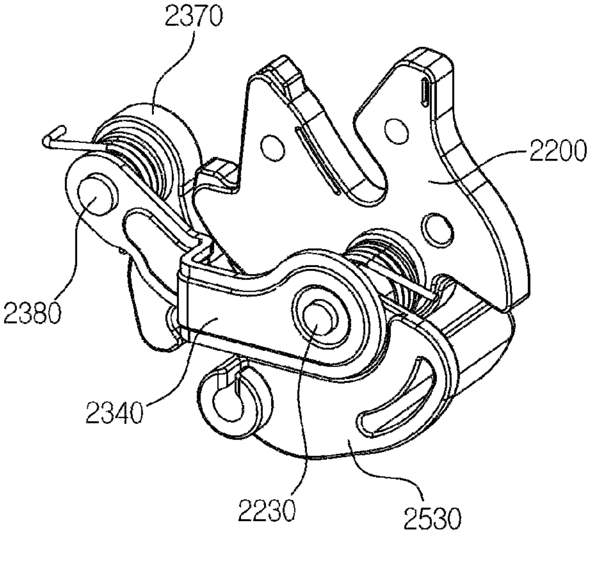
FIG. 14 is an assembly diagram of a latch, a pivoting member, a lever, and a reinforcement part of a motorized vehicle door latch with emergency release according to a first preferred embodiment of the present invention.
Figure 15:
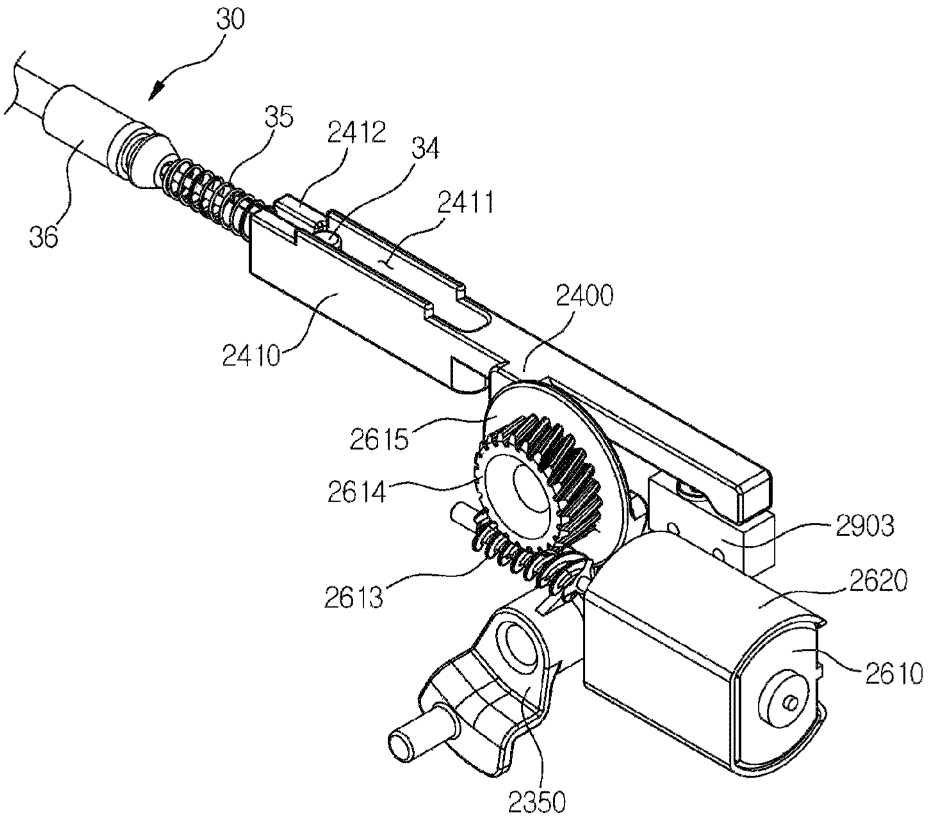
FIG. 15 is a front perspective view of a driving unit of a motorized vehicle door latch with emergency release according to a first preferred embodiment of the present invention.

In the upper portion of the rear surface of the lever 2530, as illustrated in FIG. 14, a reinforced plate installation groove 2533 into which the reinforced plate 2340, which will be described later, is fitted, is formed recessed toward the front side.

<Reinforced Plate>

Figure 13:
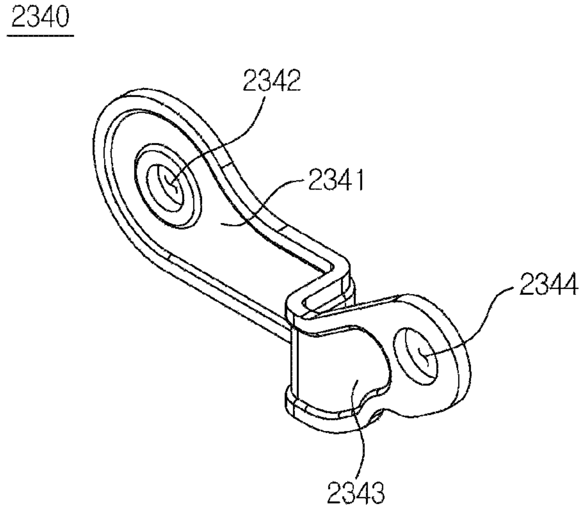
FIG. 13 is a front perspective view of a reinforced plate of a motorized vehicle door latch with emergency release according to a first preferred embodiment of the present invention.

The reinforced plate 2340 is illustrated in detail in FIGS. 13 to 14.

The reinforced plate 2340 is formed in the shape of a plate.

The reinforced plate 2340 comprises a latch pivoting shaft connection portion 2341 coupled with the latch pivoting shaft 2230 and a pivoting shaft connection portion 2343 coupled with the pivoting shaft 2380.

The pivoting shaft connection portion 2343 is bently connected to the right side of the front side of the latching shaft connection portion 2341.

In the left side of the latch pivoting shaft connection portion 2341, a latch pivoting shaft connection groove 2342 into which the latch pivoting shaft 2230 is inserted, is formed penetrating through the front-to-rear direction.

In the right side of the pivoting shaft connection portion 2343, a pivoting shaft connection groove 2344 into which the pivoting shaft 2380 is inserted, is formed penetrating through the front-to-rear direction.

Due to this reinforced plate 2340, the rear side of the latch pivoting shaft 2230 and the pivoting shaft 2380 maintains a constant distance and is stably supported.

<Driving Unit>

The driving unit is illustrated in detail in FIGS. 15 to 19.

The driving unit comprises a motor 2610, a worm gear 2614 rotated by the motor 2610, a locking member 2615 rotating simultaneously with the worm gear 2614, and a safety member 2400 inserted into the locking member 2615.

The driving unit is disposed at the upper portion of the rear side of the first housing 2110. The driving unit is disposed between the first housing 2110 and the third housing 2150.

The motor 2610 is wrapped by a motor cover 2620.

The motor cover 2620 may be provided with a rubber material.

Due to the motor cover 2620, the noise and vibration of the motor 2610 are reduced.

A worm 2613 is installed in the shaft of the motor 2610.

The worm 2613 is teeth coupled with the worm gear 2614. The worm gear 2614 is disposed at the upper portion of the worm 2613.

The worm gear 2614 and the locking member 2615 are integrally formed. The locking member 2615 is formed in the rear side of the worm gear 2614.

A safety member fitting groove 2616 into which a locking fitting portion 2403 of the safety member 2400, which will be described later, is inserted, is formed in the upper portion of the locking member 2615. In the lower portion of the locking member 2615, two rotating engaging portions with which the open engaging portions 2353 of the open lever 2350 are engaged on both sides, are formed to be spaced apart in a circumferential direction.

The rotating engaging portion comprises a first rotating engaging portion 2617 and a second rotating engaging portion 2618.

Due to the rotating engaging portion, when the locking member 2615 is rotated, the open lever 2350 is rotated in a clockwise or counterclockwise direction.

The safety member 2400 is formed, on the whole, in the shape of a rectangular bar.

In the right side of the safety member 2400, a safety member detection protrusion 2402 is formed protruded toward the lower side.

By the safety member detection protrusion 2402, the safety member 2400 is detected by the second sensor 2903 when the handle unit 1000 is withdrawn so that the door latch connection portion 30 is pulled.

In the central portion of the safety member 2400, a lock fitting portion 2403 inserted into the lock member 2615 is formed protruded toward the lower side. When the handle unit 1000 is entered and the door latch connection part 30 is in an initial state, the locking fitting portion 2403 is inserted into the safety member fitting groove 2616 of the locking member 2615, thereby preventing the locking member 2615 from being rotating toward the open direction.

A stopper installation portion 2410 is formed in the left side of the safety member 2400. The stopper installation portion 2410 is formed protrudedly further toward the lower side than the other portions of the safety member 2400.

The stopper mounting portion 2410 comprises a cover fitting portion 2401, a stopper fitting groove 2411, a stopper engaging portion 2412, and a spring fitting portion 2413.

The cover fitting portions 2401 are respectively formed protruded toward the upper side in the front and rear surfaces of the upper portion of the stopper installation portion 2410.

The cover fitting portion 2401 is inserted into the connection unit cover 2800, so that the safety member 2400 does not flow toward the front-to-rear direction, and limits the sliding width of the safety member 2400 in the left-to-right direction.

The stopper fitting groove 2411 is formed in a way that the upper portion thereof is open.

The upper portion of the stopper engaging portion 2412 is open, and the right side is formed to be in communication with the left side of the stopper fitting groove 2411. That is, the stopper engaging portion 2412 is disposed at the left side of the stopper fitting groove 2411.

The spring fitting portion 2413 is formed protruded toward the left side in the left side of the stopper installation portion 2410. A stopper spring 35 is installed in the spring fitting portion 2413, and when the door latch connection portion 30 connected to the handle unit 1000 is installed, the stopper spring 35 can be used.

A groove is formed in the spring fitting portion 2413 in a way that the upper portion thereof is open. The width of the front-to-rear direction of the groove is same as and similar to the width of the front-to-rear direction of the stopper engaging portion 2412, and the groove is in communication with the stopper engaging portion 2412.

In the rear side of the stopper installation portion 2410, an emergency block fitting protrusion 2404 in which an emergency block 2790, which will be described later, is installed, is formed protruded toward the rear side.

The emergency block fitting protrusion 2404 is formed in the shape of a cylinder.

The safety member 2400 is disposed in the upper portion of the rear side of the motor 2610.

<Open Plate>

Figure 20:
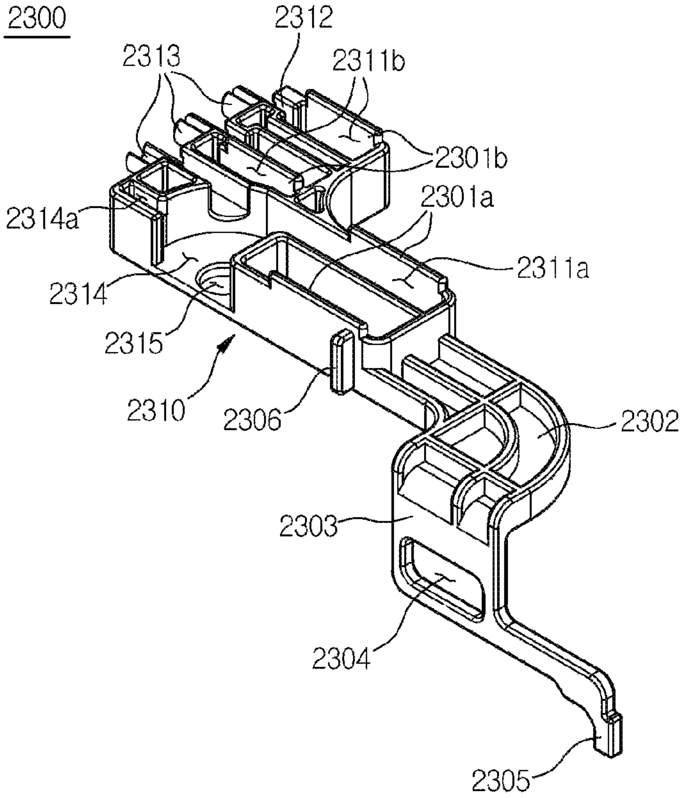
FIG. 20 is a front perspective view of an open plate of a motorized vehicle door latch with emergency release according to a first preferred embodiment of the present invention.

The open plate 2300 is illustrated in detail in FIG. 20.

In the open plate 2300, a bent portion 2302 is formed in a way that the right side thereof is bent toward the front side.

In the front side of the bent portion 2302, an open lever fitting portion 2303 is formed protruded toward the lower side.

In the open lever fitting portion 2303, an open lever fitting groove 2304 is formed penetrating through the front-to-rear direction. The width of the left-to-right direction and the up-and-down direction of the open lever fitting groove 2304 is slightly larger than the turning radius of the open lever 2350, so that the open lever 2350 may rotate within the open lever fitting groove 2304.

In the lower portion of the open lever fitting portion 2303, a door latch key engaging portion 2305 is formed protruded toward the right side.

The door latch key engaging portion 2305 is formed to be extended toward the right side and then bent toward the lower side.

The lower portion of the right side of the door latch key engaging portion 2305 is engaged with a door latch key 2630, which will be described later, and the open plate 2300 is slid left side or right side by the rotation of the door latch key 2630.

In the left side of the open plate 2300, a stopper installation portion 2310 in which a door lever connection portion 40, a door key connection portion 50, and an outer door connection portion 60 are installed, is formed.

The stopper installation portion 2310 is formed protruded further toward the upper side than the other portions of the open plate 2300.

The left side of the stopper installation part 2310 is formed protruded toward the rear side.

The stopper installation portion 2310 comprises cover fitting portions 2301*a* and 2301*b*, stopper fitting grooves 2311*a* and 2311*b*, a stopper engaging portion 2312, a spring fitting portion 2313, and a locking lever installation groove 2314.

The cover fitting portions 2301*a* and 2301*b* comprise a first cover fitting portion 2301*a* formed in the right side of the stopper installation portion 2310 and a second cover fitting portion 2301*b* formed in the left rear side of the stopper installation portion 2310.

The cover fitting portions 2301*a* and 2301*b* are formed protruded toward the upper sides of the front and rear surfaces of the stopper installation portion 2310. The cover fitting portions 2301*a* and 2301*b* are inserted into the connection unit cover 2800, so that the open plate 2300 does not flow in the front-to-rear direction, and the sliding width of the left-to-right direction of the open plate 2300 is limited.

The stopper fitting grooves 2311*a* and 2311*b* comprise: a first stopper fitting groove 2311*a* being formed in a way that the upper portion thereof is open in the first cover fitting portion 2301*a*; and a second stopper fitting groove 2311*b* being formed in a way that the upper portion thereof is open in the second cover fitting portion 2301*b*.

The outer door connection portion 60 is fitted into the first stopper fitting groove 2311*a*, and the stopper 44 of the door lever connection portion 40 and the stopper 54 of the door key connection portion 50 are fitted into the second stopper fitting groove 2311*b*, respectively.

The length of the left-to-right direction of the first and second stopper fitting grooves 2311*a* and 2311*b* is formed to be longer than the length of the stoppers 44, 54, and 64 in the left-to-right direction so that the stoppers 44, 54, and 64 can be slid in the left-to-right direction. Due to this, it is possible to actively handle the case where the cables 43, 53, and 63 are bent, thereby moving the stoppers 44, 54, and 64, or even generating a stroke error, when assembling the door lever connection portion 40, the door key connection portion 50, and the outer door connection portion 60.

The stopper engaging portion 2312 is formed in a way that the upper portion thereof is open, and the right side thereof is in communication with the left side of the first and second stopper fitting grooves 2311*a* and 2311*b*. That is, the stopper engaging portion 2312 is disposed at the left side of the first and second stopper fitting grooves 2311*a* and 2311*b*.

A cable 43 of the door lever connection portion 40, a cable 53 of the door key connection portion 50, and a cable 63 of the outer door connection portion 60 are installed on the stopper engaging portion 2312, respectively. The width of the front-to-rear direction of the stopper engaging portion 2312 is formed to be narrower than the length of the front-to-rear direction of the stopper 44, 54, and 64, so that the stoppers 44, 54, and 64 are prevented from slipping out from the fitting grooves 2311*a* and 2311*b* toward the left side.

The spring fitting portion 2313 is formed protruded toward the left side, in the left side of the stopper installation portion 2310, respectively at both sides of the front-to-rear direction. In the spring fitting portion 2313, a stopper spring 55 of the door key connection portion 50 and a stopper spring 65 of the outer door connection portion 60, are provided respectively.

A groove is formed in the spring fitting portion 2313 in a way that the upper portion thereof is open. The width of the front-to-rear direction of the groove is same as and similar to the width of the front-to-rear direction of the stopper engaging portion 2312, and the groove is in communication with the stopper engaging portion 2312.

The locking lever installation groove 2314 is formed in a way that the upper portion and the front side thereof are open at a portion where the stopper installation portion 2310 is bent.

The locking lever installation groove 2314 is in communication with the first stopper fitting groove 2311*a*.

A locking lever 2760, which will be described later, is installed in the locking lever installation groove 2314.

In the left side of the locking lever installation groove 2314, a spring one end fitting groove 2314*a* is formed in a way that the right and upper portions thereof are open.

In the lower surface of the locking lever installation groove 2314, a locking lever fitting groove 2315 into which an open plate fitting protrusion 2762 of the locking lever 2760 is inserted, is formed penetrating through in the up-and-down direction.

In the right side of the front surface of the stopper installation portion 2310, an emergency block stopping step 2306, which can be engaged with the right side of the emergency block 2790, is formed protruded toward the front side.

The right side of the emergency block 2790 is blocked by the emergency block stopping step 2306.

<Insert Plate>

Figure 21:
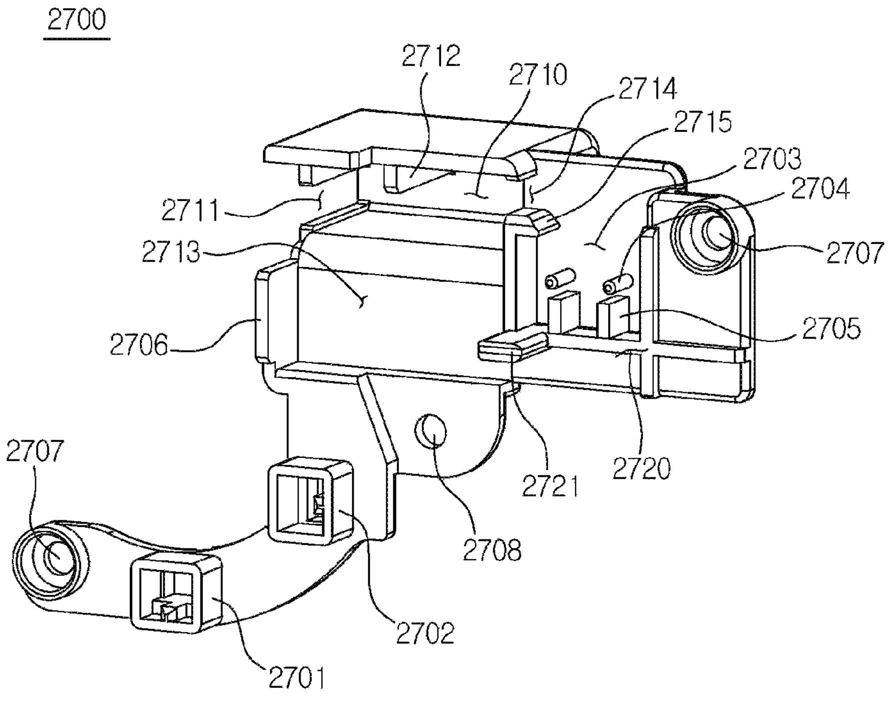
FIG. 21 is a front perspective view of an insert plate of a motorized vehicle door latch with emergency release according to a first preferred embodiment of the present invention.
Figure 22:
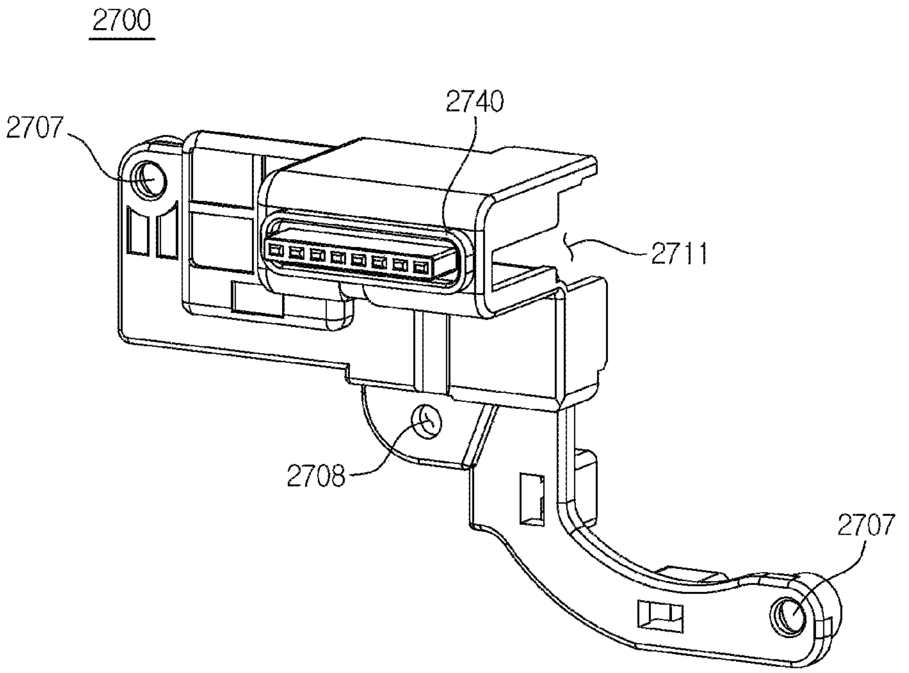
FIG. 22 is a rear perspective view of an insert plate of a motorized vehicle door latch with emergency release according to a first preferred embodiment of the present invention.

The insert plate 2340 is illustrated in detail in FIGS. 21 to 22.

The insert plate 2700 is formed, on the whole, in the shape of a plate.

The left side of the insert plate 2700 is extended toward the lower side and then formed curvedly toward the left side.

Insert plate 2700 covers the rear of the driving unit. That is, the insert plate 2700 is disposed between the driving unit and the third housing 2150.

The insert plate 2700 is fitted between the first fastening portion 2121 of the first housing 2110 and the third housing 2150 and bolt-coupled together with the first housing 2110 and the third housing 2150.

A third sensor installation portion 2701 and a fourth sensor installation portion 2702 are formed in the lower left portion of the insert plate 2700.

The fourth sensor installation portion 2702 is formed on the upper right portion of the third sensor installation portion 2701.

The third sensor installation portion 2701 and the fourth sensor installation portion 2702 are formed in a way that the front side thereof are open, and a groove through which wires can be slipped out, is formed in the rear side so that the wire is connected to the third sensor 2901 and the fourth sensor 2902 to the groove.

An open plate installation groove 2710 is formed in an upper portion of the insert plate 2700. The open plate installation groove 2710 is formed in a way that the front side is open.

In the upper portion of the open plate installation groove 2710, an open plate support portion 2712 is formed protruded toward the lower side direction. Due to the open plate support portion 2712, when the open plate 2300 is installed in the open plate installation groove 2710, friction is minimized so that the installation is easy. In addition, it guides the sliding of the open plate 2300 in the left-to-right direction.

In the left side of the open plate installation groove 2710, an open plate penetrating groove 2711 is formed in a way that the front side thereof is open and being penetrated through the left-to-right direction. An open plate 2300 is installed in the open plate penetrating groove 2711. The open plate penetrating groove 2711 is in communication with the connection unit cover installation groove 2156 of the third housing 2150.

An open plate guide portion 2713 is formed in the upper portion of the insert plate 2700. The open plate guide portion 2713 is formed in a way that the front side and upper portion thereof are open. That is, the left and right sides, the lower portion, and rear side of the open plate guide portion 2713 are formed to be blocked.

The open plate guide portion 2713 is disposed at the lower front side of the open plate installation groove 2710. The open lever fitting portion 2303 of the open plate 2300 is inserted into the open plate guide portion 2713. The open plate 2300 is installed in a way that the front surface of the open plate guide portion 2713 is in contact with the rear surface of the open lever fitting portion 2303.

Due to this, the open plate guide portion 2713 guides the sliding of the open plate 2300 in the left-to-right direction.

In the left side of the open plate guide portion 2713, a first housing support 2706 is formed protruded toward the front side.

The first housing support 2706 is formed in a way that the front surface of the first housing support 2706 is in contact with the rear surface of the second guide portion 2127 of the first housing 2110.

Due to this, the insert plate 2700 can stably maintain a constant separation distance from the first housing 2110.

In the right side of the open plate guide portion 2713, a safety member support portion 2715 is formed protruded toward the front side. The safety member support portion 2715 is formed in the shape in which the upper portion is bent to the right.

The left side surface of the safety member support portion 2715 is in contact with the right side surface of the open plate 2300 when the open plate 2300 is sliding toward the right side, thereby preventing the sliding of the open plate 2300. The right side surface of the safety member support portion 2715 is in contact with the left side surface of a second sensor 2903, which will be described later.

The upper surface of the bent portion of the upper portion of the safety member support portion 2715 is in contact with a portion of the lower surface of the safety member 2400 and guides the sliding of the safety member 2400 in the left-to-right direction, and the lower surface is in contact with a portion of the upper surface of the second sensor 2903 and prevents the second sensor 2903 from separating toward the upper side direction.

In the right side of the open plate installation groove 2710, a safety member penetrating groove 2714 is formed in a way that the front side thereof is open and being penetrated through the left-to-right direction. The safety member penetrating groove 2714 is disposed further at the upper portion than the open plate penetrating groove 2711. The safety member 2400 is installed in the safety member penetrating groove 2714.

In the upper right portion of the insert plate 2700, a second sensor installation portion 2703 in which the second sensor 2903 is installed is formed. The second sensor installation portion 2703 is disposed at the right side of the open plate installation groove 2710 and the open plate guide portion 2713. The second sensor installation portion 2703 is formed in a way that the front side and upper portion thereof are open.

In the center of the second sensor installation portion 2703, the second sensor fitting protrusion 2704 is formed protruded toward the front side, so that the second sensor 2903 does not flow in the up-and-down and left-to-right directions.

In the lower portion of the second sensor installation portion 2703, the second sensor support portion 2705 is formed protruded toward the front side to support the lower portion of the second sensor 2903.

In the upper right portion of the insert plate 2700, a motor installation portion 2720 is formed. The front surface of the motor installation portion 2720 is formed to be in contact with the rear surface of the motor 2610.

In the upper left portion of the motor installation portion 2720, a motor shaft support portion 2721 is formed protruded toward the front side. The motor shaft support portion 2721 is formed in the shape of a rectangular plate. The front side of the motor shaft support portion 2721 is formed to be recessed in the shape of a semicircle so that the shaft of the motor 2610 can be placed thereon. Due to the motor shaft support portion 2721 and the first housing 2110, the shaft of the motor 2610 is not shaken in the front-rear and up-and-down directions.

In the right side of the motor installation portion 2720 of the insert plate 2700 and the left side of the third sensor installation portion 2701, a third fastening portion 2707 is formed.

The third fastening portion 2707 is formed in a shape in which a circular strip is protruded toward the front side. The first fastening portion 2121 of the first housing 2110 is inserted into the space formed inside the strip.

In the center of the third fastening portion 2707, a hole is formed penetrating through the front-to-rear direction so that a bolt is fastened to the first fastening portion 2121 of the first housing 2110 through the hole.

In the center portion of the insert plate 2700, a shaft penetrating groove 2708 is formed penetrating through the front-to-rear direction. The shaft 2106 of the first housing 2110 is inserted into the shaft penetrating groove 2708. That is, the rear side of the shaft 2106 is supported by the shaft penetrating groove 2708.

In the upper left portion of the insert plate 2700, a wire connection portion 2740 is formed protruded toward the rear side. An insert terminal is formed inside the insert plate 2700. It is installed inside the insert plate 2700 through the wire insert injection connected to the wire connection portion 2740. The wire is exposed to the outside of the insert plate 2700 through a groove formed in a portion to which the wire should be connected.

In the right rear surface of the insert plate 2700, ribs are formed in the shape of a grid. Due to this, the rigidity of the insert plate 2700 can be enhanced.

<Connection Unit Cover>

Figure 23:
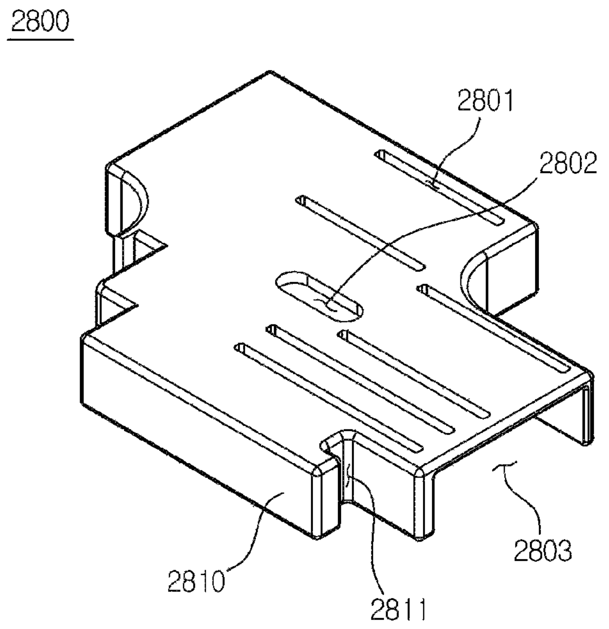
FIG. 23 is a plan perspective view of a connection unit cover of a motorized vehicle door latch with emergency release according to a first preferred embodiment of the present invention.
Figure 24:
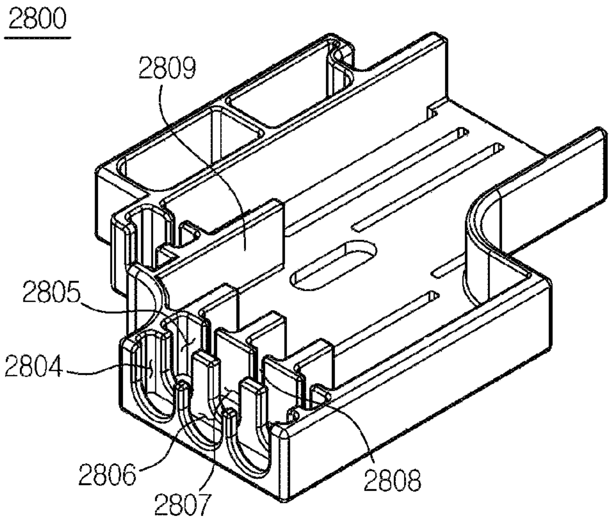
FIG. 24 is a bottom perspective view of a connection unit cover of a motorized vehicle door latch with emergency release according to a first preferred embodiment of the present invention.

The connection unit cover 2800 is illustrated in detail in FIGS. 23 to 24.

The connection unit cover 2800 is formed, on the whole, in the shape of a cuboid.

The front side portion of the connection unit cover 2800 is inserted into the connection unit cover installation portion 2126 of the first housing 2110, and the rear side portion of the connection unit cover 2800 is inserted into the connection unit cover installation groove 2156 of the third housing 2150. That is, the connection unit cover 2800 is positioned between the first housing 2110 and the third housing 2150.

A portion of the left and right sides of the connection unit cover 2800 is blocked by the connection unit cover installation portion 2126 of the first housing so as not to be slid in the left-to-right direction.

In the upper portion of the connection unit cover 2800, a stopping groove 2801 is formed in the left-to-right direction.

The stopping groove 2801 is formed penetrating through the up and down direction.

In the stopping groove 2801, the cover fitting portions 2301*a* and 2301*b* of the open plate 2300 and the cover fitting portion 2401 of the safety member 2400 are inserted.

Due to the locking groove 2801, the open plate 2300 and the safety member 2400 are slid only as much as the length of the locking groove 2801 in the left-to-right direction.

In the central portion of the connection unit cover 2800, a locking lever guide groove 2802 into which the connection portion cover insertion protrusion 2761 of the locking lever 2760 is inserted, is formed in the left-to-right direction.

The locking lever guide groove 2802 is formed penetrating through the up-and-down direction.

In the right side of the front side of the connection unit cover 2800, a first housing support portion 2810 which is inserted into the connection unit cover installation portion 2126 of the first housing 1100, and the right side surface thereof is in contact with the left side surface of the second guide portion 2127 of the first housing 1100, is formed.

An emergency lever interference prevention groove 2811 is formed recessed toward the left side of the rear side of the first housing support portion 2810.

The emergency lever interference prevention groove 2811 is formed in a way that it is penetrating through the up-and-down direction, and the right side thereof is open.

Due to the emergency lever interference prevention groove 2811, interference between the emergency lever 2780 and the connection unit cover 2800 is prevented when the emergency lever 2780 installed in the emergency lever installation groove 2103 of the first housing 2110 is rotated in a clockwise direction.

In the right lower portion of the connection unit cover 2800, the open plate guide groove 2803 is formed in a way that the right and lower portions thereof are open.

The upper portion and the left and right sides of the open plate 2300 are guided by the open plate guide groove 2803.

In the left side of the connection unit cover 2800, a plurality of connection portion penetrating grooves 2806 are formed in a way that the left-to-right direction and lower portion thereof are open.

Among the connection portion penetrating grooves 2806, in the three connection portion penetrating grooves 2806 formed on the rear side, a door lever connection portion 40, a door key connection portion 50, and an outer door connection portion 60 are installed, and a door latch connection portion 30 is installed in one connection portion penetrating groove 2806 disposed further at the right front side than the three connection portion penetrating grooves 2806.

A plate guide plate 2809 is formed in the left-to-right direction between the three connection portion penetrating grooves 2806 and the one connection portion penetrating grooves 2806.

The plate guide plate 2809 is formed protruded toward the lower portion.

The rear surface of the plate guide plate 2809 is in contact with the front surface of the open plate 2300 installed on the connection unit cover 2800, and guides the sliding of the open plate 2300 in the left-to-right direction.

The width of the front-to-rear direction of the connection portion penetrating groove 2806 is same as and similar to the outer diameters of the tubes of the door latch connection portion 30, door lever connection portion 40, door key connection portion 50 and outer door connection portion 60.

In the right side of the connection portion penetrating groove 2806, a first connection portion seating groove 2804 is formed in a way that the lower portion thereof is open. The left side of the first connection portion seating groove 2804 is in communication with the connection portion penetrating groove 2806. A portion of the stopper fixing portions 36, 46, 56, and 66 are inserted into the first connection portion seating groove 2804.

In the right side of the first connection portion seating groove 2804, a plurality of fixing portion installation grooves 2807 is formed in a way that the left-to-right direction and the lower portion thereof are open. The left side of the fixing portion installation groove 2807 is in communication with the first connection portion seating groove 2804. The grooves of the stopper fixing portions 36, 46, 56, and 66 are inserted into the fixing portion installation grooves 2807. The width of the fixed installation groove 2807 in the front-to-rear direction is same as and similar to the outer diameter of the groove, and the length of the fixing portion installation groove 2807 in the left-to-right direction is same as and similar to the length of the groove in the left-to-right direction, it prevents the stopper fixing portions 36, 46, 56, and 66 from flowing in the left and right and front-to-rear directions.

In the right side of the fixing portion installation groove 2807, a second connection portion seating groove 2805 is formed in a way that the lower portion thereof is open. The left side of the second connection portion seating groove 2805 is in communication with the fixing portion installation groove 2807. A portion of the stopper fixing portions 36, 46, 56, and 66 are inserted into the second connection portion seating groove 2805.

In the right side of the second connection portion seating groove 2805, a cable penetrating groove 2808 is formed in a way that a left-to-right direction and a lower portion thereof are open. The left side of the cable penetrating groove 2808 is in communication with the second connection portion seating groove 2805, and the right side of the cable penetrating groove 2808 is in communication with the locking lever guide groove 2802 and the open plate guide groove 2803. In the cable penetrating groove 2808, a cable 33 of a door latch connection portion 30 installed on an open plate 2300, a cable 43 of a door lever connection portion 40, a cable 53 of the door key connection portion 50, and a cable 63 of the outer door connection portion 60 are installed.

The width of the front-to-rear direction of the cable penetrating groove 2808 is formed narrower than the outer diameter of the stopper springs 35, 55, and 65, thereby preventing the stopper springs 35, 55, and 65 from flowing to the left direction.

<Door Latch Key>

Figure 25A:
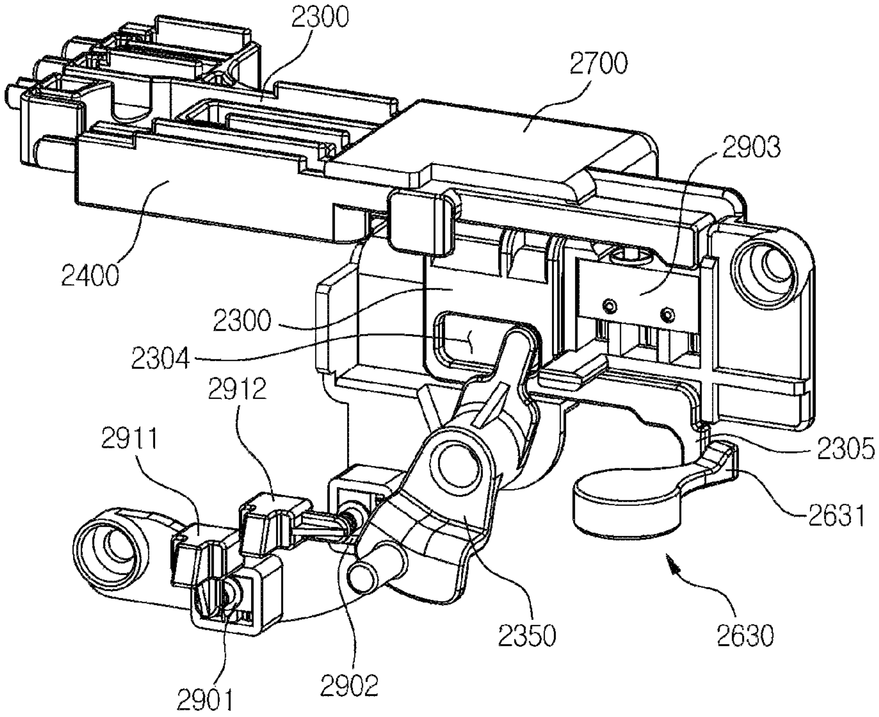
FIG. 25*a* is a front perspective view showing components installed on an insert plate of a motorized vehicle door latch with emergency release according to a first preferred embodiment of the present invention.
Figure 25B:
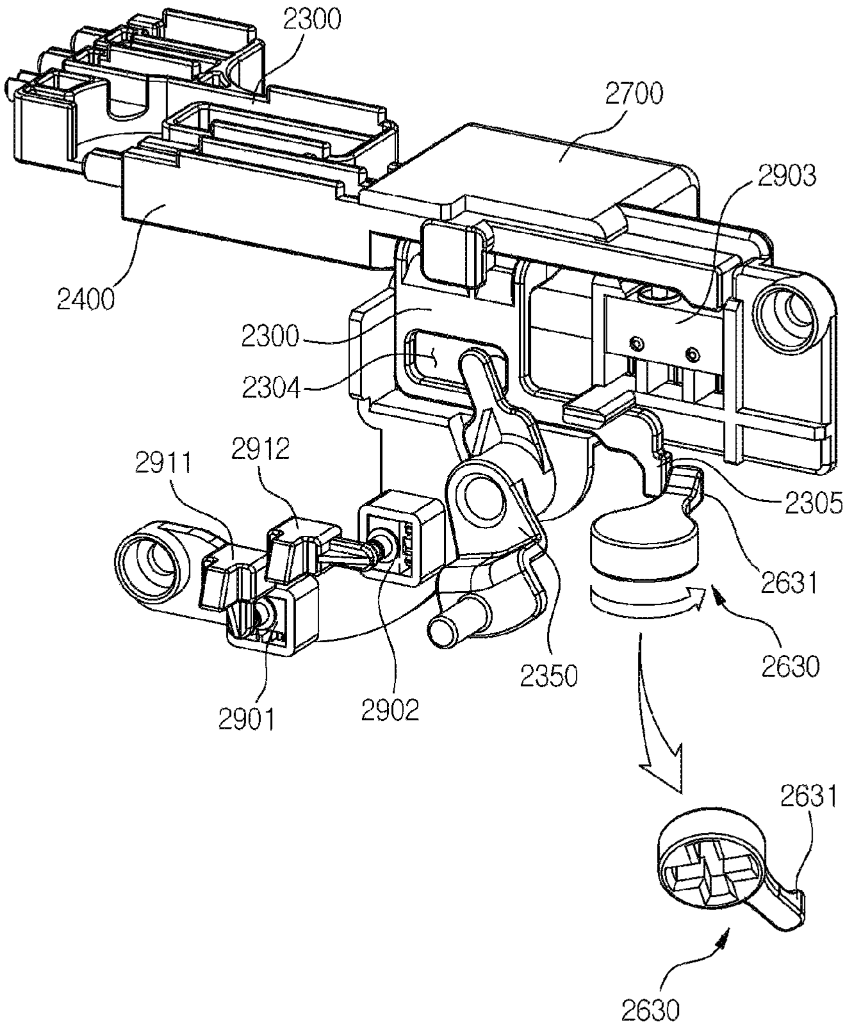
FIG. 25*b* is a front perspective view showing a state wherein a door latch key of a motorized vehicle door latch with emergency release according to a first embodiment of the present invention is turned.

The door latch key 2630 is illustrated in detail in FIGS. 25*a* to 25*b*.

The door latch key 2630 is formed, on the whole, in the shape of a disk.

In the lower portion of the door latch key 2630, a key inserting portion capable of inserting and turning a key is formed.

In one side of the door latch key 2630, an open plate stopping portion 2631 is formed protrudedly.

The open plate stopping portion 2631 is disposed at the right side of the door latch key stopping portion 2305 so as to stop the door latch key stopping portion 2305 of the open plate 2300.

When the key is inserted into the key insertion portion of the door latch key 2630 and turned, as illustrated in FIG. 25*b*, the open plate 2300 is being slid toward the left or right side according to the rotating direction of the door latch key 2630. As a result, the open lever 2350 is rotated counter-clockwise to open the vehicle door.

<Locking Lever>

Figure 26:
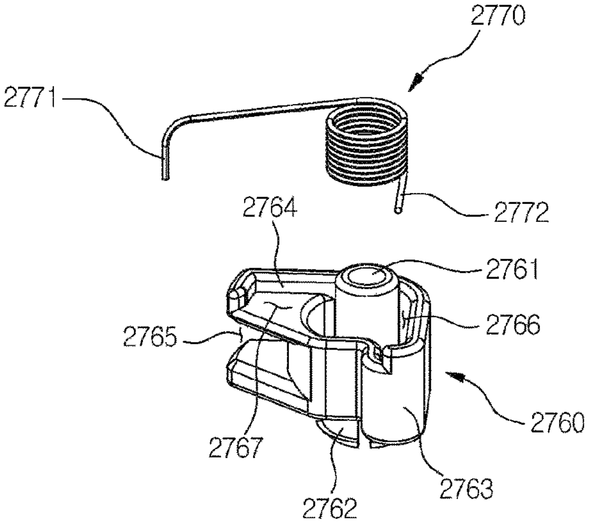
FIG. 26 is a front exploded perspective view of a locking lever of a motorized vehicle door latch with emergency release according to a first preferred embodiment of the present invention.

The locking lever 2760 is illustrated in detail in FIG. 26.

The locking lever 2760 is formed, on the whole, in the shape of a triangular prism whose rear and right surfaces form a right angle to each other.

In the locking lever 2760, a connection portion cover insertion protrusion 2761 protruded toward the upper portion and installed in the locking lever guide groove 2802 of the connection unit cover 2800.

In the locking lever 2760, an open plate fitting protrusion 2762 protruded toward the lower portion and inserted into the locking lever fitting groove 2315 of the open plate 2300 is formed.

The connection portion cover insertion protrusion 2761 and the open plate fitting protrusion 2762 are positioned on the same axis in the up-and-down direction, and the locking lever 2760 is rotated with the axis as a rotation axis.

In the locking lever 2760, an emergency block engaging portion 2763 protruded toward the right front side and possible to be in contact with the left side surface of the emergency block 2790 is formed.

The locking lever 2760 may be rotated centered around the rotation axis by sliding of the emergency block 2790 in the left-to-right direction.

The center of the upper surface of the cover of the locking lever 2760 is formed recessed toward the lower side. That is, the rim 2764 of the upper surface of the locking lever 2760 is formed protrudedly further toward the upper side than the central portion of the upper surface of the locking lever 2760.

In the front side of the rim 2764, a second spring installation groove 2767 is formed penetrating through the front-to-rear direction.

Between the upper and lower surfaces of the left side of the locking lever 2760, an outer door connection portion penetrating groove 2765 is formed to be penetrating through the front-to-rear direction with the left side thereof open.

When the outer door connection portion 60 is located in the first stopper fitting groove 2311*a*, which is a section in which it is being slid in the left-to-right direction, the outer door connection portion 60 may move the locking lever 2760 by being engaged with the rim 2764 through the outer door connection portion penetrating groove 2765.

Conversely, when the locking lever 2760 rotates counter-clockwise so that the rim 2764 of the locking lever 2760 released away from the first stopper fitting groove 2311*a*, the outer door connection portion 60 is not engaged with the locking lever 2760 and being slid toward the left side within the first stopper fitting groove 2311*a*.

The periphery of the connection portion cover insertion protrusion 2761 is formed recessed toward the lower portion so that the coil portion of the locking lever spring 2770 can be inserted.

One end 2771 of the locking lever spring 2770 is formed to be bent toward the lower portion, and is fitted into the spring one end fitting groove 2314*a* of the open plate 2300.

The other end 2772 of the locking lever spring 2770 is formed to be extended toward the front side, and is fitted into the first spring installation groove 2766 formed inside the emergency block engaging portion 2763.

<Emergency Lever>

Figure 34:
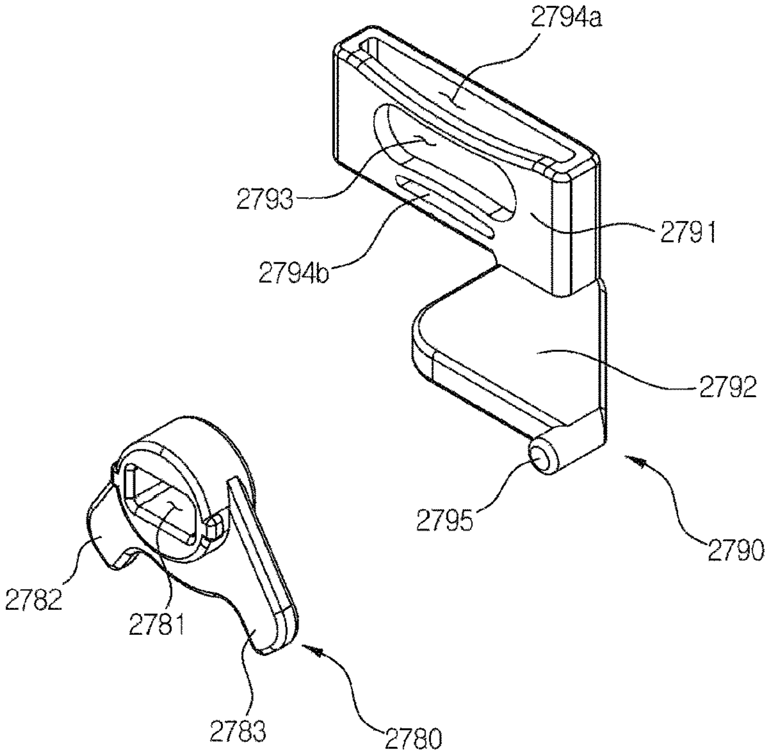
FIG. 34 is a front perspective view of a locking lever and an emergency block of a motorized vehicle door latch with emergency release according to a first preferred embodiment of the present invention.
Figure 35:
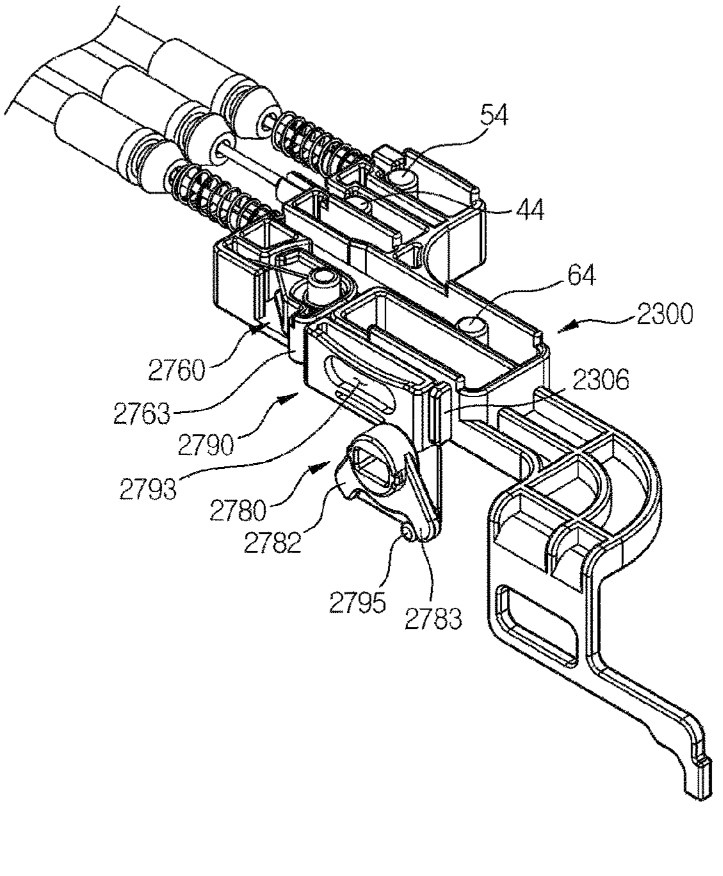
FIG. 35 is a front perspective view in which a locking lever and an emergency block of a motorized vehicle door latch with emergency release according to a first preferred embodiment of the present invention are assembled.

The emergency lever 2780 is illustrated in detail in FIGS. 34 to 35.

The emergency lever 2780 is formed in a connected form in which a first arm 2802 formed protruded toward the lower left portion and a second arm 2783 formed protruded toward the right lower portion are connected to a disc.

A key insertion portion 2781 is formed on the front side of the disc.

When a key is inserted into the key insertion portion 2781 and turned, the first arm 2782 and the second arm 2783 are rotated in a clockwise or counterclockwise direction.

<Emergency Block>

The emergency block 2790 is illustrated in detail in FIG. 34.

The emergency block 2790 comprises a safety member fitting portion 2791 in the shape of a rectangular parallelepiped and an emergency lever engaging portion 2792 in the form of a triangular plate connected to the lower right portion of the safety member fitting portion 2791.

The safety member fitting portion 2791 is formed with a separation groove 2794*a* in a way that the upper portion thereof is open.

Due to the separation groove 2794*a*, the front and rear surfaces of the safety member fitting portion 2191 are spaced apart from each other.

In the front surface of the safety member fitting portion 2791, a soft lock groove 2793 and an elastic groove 2794*b* are formed penetrating through the front-to-rear direction.

The widths of the left and right sides of the soft lock groove 2793 in the up-and-down directions are formed to be same as and similar to the diameter of the emergency block fitting protrusion 2404 of the safety member 2400, and the width of the central portion of the soft lock groove 2793 in the up-and-down direction is formed to be smaller than the diameter of the emergency block insertion protrusion 2404.

The elastic groove 2794*b* is disposed at the lower portion of the soft lock groove 2793 so that when the emergency block insertion protrusion 2404 slides in the left-to-right direction within the soft lock groove 2793, it allows the soft lock groove 2793 to be stretched toward the lower direction.

The emergency lever engaging portion 2792 is formed protruded toward the front left side.

In the front left side of the emergency lever engaging portion 2792, an emergency lever engagement protrusion 2795 is formed protruded toward the front side.

The emergency lever engagement protrusion 2795 is disposed between the first arm 2782 and the second arm 2783 of the emergency lever 2780, and is moved in the left side or right side direction depending on the positions of the first arm 2782 and the second arm 2783.

<Handle Unit>

Figure 28:
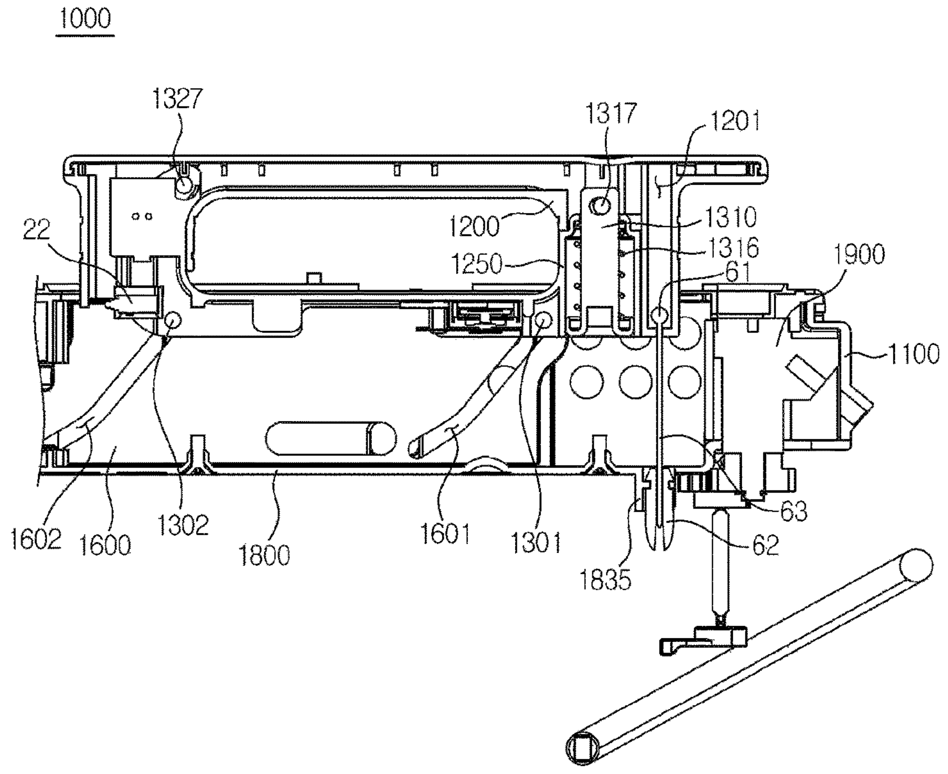
FIG. 28 is a partial cross-sectional view of a handle unit when the handle unit of a motorized vehicle door latch with emergency release according to a first preferred embodiment of the present invention is withdrawn.

The handle unit 1000 is illustrated in detail in FIG. 28.

The handle unit 1000 comprises: a housing 1100; a first blocking plate 1800 for blocking the rear side of the housing 1100; a handler portion guided by the housing 1100 and that can be entered and withdrawn from the vehicle door in the width direction of the vehicle; and a slider 1600 connected by the handler portion, an inclined long hole, and a pin, thereby being slid in the length direction of the vehicle.

The handler portion comprises a front handler 1200 and a rear handler 1250.

The front handler 1200 is rotatable with respect to the rear handler 1250 around the pivot pin 1327 installed on the left side of the front handler 1200 and the rear handler 1250.

The rear handler 1250 is connected to the first and second inclined holes 1601 and 1602 of the slider 1600 by the first and second pins 1301 and 1302, so that it can be entered and withdrawn for the vehicle door.

The right side of the front handler 1200 and the right side of the rear handler 1250 are connected by an extension pin 1317 installed in the front handler 1200 and an extension portion 1310 installed in the rear handler 1250.

An extension return spring 1316 is installed in the extension portion 1310 so that the front handler 1200 can return to its original position when a user pulls the front handler 1200 and removes external force.

In the right side of the front handler 1200, an outer door connection portion installation groove 1201 is formed.

In the right side of the first blocking plate 1800, an outer door connection portion fixing portion 1835 is formed.

The locking protrusion 61 of the outer door connection portion 60 is installed so as not to slip out to the rear side within the outer door connection portion installation groove 1201, and the engaging protrusion fixing portion 62 of the outer door connection portion 60 is installed in the outer door connection portion fixing portion 1835.

Due to this, when the engaging protrusion 61 is moved by the movement of the handle portion, the engaging protrusion 61 connected to one side of the cable 63 of the outer door connection portion 60 is also moved to be connected to the other side of the cable 63, and the stopper 64 installed in the motorized latch 2000 is moved.

The slider 1600 is slid by a handle driving unit (not shown).

The door latch connection portion 30 is interlocked by the sliding of the driving unit in the left-to-right direction. That is, the door latch connection portion 30 installed in the handle unit 1000 and the motorized latch 2000 is interlocked with the entry and withdrawal of the handlers by the handle driving unit.

In the right side of the housing 1100, a key lock unit 1900 is installed.

The key lock unit 1900 is interlocked with the motorized latch 2000 by a bar (not shown) directly connected to the door key connection portion 50 or the door latch key 2630.

Due to this, when the key is inserted into the key lock unit 1900 and rotated, the door key connection portion 50 is pulled, or the door latch key 2630 is rotated through a bar directly connected to the door latch key 2630, thereby selectively moving the open plate 2300 to open the vehicle door.

Hereinafter, an operation process of a motorized vehicle door latch with emergency release according to an embodiment of the present invention having the previously described configuration will be described.

<Driving Unit Operation Process>

The operation process of the driving unit is illustrated in detail in FIGS. 16 to 19.

Figure 16:
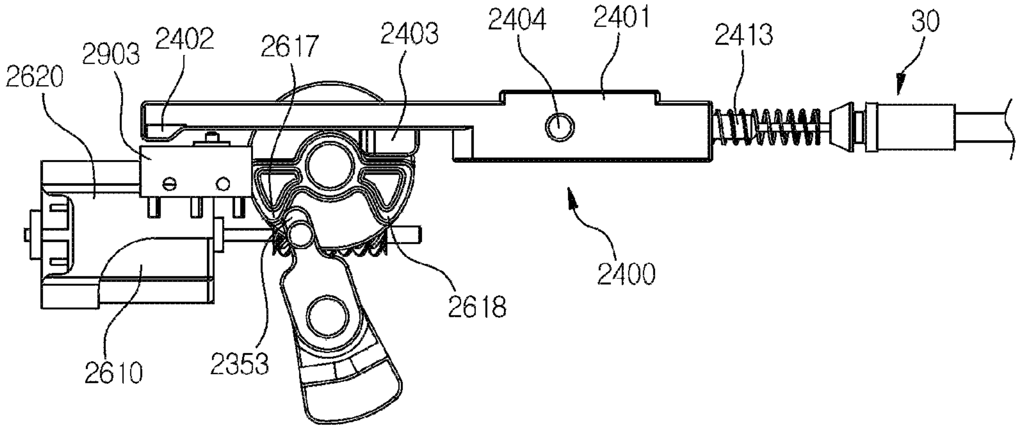
FIG. 16 is a rear view of a driving unit of a motorized vehicle door latch with emergency release according to a first preferred embodiment of the present invention (initial state).

As illustrated in FIG. 16, in the state in which the handle unit 1000 is entered, the safety member detection protrusion 2402 of the safety member 2400 is located away from the detection portion of the second sensor 2903, The locking fitting portion 2403 is inserted into the safety member fitting groove 2616 of the locking member 2615, and thereby, the motorized latch 2000 is in a locked state.

Since the second sensor 2903 is not pressed, power is not supplied to the motor 2610 electrically connected to the second sensor 2903, and the rotation of the locking member 2615 is mechanically blocked by the locking fitting portion 2403.

Figure 17:
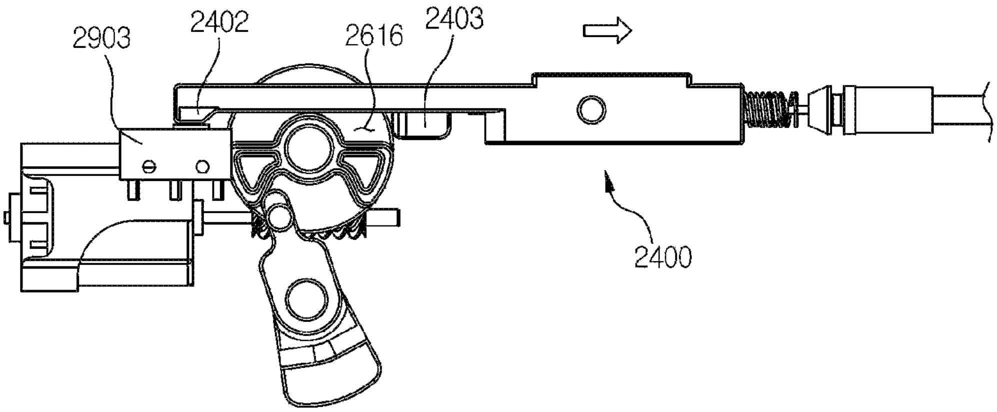
FIG. 17 is a rear view of a driving unit of a motorized vehicle door latch with emergency release according to a first preferred embodiment of the present invention (state in which a door latch connection portion is pulled).

When the handle unit 1000 is withdrawn, as illustrated in FIG. 17, the door latch connection portion 30 is pulled toward the left side, and the safety member detection protrusion 2402 depresses the second sensor 2903, and accordingly, power is applied to the motor 2610.

In addition, the locking fitting portion 2403 is released from the safety member fitting groove 2616 of the locking member 2615 and the locking of the motorized latch 2000 is released.

Figure 18:
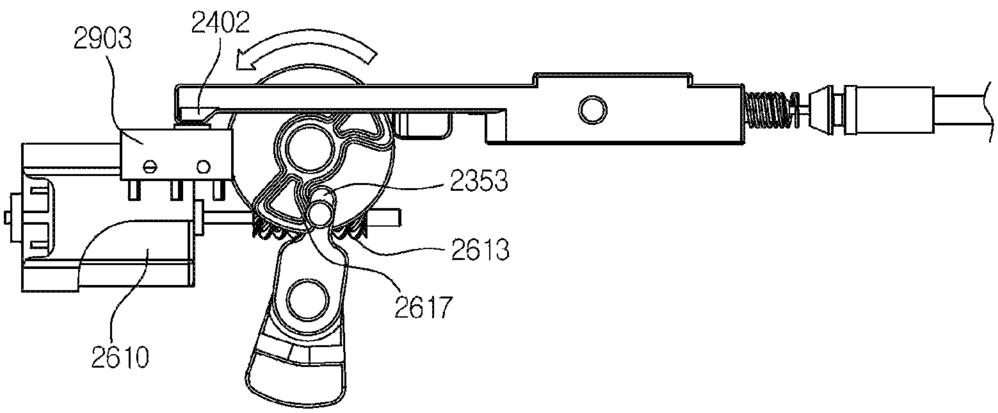
FIG. 18 is a rear view of the driving unit of a motorized vehicle door latch with emergency release according to a first preferred embodiment of the present invention (a state in which a motor is driven).

When one side of the handle unit 1000 is pulled, as illustrated in FIG. 18, the first sensor 22 of the handle unit 1000 is pressed, and thereby, a rotation signal is applied to the motor 2610.

When the motor 2610 is operated and the worm 2613 is rotated, the locking member 2615 interlocked with the worm 2613 is rotated in a clockwise direction, and the open engaging portion 2353 of the open lever 2350 is rotated counterclockwise by the first rotation engaging portion 2617 of the locking member 2615.

Figure 19:
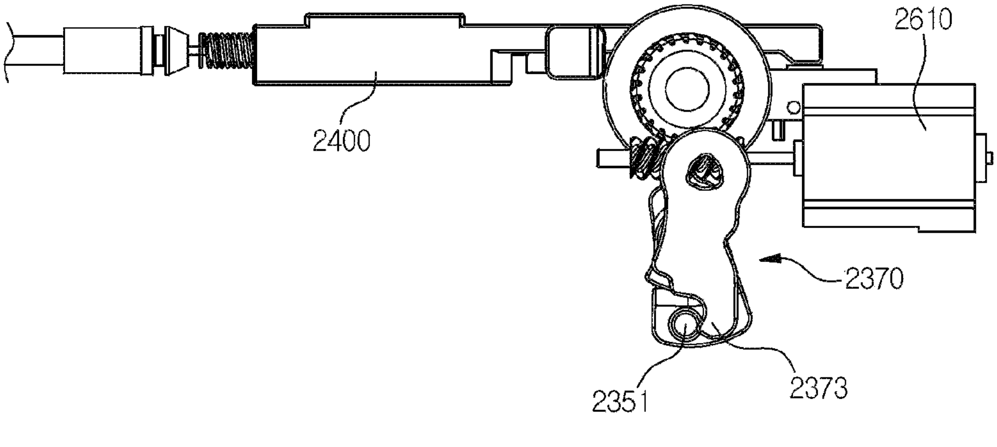
FIG. 19 is a front view of a driving unit of a motorized vehicle door latch with emergency release according to a first preferred embodiment of the present invention (a state in which a motor is driven).

As a result, as illustrated in FIG. 19, the engaging protrusion 2373 of the pivoting member 2370 is rotated counterclockwise by the pivoting member engaging portion 2351 of the open lever 2350, and the latch 2200 engaged with the pivoting member 2370 is released to open the vehicle door.

When the external force pulling force on the handle unit 1000 is removed and since the first sensor 22 is not pressed the rotation signal of the motor 2610 is blocked, the pivoting member 2370 is returned to the original state by the elastic restoring force of the pivoting member spring 2390, and accordingly the open lever 2350, the locking member 2615, and the worm 2613 are returned to the original state thereof.

When the handle unit 1000 is entered, the safety member 2400 returns to its original state by the elastic restoring force of the stopper spring 35 of the door latch connection portion 30.

<Door Opening Through Handle Unit>

The operation process of the handle unit 1000 and the motorized latch 2000 when the door is opened through the handle unit 1000 is illustrated in detail in FIGS. 27 to 33.

Figure 27:
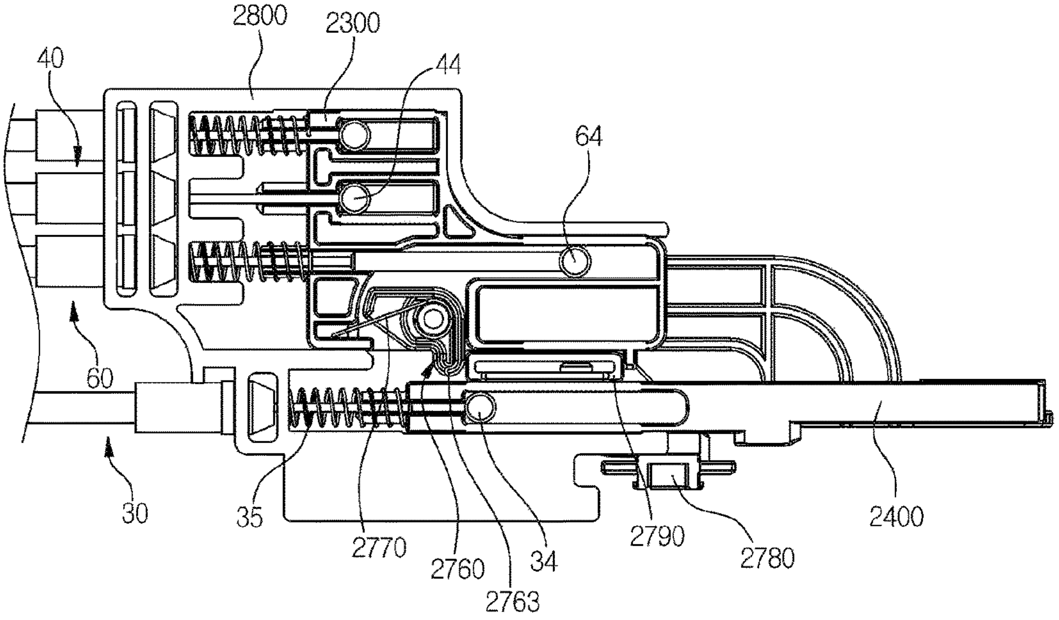
FIG. 27 is a partial cross-sectional view of a latch unit when a handle unit of a motorized vehicle door latch with emergency release according to a first preferred embodiment of the present invention is entered.

As illustrated in FIG. 27, when the rear handler 1250 is entered, the door latch connection portion 30, the outer door connection portion 60, the open plate 2300, the safety member 2400, and the locking lever 2760 maintain the initial state thereof.

When the rear handler 1250 is withdrawn, as illustrated in FIG. 28, the front handler 1200 is also withdrawn, but there is no interference between the engaging protrusion 61 of the outer door connection portion installation groove 1201 and the outer door connection portion 60 of the front handler 1200, and thereby, the outer door connection portion 60 is not pulled.

Figure 29:
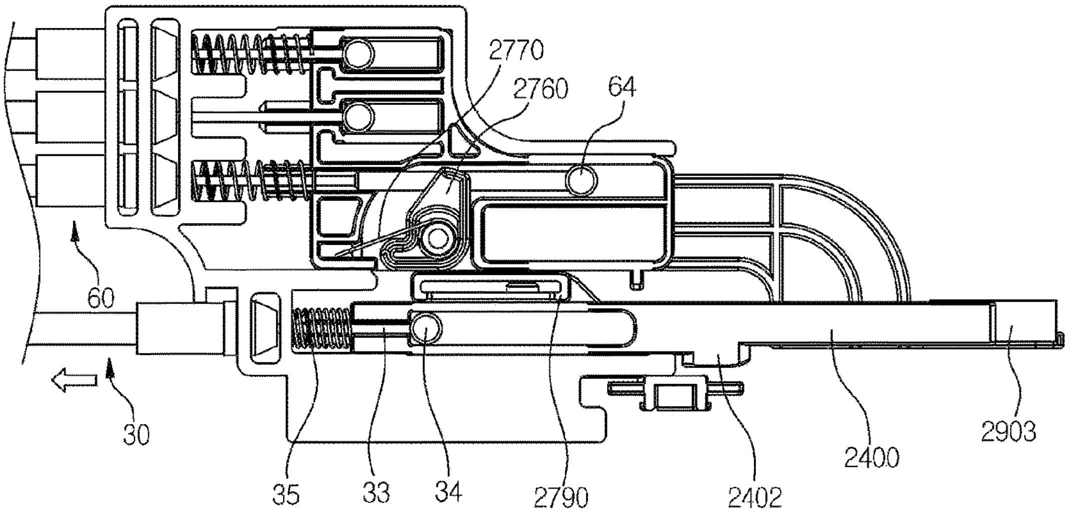
FIG. 29 is a partial cross-sectional view of a latch unit when a handle unit of a motorized vehicle door latch with emergency release according to a first preferred embodiment of the present invention is withdrawn.

In addition, as illustrated in FIG. 29, since the door latch connection portion 30 is pulled, the safety member 2400 is pulled toward the left, and thereby, the second sensor 2903 is pressed.

When the safety member 2400 moves to the left, the emergency block 2790 installed in the safety member 2400 also moves to the left, and the emergency block 2790 pushes the lower portion of the locking lever 2760 to the left, and the locking lever 2760 is rotated in the clockwise direction.

Figure 30:
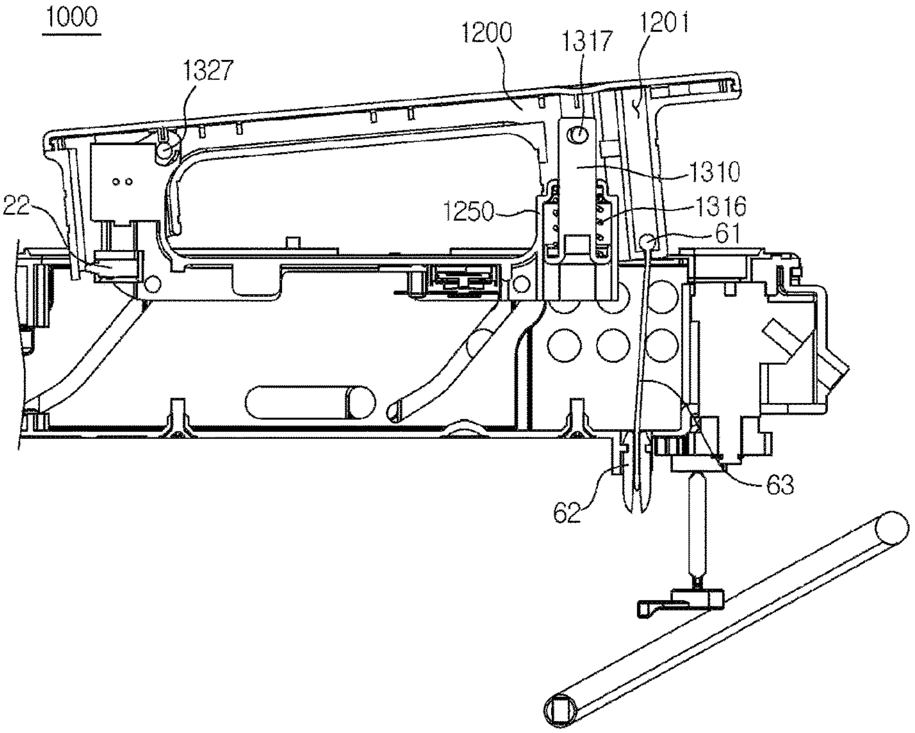
FIG. 30 is a partial cross-sectional view of a handle unit when the handle unit of a motorized vehicle door latch with emergency release according to a first preferred embodiment of the present invention is pulled 5 degrees.
Figure 31:
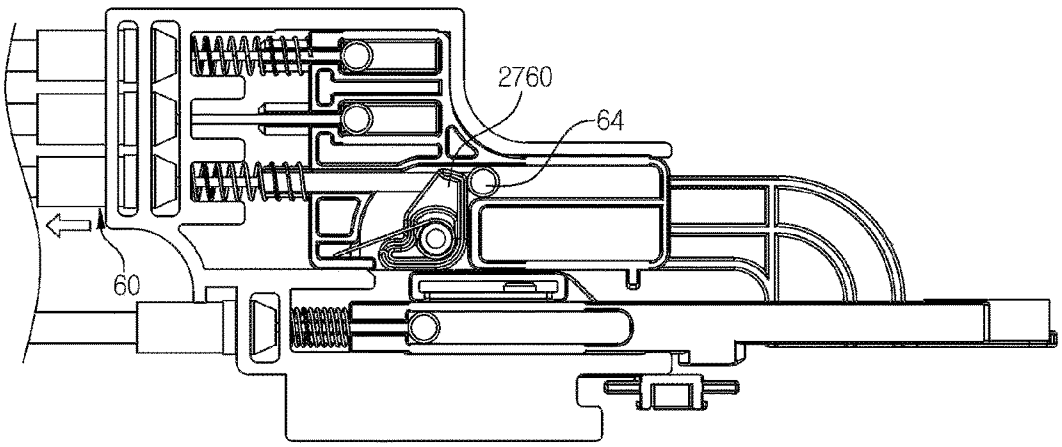
FIG. 31 is a partial cross-sectional view of the latch portion when a handle unit of a motorized vehicle door latch with emergency release according to a first preferred embodiment of the present invention is pulled 5 degrees.

When the front handler 1200 is pulled 5 degrees, as illustrated in the FIG. 30, the front handler 1200 rotates around the pivot pin 1327, and thereby, the first sensor 22 is pressed, and the engaging protrusion 61 is pulled.

Then as illustrated FIG. in 31, the stopper 64 of the outer door connection portion 60 moves to a position in contact with the locking lever 2760.

At this time, since the first sensor 22 and the second sensor 2903 are both pressed, power is applied to the motor 2610 to electrically open the vehicle door.

Figure 32:
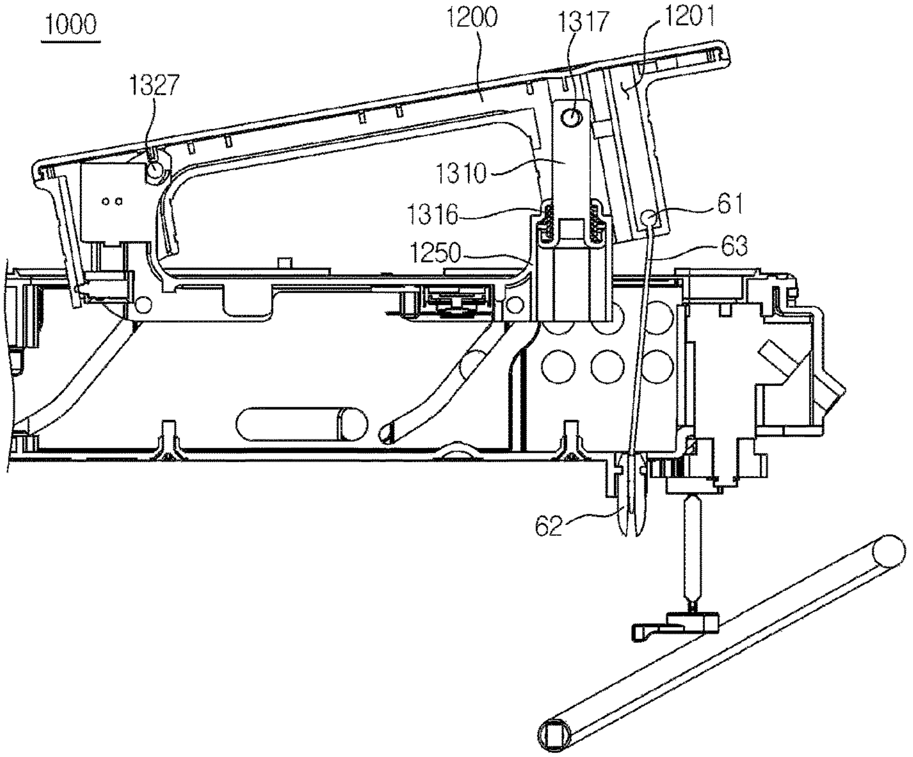
FIG. 32 is a partial cross-sectional view of a handle unit when the handle unit of a motorized vehicle door latch with emergency release according to a first preferred embodiment of the present invention is pulled 10 degrees.

When a situation in which power cannot be applied to the motor 2610 occurs, when the front handler 1200 is pulled up to 10 degrees, as illustrated in FIG. 32, the front handler 1200 is rotated around the pivot pin 1327, so that a larger amount is pulled than when the engaging protrusion 61 pulls the front handler 1200 5 degrees.

Figure 33:
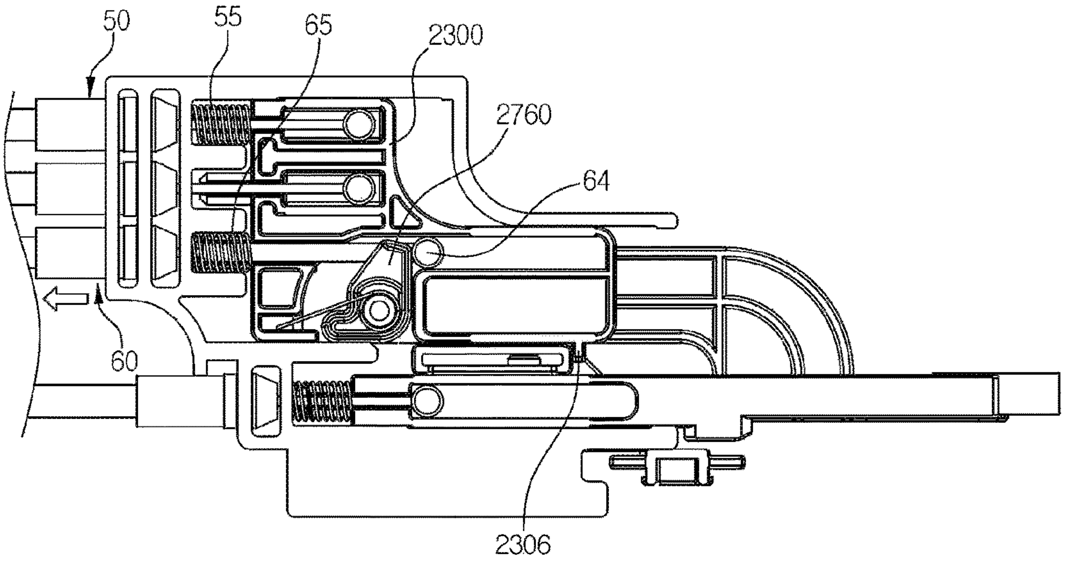
FIG. 33 is a partial cross-sectional view of a latch unit when a handle unit of a motorized vehicle door latch with emergency release according to a first preferred embodiment of the present invention is pulled 10 degrees.

Then, as illustrated in FIG. 33, the stopper 64 engaged with the locking lever 2760 pulls the locking lever 2760 to the left. Due to this, the open plate 2300 connected to the locking lever 2760 is also moved to the left.

When the open plate 2300 is moved to the left, as illustrated in FIG. 25*b*, the open lever 2350 inserted into the open lever fitting groove 2304 of the open plate 2300 is rotated counterclockwise and the vehicle door is mechanically opened.

<Locking and Release of the Latch Using Emergency Lever in Case of Emergency>

In the initial state, as illustrated in FIG. 27, when an accident is detected by a bumper impact sensor due to a collision accident while driving, an airbag of the vehicle is opened and an unlock signal is transmitted to the handle unit 1000 and the motorized latch 2000. After that, the cut loss of the power of the vehicle may occur depending on the severity of the accident.

When the power supply of the vehicle is cut off, the rear handler 1250 is withdrawn using the auxiliary battery, and it is in a state as illustrated in FIG. 29.

The door latch connection portion 30 connected to the front handler 1200 is pulled, the safety member 2400 is moved to the left, the motorized latch 2000 is unlocked, and the locking lever 2760 is rotated to the clockwise direction.

Figure 38:
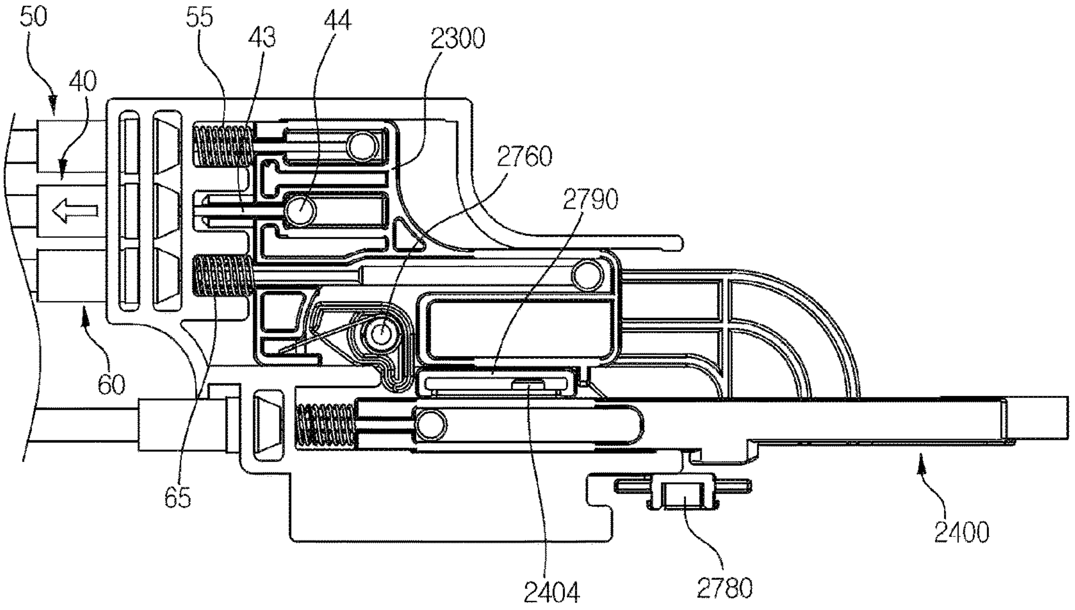
FIG. 38 is a partial cross-sectional view of a latch unit when the door is opened using a door lever connection portion of a motorized vehicle door latch with emergency release according to a first preferred embodiment of the present invention.

As illustrated in FIG. 38, the driver inside the vehicle can escape by pulling the door lever connection portion 40 connected to the inside of the vehicle to move the open plate 2300 directly, thereby opening the vehicle door.

When there is a person who can help from the outside of the vehicle, the front door handler 1200 may be pulled to open the vehicle door using the outer door connection portion 60.

Figure 36:
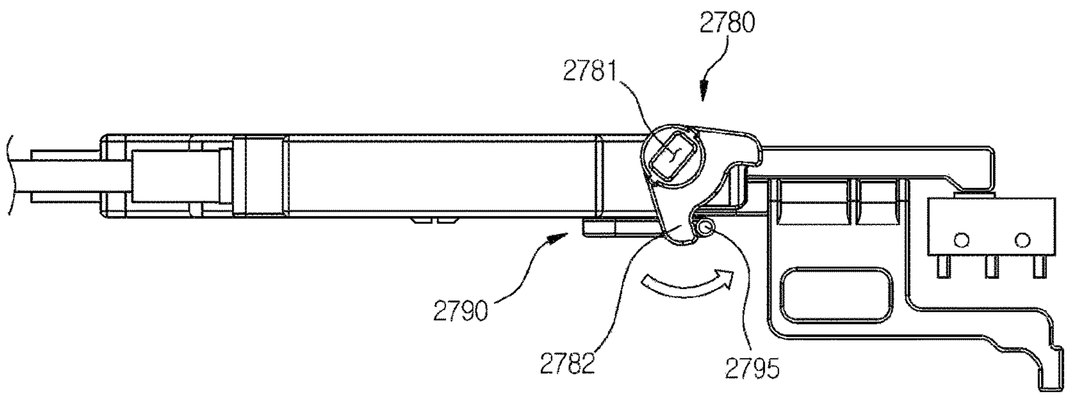
FIG. 36 is a partial front view of a latch unit when it is locked by using an emergency lever of a motorized vehicle door latch with emergency release according to a first preferred embodiment of the present invention.

Afterwards when the driver has to leave the place for a request for rescue, as illustrated in FIG. 36, the motorized latch 2000 can be changed to the locked state by manually turning the locking lever 2760 in the counterclockwise direction.

When the emergency lever 2780 is turned counterclockwise, the emergency lever engaging protrusion 2795 of the emergency block 2790 is engaged with the first arm 2782 of the emergency lever 2780 and moved to the right.

Figure 37:
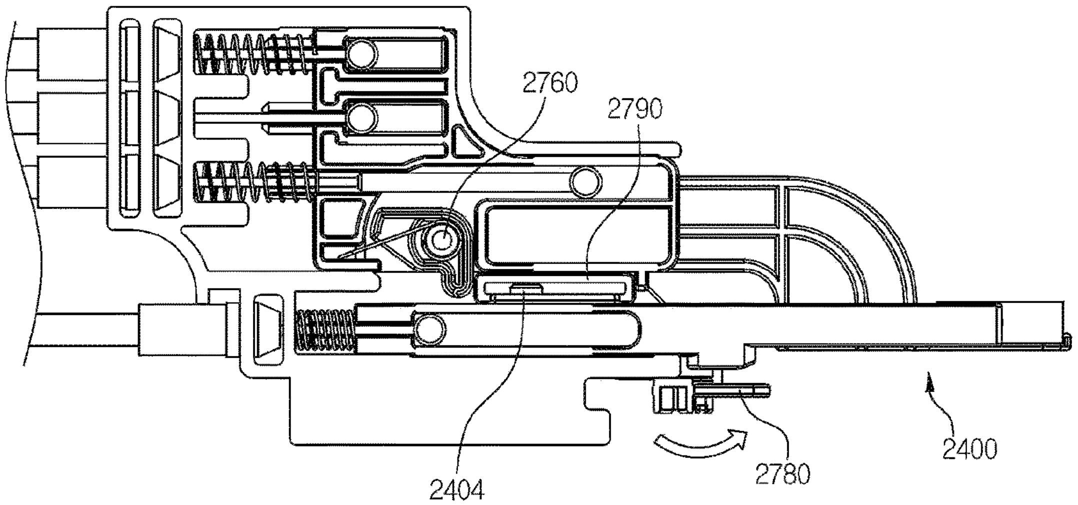
FIG. 37 is a partial cross-sectional view of a latch unit when it is locked by using the emergency lever of a motorized vehicle door latch with emergency release according to a first preferred embodiment of the present invention.

Then, as illustrated in FIG. 37, the position of the safety member 2400 of the emergency block 2790 is moved to the right while being fixed. That is, the emergency block fitting protrusion 2404 is located on the left side of the emergency block 2790.

Since the safety member 2400 is fixed to the handle unit 1000 which is forcibly withdrawn, the soft lock groove 2793 of the emergency block 2790 is moved with respect to the emergency block fitting protrusion 2404.

In order to rotate the emergency lever 2780 counterclockwise, an operating force stronger than the elastic restoring force of the center of the soft lock groove 2793 is required.

When the emergency block 2790 is moved to the right, the locking lever 2760 is rotated counterclockwise by the elastic restoring force of the locking lever spring 2770, so that it does not engage with the outer door connection portion 60.

For this reason, the vehicle door does not open even if the front handler 1200 is pulled from the outside.

Figure 39:
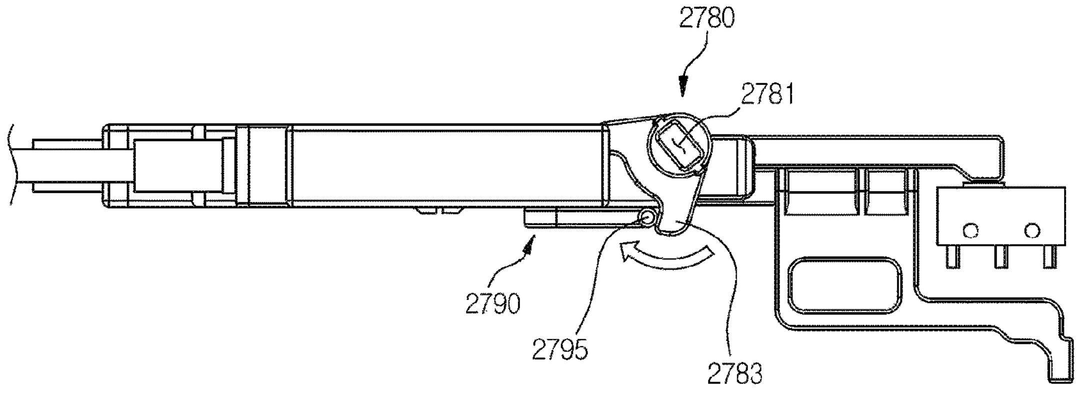
FIG. 39 is a partial front view of a latch unit when unlocked using an emergency lever of a motorized vehicle door latch with emergency release according to a first preferred embodiment of the present invention.

Thereafter, when the user needs to release the vehicle door after returning, the cut loss of the power supply of the damaged vehicle is restored to open the door electrically, and then when the emergency lever 2780 is turned in the clockwise direction, as illustrated in FIG. 39, the emergency lever engaging protrusion 2795 of the emergency block 2790 is engaged with the second arm 2783 of the emergency lever 2780 and moved toward the left side.

Figure 40:
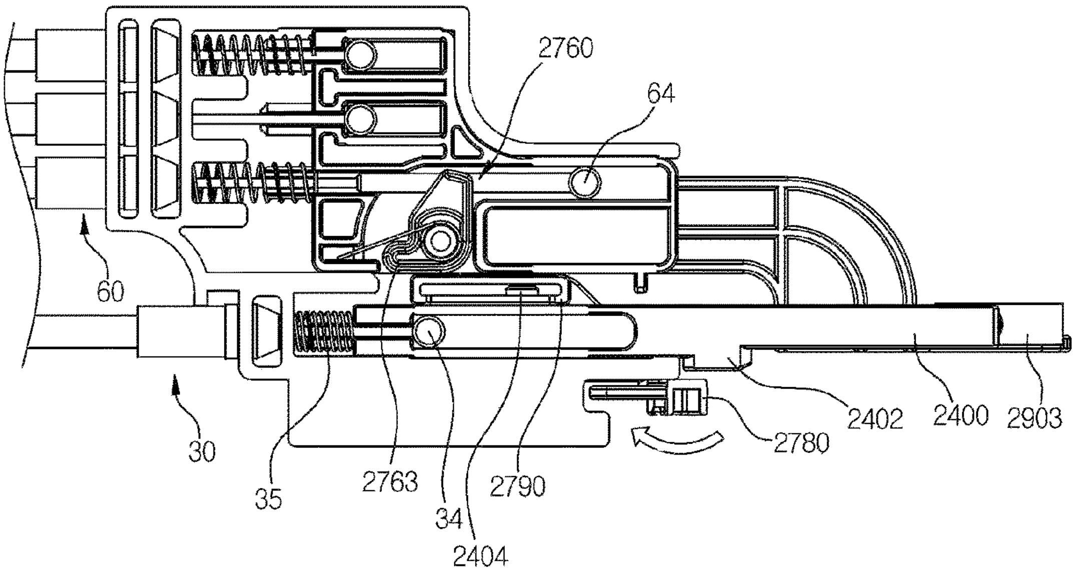
FIG. 40 is a partial cross-sectional view of a latch unit when unlocked using an emergency lever of a motorized vehicle door latch with emergency release according to a first preferred embodiment of the present invention.

Then, as illustrated in FIG. 40, the emergency block 2790 is moved to the left side, and the locking lever 2760 is rotated in the clock direction. That is, the emergency block fitting protrusion 2404 is located on the right side of the emergency block 2790.

At this time, in order to rotate the emergency lever 2780 in the clockwise direction, an operating force stronger than the elastic restoring force of the central portion of the soft lock groove 2793 is required.

Embodiment 2

Hereinafter, a second preferred embodiment according to the present invention will be described.

A detailed description of the same configuration as the above described embodiment in the first embodiment will be omitted.

The configuration of the second embodiment is almost the same as that of the first embodiment.

Figure 41:
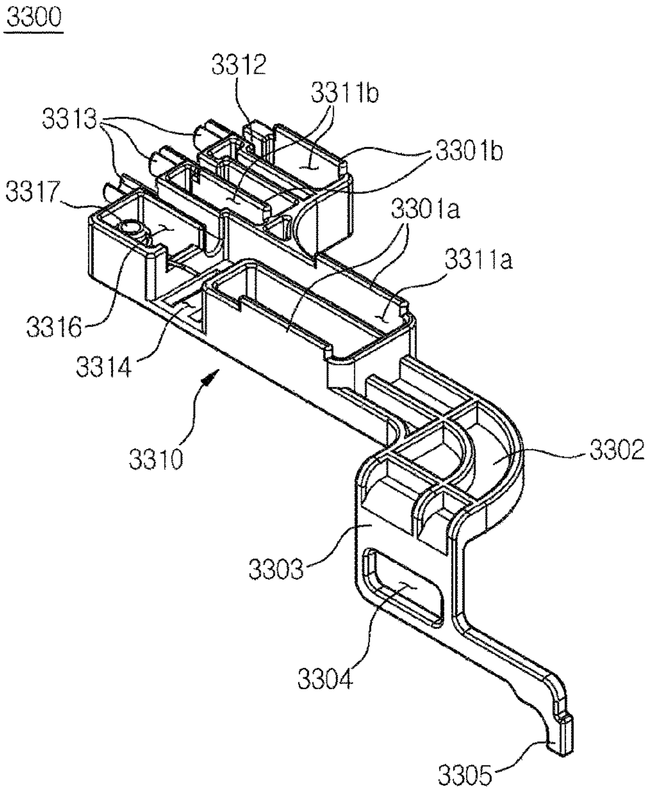
FIG. 41 is a front perspective view of an open plate of a motorized vehicle door latch with emergency release according to a second preferred embodiment of the present invention.
Figure 42:
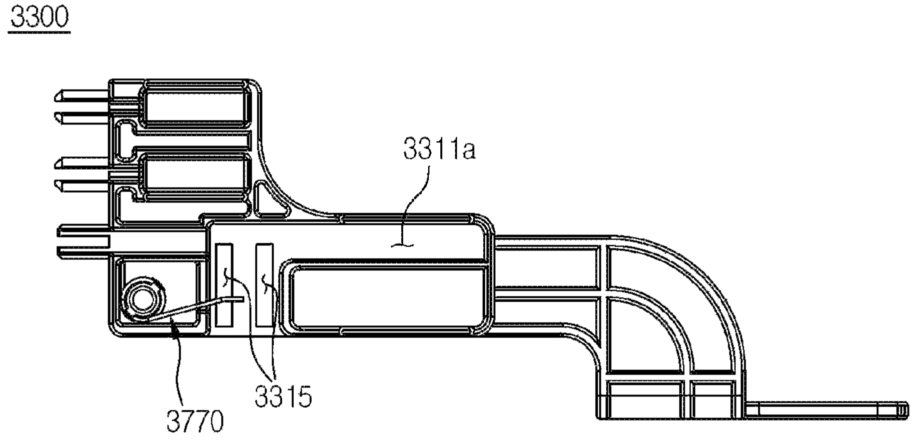
FIG. 42 is a plan view of an open plate of a motorized vehicle door latch with emergency release according to a second preferred embodiment of the present invention.

The open plate 3300 of the second embodiment is illustrated in detail in FIGS. 41 to 42.

The open plate 3300 of the second embodiment does not have an emergency block stopping step 2306 formed in the open plate 2300 of the first embodiment, and there is a difference in shape with the locking lever installation groove 2314 of the first embodiment.

In the open plate 3300 a bent portion 3302 is formed in a way that the right side thereof is bent toward the front side.

In the left side of the open plate 3300, a stopper installation portion 3310 is formed.

The left side of the stopper installation portion 3310 is formed protruded toward the rear side.

The stopper installation portion 3310 comprises cover fitting portions 3301*a* and 3301*b*, stopper fitting grooves 3311*a* and 3311*b*, a stopper engaging portion 3312, a spring fitting portion 3313, and a locking lever installation groove 3314.

The cover fitting portions 3301*a* and 3301*b* comprise a first cover fitting portion 3301*a* formed on the right side of the stopper installation portion 3310 and a second cover fitting portion 3301*b* formed on the left rear side of the stopper installation portion 3310.

The stopper fitting grooves 3311*a* and 3311*b* comprise a first stopper fitting groove 3311*a* in which the upper portion is formed to be open in the first cover fitting portion 3301*a*, and a second stopper fitting groove 3311*b* in which the upper portion is formed to be open in the second cover fitting portion 3301*b*.

The locking lever installation groove 3314 is formed in a way that the upper portion and the front side thereof are open in the central portion of the stopper installation portion 3310.

The rear side of the locking lever installation groove 3314 is in communication with the first stopper fitting groove 3311*a*.

In the locking lever installation groove 3314, a locking lever 3760, which will be described later, is installed.

In the lower surface of the locking lever installation groove 3314, a locking lever fitting groove 3315 into which an open plate fitting protrusion 3740 of the locking lever 3760 is inserted, is formed in the front-to-rear direction.

Two of the locking lever fitting grooves 3315 are arranged side by side in the left-to-right direction, and are formed penetrating through the up-and-down direction.

In the left front side of the stopper installation portion 3310, a spring installation groove 3316 is formed in a way that the upper portion and the right side thereof are open.

The spring installation groove 3316 is disposed at the front side of the second stopper fitting groove 3311*b*.

In the left front side of the spring installation groove 3316, a spring installation protrusion 3317 is formed protruded toward the upper side.

The spring installation protrusion 3317 is formed in the shape of a cylinder.

In the upper portion of the side surface of the spring installation protrusion 3317, a hook is formed in which the upper surface thereof is more downwardly inclined as it travels from the inside toward the outside.

Due to the hook, it is easy to fit the locking lever spring 3770 from the above toward the lower side of the spring installation protrusion 3317, but it is difficult for the locking lever spring 3770 to be separated from the spring installation protrusion 3317.

One end of the locking lever spring 3770 fitted in the spring installation protrusion 3317 is fixed by being in contact with the left side of the spring installation groove 3316.

In addition, the other end of the locking lever spring 3770 is protruded into the locking lever installation groove 3314 through the open right side of the spring installation groove 3316.

Due to this, the other end of the locking lever spring 3770 can be fitted to the locking lever 3760 installed in the locking lever installation groove 3314.

Figure 43:
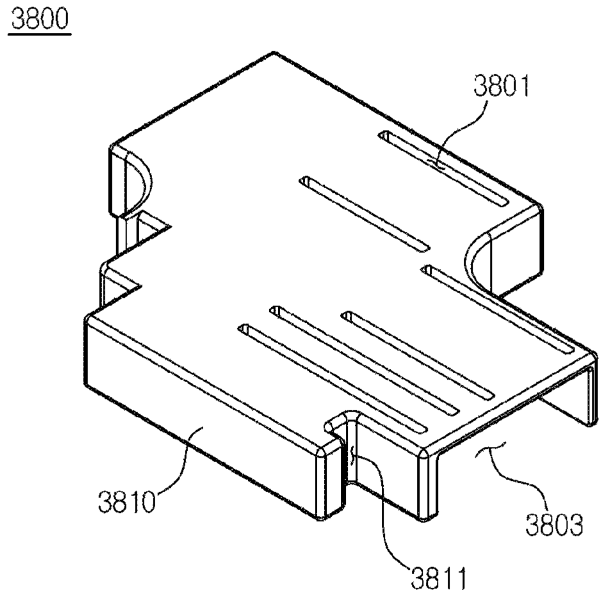
FIG. 43 is a plan perspective view of a connection unit cover of a motorized vehicle door latch with emergency release according to a second preferred embodiment of the present invention.
Figure 44:
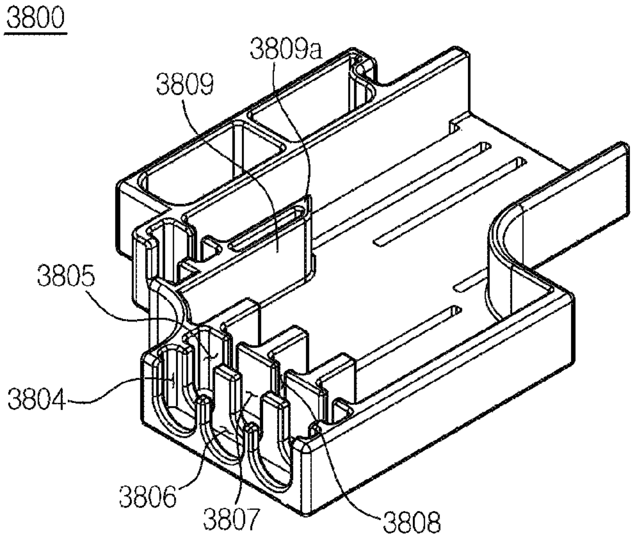
FIG. 44 is a bottom perspective view of a connection unit cover of a motorized vehicle door latch with emergency release according to a second preferred embodiment of the present invention.

The connection unit cover 3800 of the second embodiment is illustrated in detail in FIGS. 43 to 44.

The connection unit cover 3800 of the second embodiment does not have the locking lever guide groove 2802 formed in connection unit cover 3800 of the first embodiment, and there is a difference in shape with the plate guide plate 3809 of the first embodiment.

In the right side of the plate guide plate 3809 of the connection unit cover 3800, a locking lever guide portion 3809*a* is formed.

The rear surface of the locking lever guide portion 3809*a* is formed to be more inclined toward the front side as it travels from the left side toward the right side.

Figure 45:
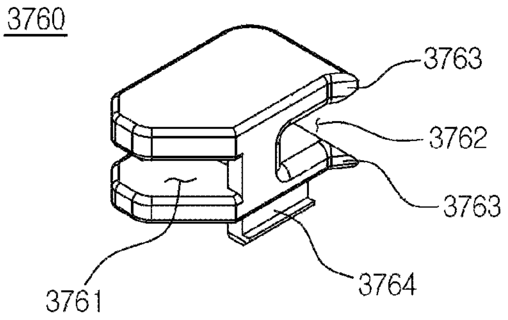
FIG. 45 is a front perspective view of a locking lever of a motorized vehicle door latch with emergency release according to a second preferred embodiment of the present invention.
Figure 46:
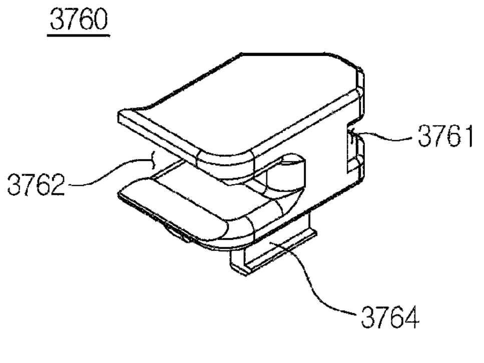
FIG. 46 is a rear perspective view of a locking lever of the motorized vehicle door latch with emergency release according to a second preferred embodiment of the present invention.

The locking lever 3760 of the second embodiment is illustrated in detail in FIGS. 45 to 46.

The locking lever 3760 of the second embodiment is different in shape from the locking lever 2760 of the first embodiment.

The locking lever 3760 is formed, on the whole, in the shape of a cuboid.

The left front side of the locking lever 3760 is formed to be more inclined toward the rear side as it travels from the right side toward the left side.

In addition, the slope of the left front side of the locking lever 3760 is formed to contact the locking lever guide portion 3809*a* of the connection unit cover 3800.

As a result, when the locking lever 3760 that has been slid to the left side is returned to the original state, it can be smoothly moved to the right front side by the shape of the left front side of the locking lever 3760 and the locking lever guide portion 3809*a*.

The right front side of the locking lever 3760 is formed to be more inclined toward the rear side as it travels from the left side toward the right side.

When the safety plate 3400 is slid to the left, and the emergency block 3790 installed in the safety plate 3400 pushes the locking lever 3760 to the left side, the locking lever 3760 receives force with the left rear side.

In the front side of the locking lever 3760, a first locking lever groove 3761 is formed in a way that the front and left-to-right directions thereof are to be open.

The locking lever 3760 is made lighter by the first locking lever groove 3761, and the frictional force between the locking lever 3760 and the locking lever guide 3809*a* and the frictional force between the locking lever 3760 and the emergency block 6790 are reduced, thereby making operation easy.

In the rear side of the locking lever 3760, a second locking lever groove 3762 is formed in a way that the rear and left-to-right directions thereof are to be open.

In the left side of the second locking lever groove 3762, the other end of the locking lever spring 3770 is inserted. Due to this, when the locking lever 3760 is moved toward the rear side, the other end of the locking lever spring 3770 is also moved toward the rear side, thereby compressing the locking lever spring 3770.

In the rear side of the locking lever 3760, a stopper engaging portion 3763 is formed protruded toward the right side.

The rear surface of the stopper engaging portion 3763 is formed flat in the left-to-right direction, and the front surface of the stopper engaging portion 3763 is formed to be inclined more toward the rear side as it travels from the left side toward the right side. Due to this, when the stopper 64 of the outer door connection portion 60 is engaged with the stopper engaging portion 3763, the stopper 64 is stably positioned in the front side of the stopper engaging portion 3763, thereby applying a force on the locking lever 3760.

In the lower portions of the left and right sides of the locking lever 3760, an open plate fitting protrusion 3764 is formed protruded toward the lower direction.

The open plate fitting protrusion 3764 is formed elongated in the front-to-rear direction.

The length of the open plate fitting protrusion 3740 in the front-to-rear direction is formed to be shorter than the length of the locking lever fitting groove 3315 of the open plate 3300 in the front-to-rear direction. Due to this, the open plate fitting protrusion 3764 can be slid in the front-to-rear direction within the locking lever fitting groove 3315.

The lower portion of the open plate fitting protrusion 3764 is formed in the shape of a hook.

Due to this, when the open plate fitting protrusion 3764 is installed in the locking lever fitting groove 3315 of the open plate 3300, it is easily installed by the elastic deformation of the hook, but after installation, it becomes difficult to separate the open plate fitting protrusion 3764 from the locking lever fitting groove 3315.

The width of the left-to-right direction of the locking lever 3760 is formed to be same as or similar to the width of the left-to-right direction of the locking lever installation groove 3314 of the open plate 3300.

Due to this, when the open plate 3300 is slid in the left-to-right direction by the outer door connection portion 60, the locking lever 3760 is also interlocked with this and is slid in the left-to-right direction.

In addition, when the emergency block 3790 is slid to the left side and pushes the locking lever 3760, the locking lever 3760 is slid toward the rear side along the locking lever installation groove 3314 of the open plate 3300.

Hereinafter, the operation process of the second embodiment will be described with reference to FIGS. 47 to 48.

Figure 47:
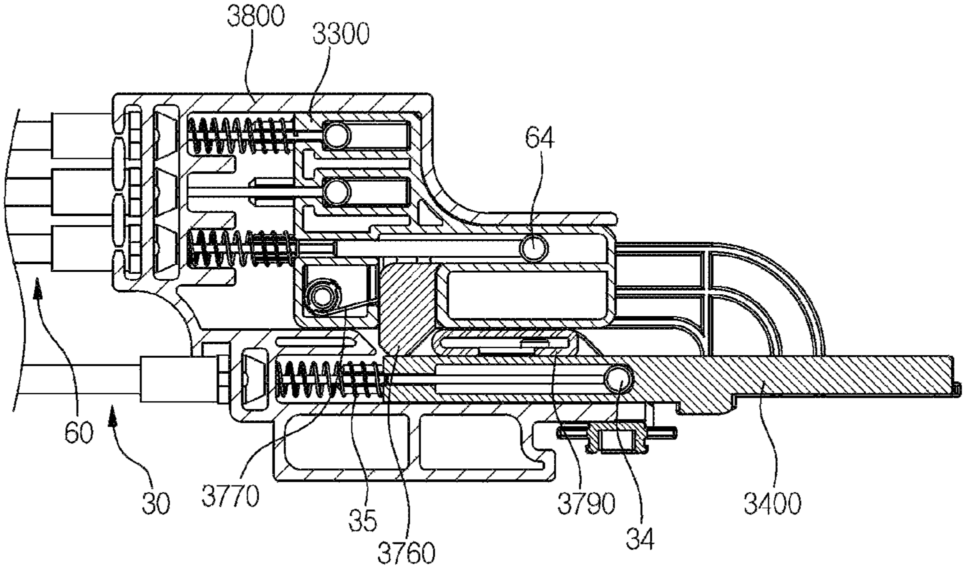
FIG. 47 is a partial cross-sectional view of a latch unit when a handle unit of a motorized vehicle door latch with emergency release according to a second preferred embodiment of the present invention is entered.

As illustrated in FIG. 47, in a situation in which the handle unit 1000 is entered and the door latch connection portion 30 is not pulled, the locking lever 3760 is disposed in a way that the front side thereof is disposed protrudedly further toward the front side than the front surface of the open plate 3300. In addition, the rear side of the locking lever 3760 is disposed away from the first stopper fitting groove 3311*a*.

Due to this, since the left side of the emergency block 3790 installed on the safety plate 3400 is blocked by the front side of the locking lever 3760, even if the outer door connection portion 60 of the handle unit 1000 in the door lock state is pulled out, the stopper 64 of the outer door connection portion 60 will not be engaged with the locking lever 3760.

In this state, since the stopper 64 and the locking lever 3760 are not engaged with each other, the door lock state in which the open plate 3300 is not interlocked by the sliding of the stopper 64 is maintained.

Figure 48:
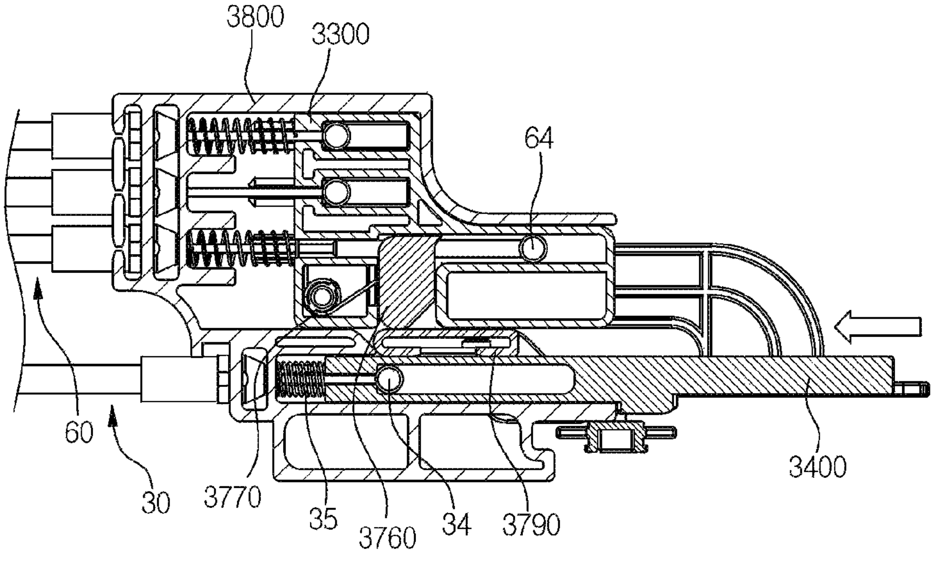
FIG. 48 is a partial cross-sectional view of a latch unit when a handle unit of the motorized vehicle door latch with emergency release according to a second preferred embodiment of the present invention is withdrawn.

As illustrated in FIG. 48, when the door latch connection portion 30 is pulled due to the withdrawal of the handle unit 1000, the stopper 34 of the door latch connection portion 30 is slid toward the left side, thereby compressing the stopper spring 35.

At this time, the stopper 34 pulls the safety plate 3400 to the left side, and since the emergency block 3790 installed in the safety plate 3400 also moves to the left side, and thereby, the locking lever 3760 is slid to the rear side by the emergency block 3790.

Due to this, the front side of the locking lever 3760 is disposed in the open plate 3300, and the rear side of the locking lever 3760 is positioned within the first stopper fitting groove 3311*a*.

At this time, when the outer door connection portion 60 of the handle unit 1000 in the unlock state, is pulled, the stopper 64 of the outer door connection portion 60 is engaged with the locking lever 3760.

In this state, when the outer door connection portion 60 is completely pulled, the locking lever 3760 engaged with the stopper 64 also slides to the left side, and the open plate 3300 is also interlocked by the locking lever 3760 and slid to the left. Due to this, the vehicle door is opened.

After the vehicle door is opened, when the outer door connection portion 60 returns to its original shape, the open plate 3300 is slid to the right side by the elastic restoring force of the stopper spring 65 of the outer door connection portion 60, and at the same time, by the elastic restoring force of the locking lever spring, the locking lever 3760 is slid to the right front side along the locking lever guide portion 3809*a*.

Since the emergency block 3790 is disposed adjacent to the right side of the locking lever guide portion 3809*a*, thereafter, the locking lever 3760 moves to the right side along the rear surface of the emergency block 3790, thereby returning to the original state.

The process of opening the vehicle door using the door lever connection portion 40 is illustrated in FIG. 38 in the first embodiment.

In this way, even in the second embodiment, when the door lever connection portion 40 is pulled in the unlock state where the handle unit 1000 is withdrawn, the locking lever 3760 and the open lever 3300 are slid to the left by the stopper 44, thereby opening the vehicle door.

Embodiment 3

Hereinafter, a third preferred embodiment according to the present invention will be described.

Detailed description of the same configuration as the above described embodiment will be omitted.

The configuration of the third embodiment is almost the same as that of the first embodiment.

The motorized vehicle door latch with emergency release of the third embodiment is installed in a vehicle door and is applicable to a vehicle that is not provided with a hidden handle that is withdrawn toward the outer side when necessary.

In the first embodiment, the safety plate 2400 was slid in the left-to-right direction by the door latch connection portion 30 interlocked with the entry and withdrawal of the handle unit 1000, but in the third embodiment, since there is no configuration corresponding to the handle unit 1000, a safety driving unit for sliding the safety plate 4400 in the left-to-right direction is separately required.

The safe driving unit comprises: a safety motor 4470; a safety lever 4430 for delivering the driving force of the safety motor 4470 to the safety plate 4400; a safety lock unit 4450 wherein the safety motor 4470 and the safety lever 4430 are installed; and a fifth sensor 2904 for detecting the sliding of the safety plate 4400.

Figure 49:
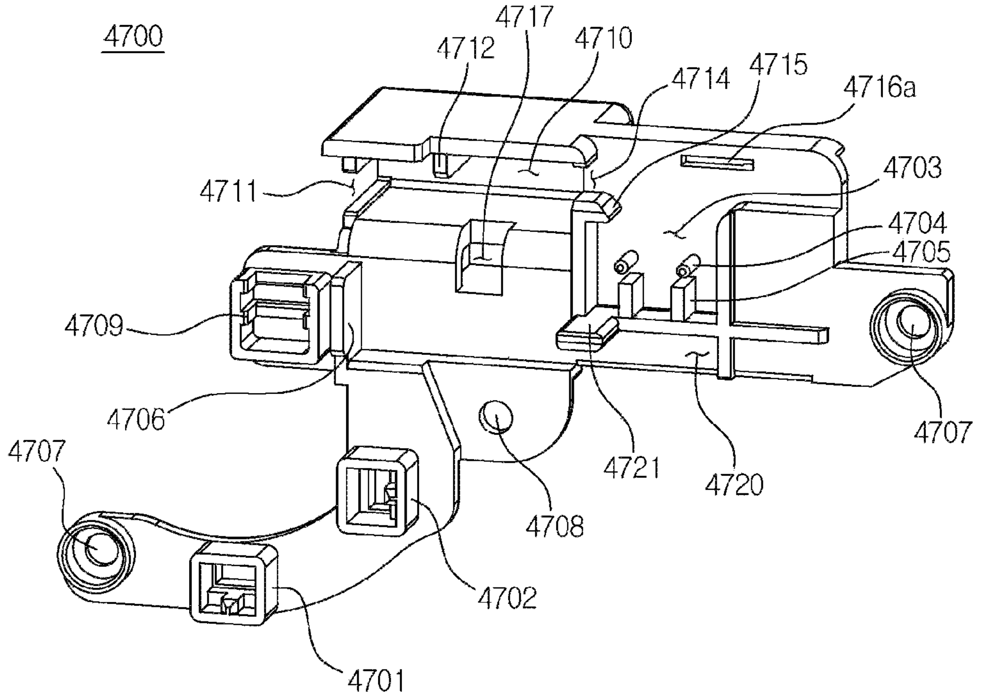
FIG. 49 is a front perspective view of an insert plate of a motorized vehicle door latch with emergency release according to a third preferred embodiment of the present invention.
Figure 50:
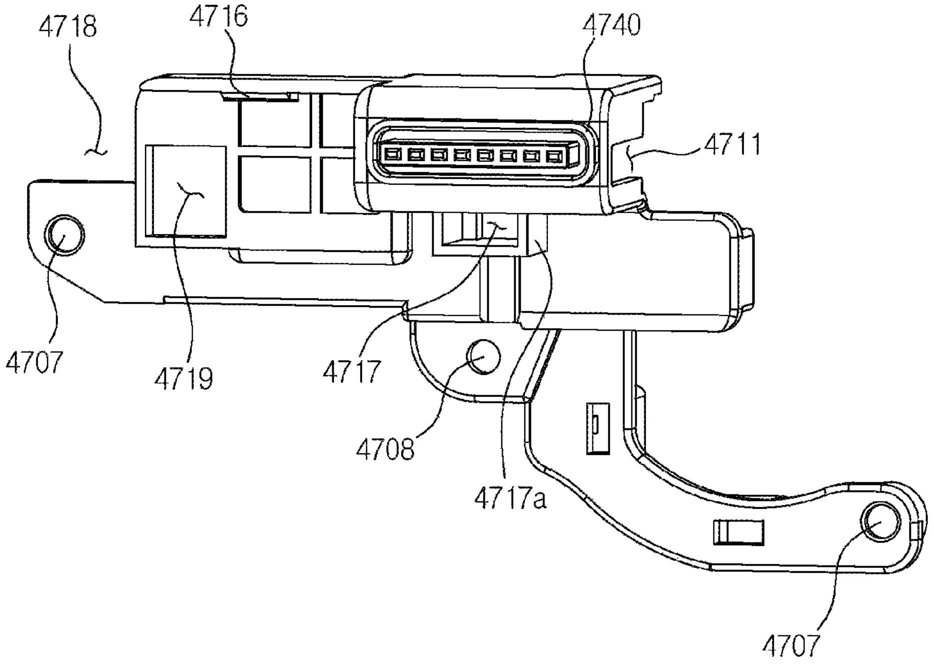
FIG. 50 is a rear perspective view of an insert plate of a motorized vehicle door latch with emergency release according to a third preferred embodiment of the present invention.

The insert plate 4700 of the third embodiment is illustrated in detail in FIGS. 49 and 50.

A portion in which the fifth sensor 2904 and the safety lock unit 4450, which will be described later, are installed, for the insert plate 2700 of the first embodiment, is added to the insert plate 4700 of the third embodiment.

The detailed difference between the insert plate 4700 of the third embodiment and the insert plate 2700 of the first embodiment is as follows.

A fifth sensor installation portion 4709 is formed in the left side of the first housing support portion 4706 of the insert plate 4700.

The fifth sensor installation portion 4709 is formed in a way that the front side thereof is open.

In the lower portion of the open plate mounting groove 4710, a wire insertion groove 4717 is formed penetrating through the front-to-rear direction and a portion of the front side thereof is upwardly open.

A wire is connected to the first coupling portion 4456 of the safety lock unit 4450 through the wire insertion groove 4717.

In the rear side of the insert plate 4700 with respect to the wire insertion groove 4717, a safety lock unit fitting portion 4717*a* is formed.

The safety lock fitting portion 4717*a* is formed in the shape of a cuboid.

The wire insertion groove 4417 is formed to penetrate the safety lock fitting portion 4717*a* in the front-to-rear direction.

In the upper portion of the second sensor installation portion 4703, a slit 4716*a* is formed penetrating through the front-to-rear direction.

The slit 4716*a* is formed in a left-to-right direction.

The upper right of the insert plate 4700 in which the slit 4716*a* is installed is formed protruded toward the rear side.

In the rear side of the insert plate 4700, with respect to the slit 4716*a*, a safety lock unit fitting protrusion 4716 is formed.

The safety lock unit fitting protrusion 4716 is formed in the protruding portion of the upper right end of the insert plate 4700.

The safety lock unit fitting protrusion 4716 is formed protrudedly more toward the lower side as it travels from the rear side toward the front side.

The front surface of the safety lock unit fitting protrusion 4716 is disposed to be spaced apart a certain distance from the slit 4716*a*.

For this reason, the front surface of the safety lock unit 4450, which will be described later, can be inserted between the slit 4716*a* and the safety lock unit fitting protrusion 4716.

Due to the shape of the safety lock unit fitting protrusion 4716, the front surface of the safety lock unit 4450 can be easily inserted into the safety lock unit fitting protrusion 4716, but is difficult to be separated from the safety lock unit fitting protrusion 4716.

Elastic deformation of the safety lock unit fitting protrusion 4716 is more easily happened by the slit 4716*a*.

The third fastening portion 4707 formed on the right side of the insert plate 4700 is disposed at a height similar to that of the second sensor installation portion 4703.

In addition, the upper portion of the third fastening portion 4707 formed on the right side of the insert plate 4700 is penetrated through the front-to-rear direction, and the safety plate guide groove 4618 is formed in a way that the upper portion and the right side thereof are open.

In the right side of the rear side of the insert plate 4700, a safety lock unit fitting groove 4719 is formed recessed toward the front side.

The safety lock unit fitting groove 4719 is formed in the shape of a rectangle.

The safety lock unit fitting groove 4719 is disposed at the left side of the safety plate guide groove 4618 and at the right lower portion of the safety lock unit fitting protrusion 4716.

Figure 51:
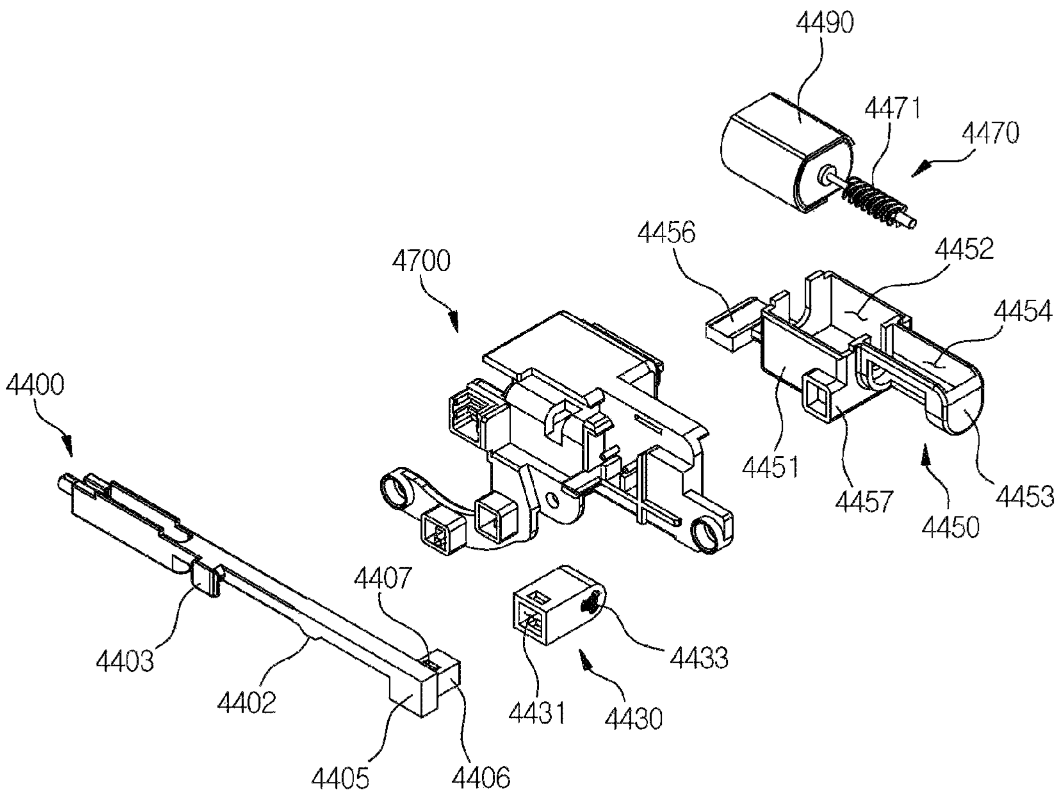
FIG. 51 is a partially exploded front perspective view of a motorized vehicle door latch with emergency release according to a third preferred embodiment of the present invention.
Figure 52:
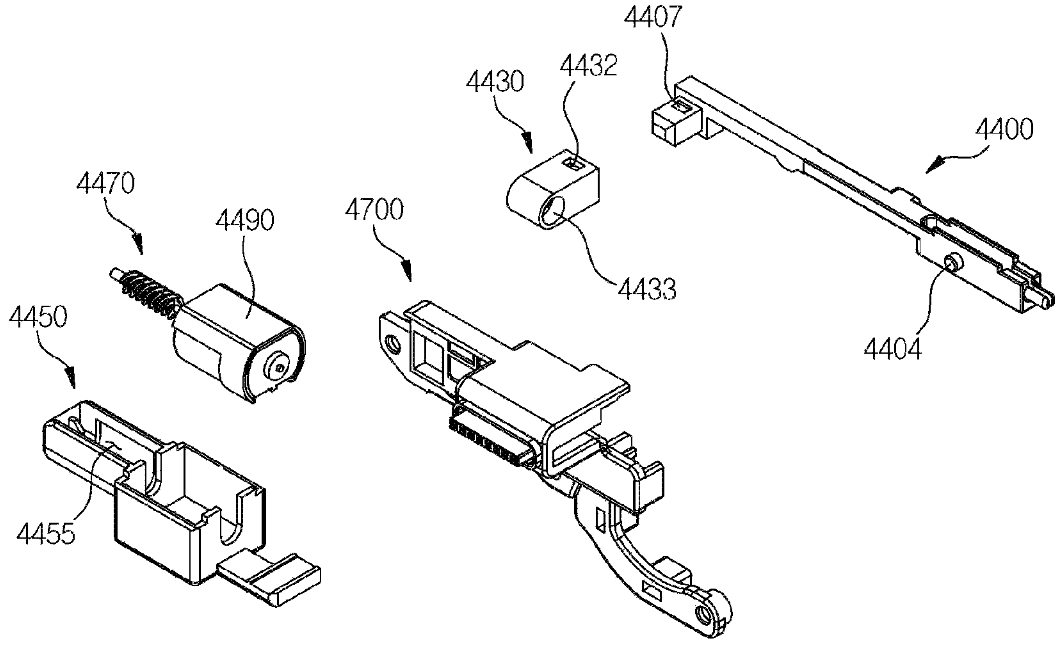
FIG. 52 is a partially exploded rear perspective view of a motorized vehicle door latch with emergency release according to a third preferred embodiment of the present invention.

The safety plate 4400 of the third embodiment is illustrated in detail in FIGS. 51 to 52.

In the safety plate 4400 of the third embodiment, a portion in which the safety lever 4430, which will be described later, is installed in the safety plate 2400 of the first embodiment, is added.

The detailed difference between the safety plate 4400 of the third embodiment and the safety plate 2400 of the first embodiment is as follows.

The safety plate 4400 is formed protrudedly more toward the right side than a safety plate detection protrusion 4402.

In the right end of the safety plate 4400, a safety lever installation portion 4405 is formed.

The safety lever installation portion 4405 is formed in the shape of a square.

The safety lever installation portion 4405 is formed protruded toward the lower portion of the right end of the safety plate 4400. The lower surface of the safety lever installation portion 4405 is in contact with the lower surface of the safety plate guide groove 4618 of the insert plate 4700.

Due to this, the safety lever installation portion 4405 can be slid in the left-to-right direction stably along the safety plate guide groove 4618 by a safety motor 4470, which will be described later.

In the safety lever installation portion 4405, a safety lever fitting portion 4406 is formed protruded toward the rear side.

The safety lever fitting portion 4406 is formed, on the whole, in the shape of a cuboid.

The rear edge of the safety lever fitting portion 4406 has a chamfer shape, so it is easy to insert the safety lever 4430, which will be described later, into the safety lever fitting portion 4406.

Safety lever inserting protrusion 4407 is formed protruded toward the upper and lower sides of the safety lever fitting portion 4406.

The safety lever insertion protrusion 4407 is formed more protruded toward the outside as it travels from the rear side toward the front side.

The safety lever insertion protrusion 4407 is fitted into the safety plate installation groove 4432 formed in the safety lever 4430.

Due to this, it is easy to insert the safety lever 4430 into the safety lever insertion protrusion 4407 from the rear side to the front side, but it is difficult to pull out the safety lever 4430 from the safety lever insertion protrusion 4407 after installing the safety lever 4430.

Figure 54:
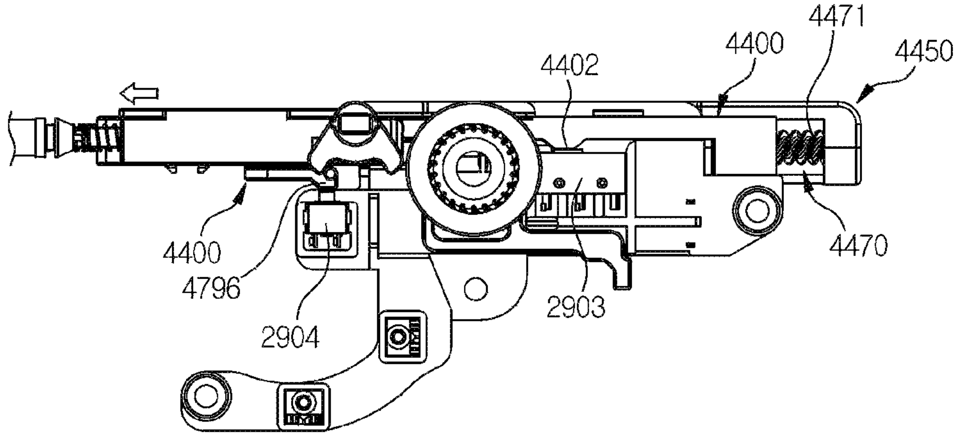
FIG. 54 is a partial front perspective view of the motorized vehicle door latch with emergency release in the unlocked state according to a third preferred embodiment of the present invention.

The lower portion of the emergency block 4790 installed in the emergency block fitting protrusion 4404 of the safety plate 4400 is illustrated in FIG. 54.

In the emergency block 4790 of the third embodiment, unlike the emergency block 2790 of the first embodiment, a fifth sensor pressing portion 4796 capable of pressing the fifth sensor 2904 is further formed.

The fifth sensor pressing portion 4796 is formed protruded toward the lower portion in the right side of the emergency block 4790.

The fifth sensor pressing portion 4796 is formed to press the fifth sensor 2904 when the safety plate 4400 is slid toward the left side.

The safety lever 4430 is illustrated in detail in FIGS. 51 to 52.

The safety lever 4430 is formed, on the whole, in the shape of a cuboid with a round rear side.

In the safety lever 4430, a safety plate fitting groove 4431 is formed in a way that the front side thereof is open.

The safety plate fitting groove 4431 is formed in a way that the safety lever fitting portion 4406 of the safety plate 4400 can be inserted.

In the front side of the upper and lower surfaces of the safety lever 4430, a safety plate installation groove 4432 is formed penetrating through the up-and-down direction.

The safety plate installation groove 4432 is in communication with the safety plate fitting groove 4431.

A safety lever insertion protrusion 4407 of the safety plate 4400 is fitted into the safety plate installation groove 4432. Due to this, the safety lever 4430 is stably installed on the safety plate 4400.

In the rear side of the safety lever 4430, a female screw portion 4433 is formed penetrating through the front-to-rear direction.

The female screw portion 4433 is formed to be teeth-coupled with the worm gear of the safety motor 4470, which will be described later.

The safety lock unit 4450 is illustrated in detail in FIGS. 51 to 52.

The safety lock unit 4450 includes: a safety motor installation portion 4451 wherein a safety motor 4470 is installed; and a worm gear installation portion 4453, formed on the right side of the safety motor installation portion 4451, wherein worm gear 4471 of the safety motor 4470 is installed.

The safety motor installation portion 4451 is formed, on the whole, in the shape of a cuboid.

In the safety motor installation portion 4451, a safety motor insertion groove 4452 is formed in a way that the upper portion thereof is open.

In the left and right side surfaces of the safety motor installation portion 4451, a groove is formed in a way that the upper portion thereof is open, and the shaft of the safety motor 4470 is fitted into the groove.

A worm gear installation portion 4453 is formed, on the whole, in the shape of a semi-cylindrical shape whose upper surface is flat and lower surface is curved.

In the worm gear installation portion 4453, a worm gear insertion groove 4454 is formed in a way that the upper portion thereof is open.

The worm gear insertion groove 4454 is in communication with the right side of the safety motor insertion groove 4452.

In the worm gear installation portion 4445, a safety lever guide groove 4445 is formed in a way that the front side thereof is open.

The safety lever guide groove 4555 is in communication with the worm gear insertion groove 4454.

The width of the safety lever guide groove 4455 in the left-to-right direction is formed to be larger than the width of the safety lever 4430 in the left-to-right direction, and the width of the safety lever guide groove 4455 in the up-and-down direction is formed to be similar to or larger than the width of the safety lever 4430 in the up-and-down direction.

Due to this, the safety lever 4430 is connected to the worm gear 4471 through the safety lever guide groove 4455, is slid along the safety lever guide groove 4555 in the left-to-right direction by the rotation of the worm gear 4471.

In the left side of the safety motor installation portion 4451, a first coupling portion 4456 is formed.

The first coupling portion 4456 is formed in the shape of a plate that is extended toward the left side of the safety motor installation portion 4451 and is bent toward the front side.

The front side of the first coupling portion 4456 is inserted into the safety lock unit fitting portion 4417*a* of the insert plate 4700.

In the right side of the safety motor installation portion 4451, a second coupling portion 4457 is formed.

The second coupling portion 4457 is formed protruded toward the front side of the safety motor installation portion 4451.

The second coupling portion 4457 is formed, on the whole, in the shape of a cuboid.

The second coupling portion 4457 is inserted into the safety lock unit fitting groove 4719 of the insert plate 4700.

The safety lock unit 4450 is coupled to the insert plate 4700 so as not to flow in the up-and-down direction and the left-to-right direction due to the first coupling portion 4456 and the second coupling portion 4457.

The front surface of the safety motor installation portion 4451 is fitted between the safety lock unit fitting protrusion 4716 of the insert plate 4700 and the safety lock unit installation groove 4716*a*. Due to this, the safety lock unit 4450 is coupled to the insert plate 4700 so as not to flow in the front-to-rear direction.

In the outer side of the safety motor 4470 installed in the safety lock unit 4450, a safety motor bumper 4490 may be further installed.

The safety motor bumper 4490 reduces the gap between the safety motor 4470 and the safety motor insertion groove 4452 of the safety lock unit 4450, and minimizes vibration and noise generated due to the safety motor 4470.

Hereinafter, the operation method of the third embodiment will be described with reference to FIGS. 53 to 54.

Figure 53:
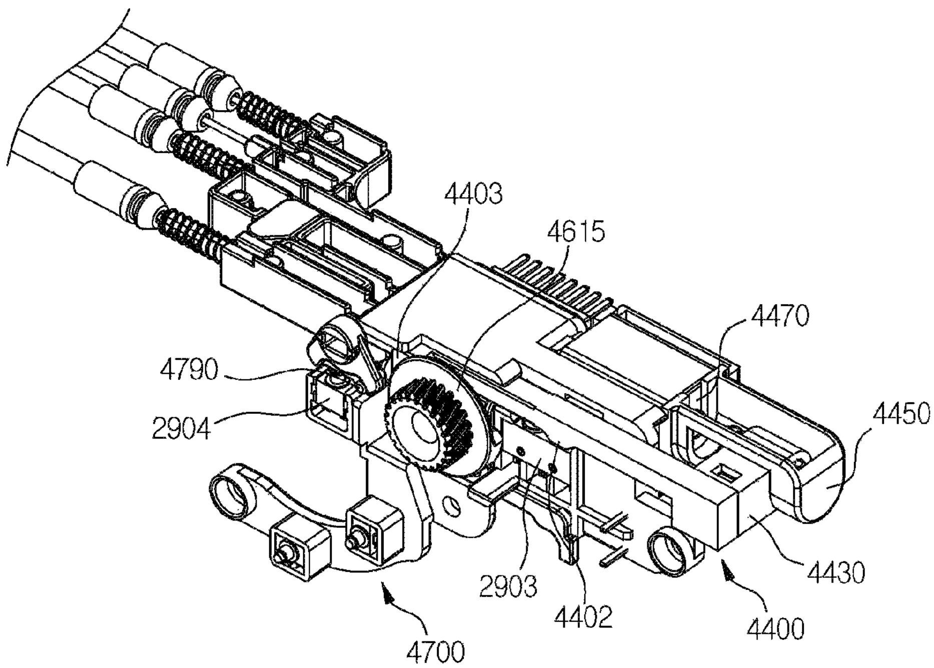
FIG. 53 is a partial front perspective view of a motorized vehicle door latch with emergency release in the locked state according to a third preferred embodiment of the present invention.

As illustrated in FIG. 53, the state in which the safety plate 4400 is slid to the right is called a door lock state.

In the door lock state, a locking fitting portion 4403 of the safety plate 4400 is inserted into a locking member 4615 to mechanically block the operation of the motorized latch 4000, and the safety plate detection protrusion 4402 of the safety plate 4400 is positioned away from the second sensor 2903 to electrically block the operation of the motorized latch 4000.

At this time, the fifth sensor pressing portion 4796 of the emergency block 4790 installed in the safety plate 4400 is also positioned away from the fifth sensor 2904, so that the controller of the motorized latch 4000 recognizes the current state as the door lock state.

When a button operation of a remote controller (fob key) or a smart key and the like is used to change the state of the motorized latch 4000 to the unlock state, the controller of the motorized latch 4000 drives the safety motor 4470.

When the safety motor 4470 is driven, as illustrated in FIG. 54, the worm gear 4471 is rotated, and the safety lever 4430 teeth-coupled with the worm gear 4471 is slid to the left side.

When the safety lever 4430 is slid toward the left side, the safety plate 4400 coupled with the safety lever 4430 also slides toward the left side.

Due to this, the locking fitting portion 4403 of the safety plate 4400 is released away from the locking member 4615, and the safety plate detection protrusion 4402 presses the second sensor 2903 so that the motorized latch 4000 is unlocked.

In addition, since the fifth sensor pressing portion 4696 of the emergency block 4790 presses the fifth sensor 2904, the controller of the motorized latch 4000 recognizes the current state as an unlocked state.

As described above, although described with reference to preferred embodiments of the present invention, those skilled in the art may implement the present invention through various modifications or alterations without departing from the spirit and scope of the present invention as set forth in the claims below.

What is claimed is:

1. A motorized vehicle door latch with emergency release comprising:

a hidden handle installed on a vehicle door;

a motorized latch including a door opening member for opening the vehicle door;

a driving unit for operating the door opening member;

a safety member for locking or unlocking the door opening member;

an outer door connection portion coupled to the hidden handle and pulling the door opening member when the hidden handle is pulled over a certain distance;

a door latch connection portion for moving the safety member in accordance with entry and withdrawal of the hidden handle;

a first sensor for detecting a pulling of the hidden handle; and a second sensor for detecting the withdrawal of the hidden handle, wherein the driving unit is operated by detection signals of the first sensor and the second sensor, and wherein the hidden handle moves among the positions of an initial position, a first position detected by the first sensor, and a second position where the door opening member is operated by the outer door connection portion, according to the hidden handle being pulled over the certain distance, a locking lever for delivering a movement of the outer door connection portion to the door opening member, wherein the locking lever moves to a position at which the locking lever is connected to the outer door connection portion by a movement of the safety member, or moves to a position at which the locking lever is not connected to the outer door connection portion, an emergency lever for moving the locking lever, wherein the emergency lever is manually operated from an outside of the motorized latch.

2. The motorized vehicle door latch with emergency release according to claim 1, further comprising an emergency block slidably coupled to the safety member, wherein a protrusion is formed in the safety member, wherein the emergency block comprises a groove, a width of the groove at central portion thereof is smaller than a width of the groove at both ends thereof, and the protrusion is fitted in the groove, and wherein the emergency block delivers a movement of the emergency lever to the locking lever.

3. The motorized vehicle door latch with emergency release according to claim 2, further comprising:

a door latch key that operates the door opening member, wherein the door latch key is manually operated from the outside of the motorized latch.

* * * * *